United States Patent
Yoshida et al.

(10) Patent No.: US 7,342,629 B2
(45) Date of Patent: Mar. 11, 2008

(54) LIQUID CRYSTAL DISPLAY DEVICE HAVING A PLURALITY OF ELECTRODE UNITS, EACH ELECTRODE UNIT INCLUDING A PLURALITY OF LINE PORTIONS, A PLURALITY OF SPACE PORTIONS BETWEEN THE LINE PORTIONS, AND A SOLID PORTION HAVING THE LINE PORTIONS EXTEND THEREFROM

(75) Inventors: Hidefumi Yoshida, Kawasaki (JP); Yasutoshi Tasaka, Kawasaki (JP); Kazuya Ueda, Kawasaki (JP); Tsuyoshi Kamada, Kawasaki (JP); Masakazu Shibasaki, Kawasaki (JP); Kunihiro Tashiro, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/256,785

(22) Filed: Oct. 24, 2005

(65) Prior Publication Data
US 2006/0038946 A1    Feb. 23, 2006

Related U.S. Application Data

(62) Division of application No. 10/812,828, filed on Mar. 30, 2004.

(30) Foreign Application Priority Data

Mar. 31, 2003   (JP) ............................. 2003-095392
Mar. 31, 2003   (JP) ............................. 2003-095769

(51) Int. Cl.
*G02F 1/1343*    (2006.01)

(52) U.S. Cl. ...................... 349/130; 349/113; 349/141; 349/143; 349/146

(58) Field of Classification Search ................ 349/113, 349/114, 129, 141, 143
See application file for complete search history.

(56) References Cited

U.S. PATENT DOCUMENTS 6,624,860 B1 *  9/2003  Narutaki et al. ............ 349/106

(Continued)

FOREIGN PATENT DOCUMENTS

JP              06-175126           6/1994

(Continued)

OTHER PUBLICATIONS

Uchida et al., *A Bright Reflective LCD Using Optically Compensated Bend Cell with Gray-Scale Capability and Fast Response*, SID 96 Digest, pp. 618-621.

(Continued)

*Primary Examiner*—Andrew Schechter
(74) *Attorney, Agent, or Firm*—Greer, Burns & Crain, Ltd.

(57) ABSTRACT

The invention relates to a liquid crystal display device used as a display part of an information equipment and a method of manufacturing the same, and has an object to provide the liquid crystal display device which can obtain excellent display characteristics without raising the manufacture cost and the method of manufacturing the same. The liquid crystal display device includes a pair of substrates disposed to be opposite to each other, a liquid crystal sealed between the pair of substrates and aligned almost vertically to the substrate when a voltage is not applied, a pair of quarter-wave plates respectively disposed at outer sides of the pair of substrates, a pair of polarizing plates respectively disposed at outer sides of the pair of quarter-wave plates, and a pixel area including a reflection area provided with a reflecting plate having an almost flat reflecting surface and for reflecting light incident from one of the substrates, and a transmission area for causing light incident from the other of the substrates to be transmitted toward the one of the pair of substrates.

8 Claims, 60 Drawing Sheets

U.S. PATENT DOCUMENTS

| | | | |
|---|---|---|---|
| 6,924,876 B2* | 8/2005 | Kubo et al. | 349/193 |
| 7,023,516 B2* | 4/2006 | Yoshida et al. | 349/143 |
| 2001/0015777 A1 | 8/2001 | Ha | 349/43 |
| 2001/0022638 A1 | 9/2001 | Ha et al. | 349/113 |
| 2001/0055082 A1* | 12/2001 | Kubo et al. | 349/114 |
| 2002/0036740 A1 | 3/2002 | Kubo et al. | 349/129 |
| 2003/0071952 A1* | 4/2003 | Yoshida et al. | 349/141 |
| 2003/0193625 A1 | 10/2003 | Yoshida et al. | 349/43 |
| 2004/0218122 A1* | 11/2004 | Nishimura | 349/114 |

FOREIGN PATENT DOCUMENTS

| | | |
|---|---|---|
| JP | 07-311383 | 11/1995 |
| JP | 11-281972 | 10/1999 |
| JP | 2000-29010 | 1/2000 |
| JP | 2000-047251 | 2/2000 |
| JP | 2000-056326 | 2/2000 |
| JP | 2000-171789 | 6/2000 |
| JP | 2002-202511 | 7/2002 |
| KR | 2001-0065037 | 7/2001 |
| KR | 2001-0066259 | 7/2001 |
| KR | 2003-0008788 | 1/2003 |

OTHER PUBLICATIONS

Jisaki et al., *Development of Transflective LCD for High Contrast and Wide Viewing Angle by Using Homeotropic Alignment*, Oct. 10-19, 2001, Asia Display/IDW' 01, pp. 133-136.

* cited by examiner

AREAL RATIO OF TRANSMISSION AREA WHERE REFLECTIVITY OF 5% OR MORE IS OBTAINED

AREAL RATIO OF TRANSMISSION AREA WHERE TRANSMISSIVITY OF 5% OR MORE IS OBTAINED

LIQUID CRYSTAL DISPLAY DEVICE HAVING A PLURALITY OF ELECTRODE UNITS, EACH ELECTRODE UNIT INCLUDING A PLURALITY OF LINE PORTIONS, A PLURALITY OF SPACE PORTIONS BETWEEN THE LINE PORTIONS, AND A SOLID PORTION HAVING THE LINE PORTIONS EXTEND THEREFROM

This is a Divisional of U.S. patent application No. 10/812,828, filed on Mar. 30, 2004.

BACKGROUND OF THE INVENTION

1. Field of the Invention

The present invention relates to a liquid crystal display device used as a display part of an information equipment or the like and a method of manufacturing the same, and particularly to a transreflective type liquid crystal display device used for a low power consumption equipment such as a portable information terminal and a method of manufacturing the same.

2. Description of the Related Art

In recent years, an active matrix type liquid crystal display device including a thin film transistor (TFT) in each pixel has been widely used as a display device for any use. The liquid crystal display device is classified into a transmission type, a reflection type and a transreflective type by its lighting system. In the transmission type, transmitted light from a backlight unit is used for display. In the reflection type, reflected light of outside light is used for display. In the transreflective type, transmitted light of a backlight unit is used for display in a dark place and reflected light of outside light is used for display in a bright place. In recent years, as a display device for a mobile terminal or a notebook PC, a transreflective type (reflective and transmissive) liquid crystal display device in which display in both reflective and transmissive modes is enabled has been used.

Here, a conventional liquid crystal display device will be described. FIG. 74 shows a sectional structure of a reflection type liquid crystal display device disclosed in non-patent document 1 (set forth below). As shown in FIG. 74, a liquid crystal 106 is sealed between a pair of substrates 102 and 104 disposed to be opposite to each other. The alignment state of the liquid crystal 106 is a bend alignment called ROCB (Reflective Optically Compensated Birefringence). A reflecting electrode 116 having a mirror-like flat reflecting surface is formed on the surface of the one substrate 102 at the side of the liquid crystal 106. A common electrode 142 made of a transparent electrode film is formed on the surface of the other substrate 104 at the side of the liquid crystal 106. A phase difference film (quarter-wave plate) 120, a polarizing plate 122 and an optical path control film 124 are disposed in this order at the panel outer side (observer side) of the other substrate 104.

The optical path of incident outside light is bent by the optical path control film 124, reaches the reflecting electrode 116, is reflected, and is emitted toward the observer side. Since the optical path control film 124 for diffusing and transmitting light is provided, the optical path of the light reflected at the surface of the optical path control film 124 is different from the optical path of the light having been transmitted through the optical path control film 124 and reflected at the surface of the reflecting electrode 116. Then, when the observer sees the display screen, the display and the outside light do not overlap with each other, and a clear display image can be observed.

FIGS. 75A and 75B show a structure of a transreflective type liquid crystal display device disclosed in non-patent document 2 (set forth below). FIG. 75A shows a structure of approximately one pixel of the transreflective type liquid crystal display device, and FIG. 75B shows a sectional structure of the transreflective type liquid crystal display device cut along line X-X of FIG. 75A. As shown in FIGS. 75A and 75B, a pixel area is divided into a transmission area T and a reflection area R. An insulating material (resin layer) 130 is formed in the reflection area R of a TFT substrate 102 so that the cell thickness of the reflection area R becomes half of that of the transmission area T. A reflecting electrode 116 having an uneven surface is formed on the insulator 130. A protrusion 132 for alignment controlling a vertically aligned liquid crystal 106 is formed at the center part of the transmission area T of an opposite substrate 104. A pair of quarter-wave plates 120 are respectively disposed at the panel outer side of the TFT substrate 102 and at the panel outer side of the opposite substrate 104. A pair of polarizing plates 122 are respectively disposed at the further outer sides of the respective quarter-wave plates 120.

Although this liquid crystal display device is the same as the liquid crystal display device shown in FIG. 74 in that the reflecting electrode 116 is formed on the surface of the substrate 102 at the side of the liquid crystal 106, the reflecting surface of the reflecting electrode 116 is uneven. The incident outside light from the observer side is scattered and reflected at the reflecting electrode 116, and is emitted toward the observer side.

FIG. 76A shows a state in which a voltage is not applied to the liquid crystal 106, and FIG. 76B shows a state where a predetermined voltage is applied to the liquid crystal 106. As shown in FIG. 76A, in the state of voltage non-application, since a liquid crystal molecule is aligned vertically to the substrate surface, the liquid crystal 106 does not exert an optical effect on light. When a reflective display is performed, the light having been transmitted through the polarizing plate 122 is transmitted through the quarter-wave plate 120 and is incident on the liquid crystal 106, and after the light is reflected at the reflecting electrode 116, it is again transmitted through the quarter-wave plate 120. That is, the light is transmitted through the quarter-wave plate 120 twice, so that its polarization state is rotated by 90°. Accordingly, this light is absorbed by the polarizing plate 122. Thus, black is displayed in the reflection mode.

Besides, when a transmissive display is performed, light having been transmitted through the polarizing plate 122 at the side of a backlight unit 188 is transmitted through the quarter-wave plate 120, is incident on the liquid crystal 106, and is transmitted through the quarter-wave plate 120 at the observer side. That is, the light is transmitted through the quarter-wave plate 120 twice, so that its polarization state is rotated by 90°. Accordingly, this light is absorbed by the polarizing plate 122 at the observer side. Thus, black is displayed in the transmission mode.

On the other hand, in the state where the predetermined voltage is applied, since the liquid crystal molecule is inclined with respect to the substrate surface, the liquid crystal 106 exerts a predetermined optical effect on light. As shown in FIG. 76B, light having been transmitted through the polarizing plate 122 changes its polarization state by the liquid crystal 106. Thus, white is displayed in both the reflection and transmission modes.

[Patent Document 1] JP-A-2000-56326

[Patent Document 2] JP-A-2000-171789

[Patent Document 3] JP-A-2002-202511

[Patent Document 4] JP-A-6-175126

[Patent Document 5] JP-A-7-311383

[Patent Document 6] JP-A-11-281972

[Patent Document 7] JP-A-2000-47251

[Non-patent Document 1] Uchida et al. "A Bright Reflective LCD Using Optically Compensated Birefringence Cell with Gray-Scale Capability and Fast Response", SID 96 DIGEST, p. 618-621

[Non-patent Document 2] Jisaki et al. "Development of Transflective LCD for High Contrast and Wide Viewing angle by Using Homeotropic Alignment", Asia Display/IDW '01, p. 133

In the structure of the reflection type liquid crystal display device as shown in FIG. 74, a use in combination with the transmission type has not been realized. This is because in the reflection type, on the premise that the light is transmitted through the liquid crystal 106 twice, the alignment state of the liquid crystal 106 is a hybrid alignment. In the hybrid alignment, there is a problem that birefringence is small when it is used in the transmission type, and a sufficient white display can not be performed. Besides, when it is used in the transmission type, there is a problem that viewing angle characteristics are low.

On the other hand, in the transreflective type liquid crystal display device shown in FIGS. 75A to 76B, it is proposed that the surface of the reflecting electrode 116 is formed to be uneven. However, in order to manufacture the transreflective type liquid crystal display device having the uneven reflecting electrode 116, in addition to a manufacture process of a normal transmission type liquid crystal display device, a process, such as formation and patterning of a resin layer and formation of the reflecting electrode 116, is further required. Thus, there arises a problem that the manufacture cost of the liquid crystal display device is raised.

SUMMARY OF THE INVENTION

An object of the present invention is to provide a liquid crystal display device which can obtain excellent display characteristics without raising the manufacture cost and a method of manufacturing the same.

The above object is achieved by a liquid crystal display device including a pair of substrates disposed to be opposite to each other, a liquid crystal sealed between the pair of substrates and aligned almost vertically to the substrate when a voltage is not applied, a pair of quarter-wave plates respectively disposed at outer sides of the pair of substrates, a pair of polarizing plates respectively disposed at outer sides of the pair of quarter-wave plates, and a pixel area including a reflection area provided with a reflecting plate having an almost flat reflecting surface and for reflecting light incident from one of the pair of substrates, and a transmission area for causing light incident from the other of the pair of substrates to be transmitted toward the one of the pair of substrates.

DETAILED DESCRIPTION OF THE INVENTION

First Embodiment

A liquid crystal display device according to a first embodiment of the invention and a method of manufacturing the same will be described with reference to FIGS. 1A to 12. In this embodiment, excellent points of the two liquid crystal display devices already described as the related art are extracted and combined, and a method is devised to eliminate the necessity of changing a manufacture process of a normal transmission type liquid crystal display device.

Figure 1A:
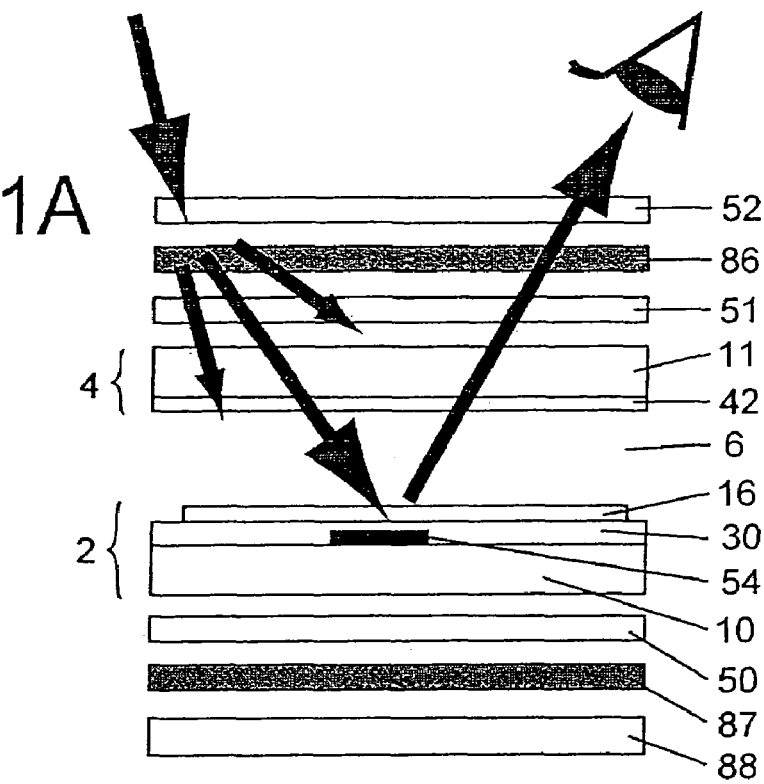
FIGS. 1A and 1B are views showing a basic structure of a liquid crystal display device according to a first embodiment of the invention.
Figure 1B:
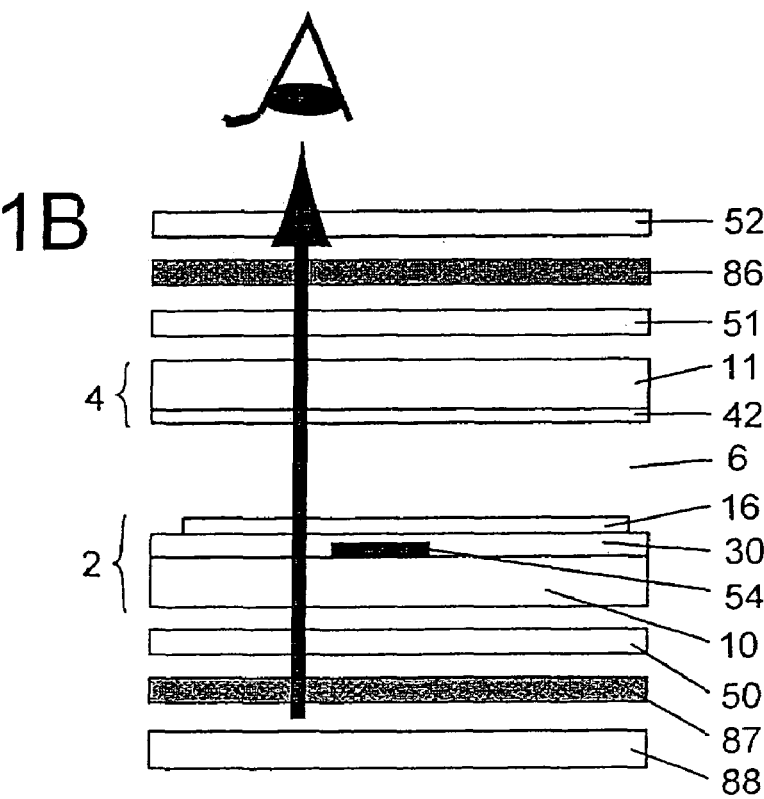

FIGS. 1A and 1B are sectional views schematically showing a basic structure of a liquid crystal display device according to this embodiment. FIG. 1A shows an optical path at the time of reflective display, and FIG. 1B shows an optical path at the time of transmissive display. As shown in FIGS. 1A and 1B, a liquid crystal 6 is sealed between a TFT substrate 2 and an opposite substrate (CF substrate) 4, which are disposed to be opposite to each other. An alignment state of the liquid crystal 6 is a vertical alignment. The TFT substrate 2 is formed on a glass substrate 10, and includes a metal reflecting plate 54 having an almost flat reflecting surface. As the reflecting plate 54, an electrode such as, for example, a storage capacitor electrode is used. An insulating film 30 is formed on the reflecting plate 54. An almost flat and transparent pixel electrode 16 is formed on the insulating film 30. The opposite substrate 4 includes a transparent common electrode 42 formed on a glass substrate 11.

A quarter-wave plate 51, a polarizing plate 86 and an optical path control film (light scattering layer) 52 are disposed in this order at the panel outer side (observer side) of the opposite electrode 4. A quarter-wave plate 50 and a polarizing plate 87 are disposed in this order at the panel outer side of the TFT substrate 2. Polarizing axes of both the polarizing plates 86 and 87 are orthogonal to each other. A backlight unit 88 is disposed at the further outer side of the polarizing plate 87.

Since a liquid crystal molecule is aligned almost vertically to a substrate surface in a voltage non-application state, the liquid crystal 6 does not exert an optical effect on light. When a reflective display is performed, incident outside light is reflected by the reflecting plate 54. Here, the light having been transmitted through the polarizing plate 86 is transmitted through the quarter-wave plate 51, and is incident on the liquid crystal 6, and after the light is reflected at the reflecting electrode 16, it is again transmitted through the quarter-wave plate 51. That is, the light is transmitted through the quarter-wave plate 51 twice, so that its polarization state is rotated by 90°. Accordingly, this light is absorbed by the polarizing plate 86. Thus, black is displayed in the reflection mode.

Besides, when a transmissive display is performed, light having been transmitted through the polarizing plate 87 at the side of the backlight unit 88 is transmitted through the quarter-wave plate 50, is incident on the liquid crystal 6, and is transmitted through the quarter-wave plate 51. That is, the light is transmitted through the quarter-wave plates 50 and 51 twice, so that its polarization state is rotated by 90°. Accordingly, this light is absorbed by the polarizing plate 86 at the observer side. Thus, black is displayed in the transmission mode.

On the other hand, in a state where a predetermined voltage is applied, the liquid crystal molecule is inclined with respect to the substrate surface. Thus, birefringence as an optical effect occurs in the liquid crystal 6, and a polarization state of transmitted light is changed. When the reflective display is performed, the incident outside light is transmitted through the liquid crystal 6, so that its polarization state is changed, and the light is transmitted through the polarizing plate 86. Thus, white or gray is displayed in the reflection mode. When the transmissive display is performed, the incident light from the backlight unit 88 is also transmitted through the liquid crystal 6, so that its polarization state is changed, and the light is transmitted through the polarizing plate 86. Thus, white or gray is displayed in the transmission mode.

In this embodiment, since an electrode such as a storage capacitor electrode formed on the general TFT substrate 2 is used as the reflecting plate 54, there is no addition in the manufacture process. Here, in the transmission mode, the reflection of the outside light at the reflecting plate 54 at the time when the backlight unit 88 is turned on is not very annoying. This is because both the state where black is displayed in the transmission mode and the state where black is displayed in the reflection mode are the voltage non-application states, and when black is displayed in the transmission mode, there is no reflection of the outside light.

A film for scattering only incident light at an incident angle in a predetermined range is used as the optical path control film 52. For example, the incident light from the sun is scattered by the optical path control film 52 and is reflected by the reflecting plate 54. The reflected light is used for the display and is emitted toward the observer side. By this, for example, even in the case of the light source such as the sun, the display can be performed using the reflected light at the reflecting plate 54 while the surface reflection is avoided. Incidentally, it is desirable that when the reflected light is again transmitted through the optical path control film 52, scattering does not occur.

Hereinafter, a description will be given of specific examples.

EXAMPLE 1-1

Figure 2:
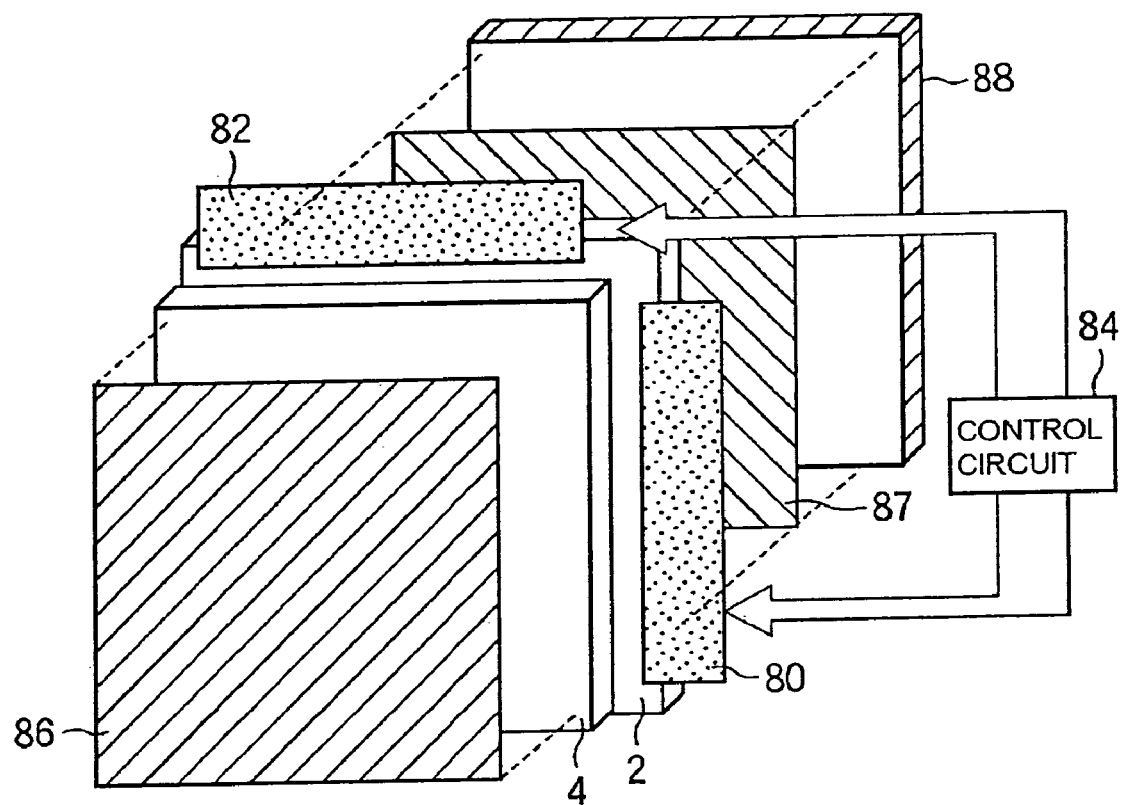
FIG. 2 is a view showing a schematic structure of a liquid crystal display device according to example 1-1 of the first embodiment of the invention.

A liquid crystal display device according to example 1-1 of this embodiment will be described with reference to FIGS. 2 to 6. FIG. 2 shows a schematic structure of the liquid crystal display device according to this example. As shown in FIG. 2, the liquid crystal display device includes a TFT substrate 2 provided with gate bus lines and drain bus lines formed to intersect with each other through an insulating film, and a TFT and a pixel electrode formed in each pixel. Besides, the liquid crystal display device includes an opposite electrode 4 in which a common electrode and a CF are formed, and a liquid crystal (not shown) sealed between both the substrates 2 and 4.

Figure 3:
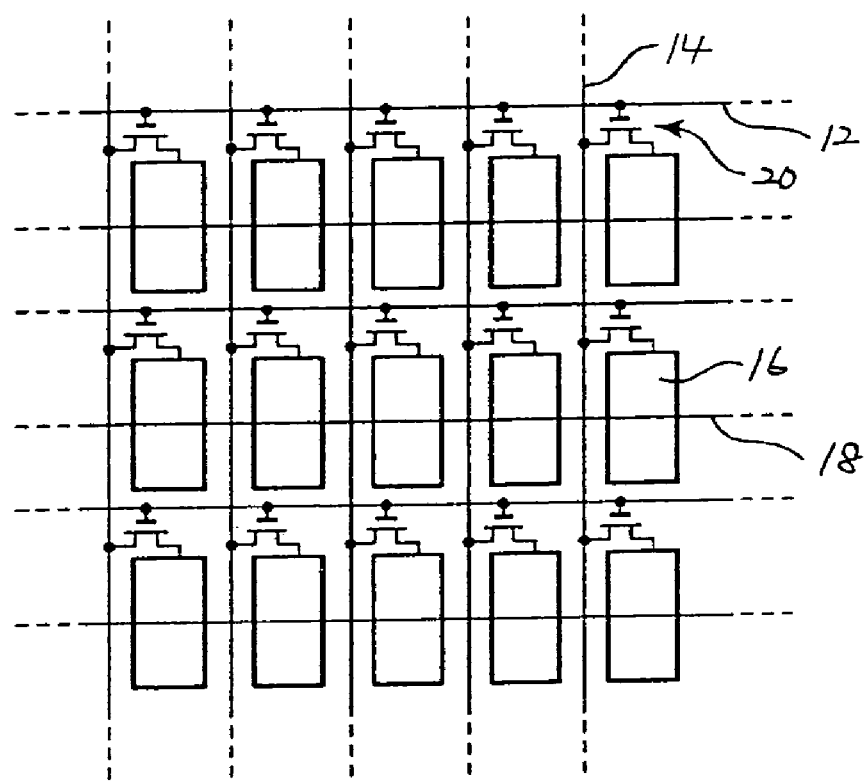
FIG. 3 is a view schematically showing an equivalent circuit of the liquid crystal display device according to the example 1-1 of the first embodiment of the invention.

FIG. 3 schematically shows an equivalent circuit of an element formed on the TFT substrate 2. A plurality of gate bus lines 12 extending in the horizontal direction of the drawing are formed in parallel with each other on the TFT substrate 2. A plurality of drain bus lines 14 intersecting with the gate bus lines 12 through an insulating film and extending in the vertical direction of the drawing are formed in parallel with each other. Respective areas surrounded by the plurality of gate bus lines 12 and the drain bus lines 14 become pixel areas. A TFT 20 and a pixel electrode 16 are formed in each of the pixel areas disposed in a matrix form. A drain electrode of each TFT 20 is connected to the adjacent drain bus line 14, a gate electrode is connected to the adjacent gate bus line 12, and a source electrode is connected to the pixel electrode 16. Storage capacitor bus lines 18 are formed in parallel with the gate bus lines at almost the centers of the respective pixel areas.

Again, in FIG. 2, the TFT substrate 2 is provided with a gate bus line driving circuit 80 in which a driver IC for driving the plurality of gate bus lines is mounted and a drain bus line driving circuit 82 in which a driver IC for driving the plurality of drain bus lines is mounted. These driving circuits 80 and 82 output scanning signals and data signals to predetermined gate bus lines or drain bus lines on the basis of predetermined signals outputted from a control circuit 84. A polarizing plate 87 is disposed on a substrate surface of the TFT substrate 2 at the opposite side to an element formation surface, and a backlight unit 88 is attached to a surface of the polarizing plate 87 at the opposite side to the TFT substrate 2. On the other hand, a polarizing plate 86 disposed in crossed Nicols with respect to the polarizing plate 87 is bonded to a surface of the opposite electrode 4 at the opposite side to a common electrode formation surface.

Figure 4:
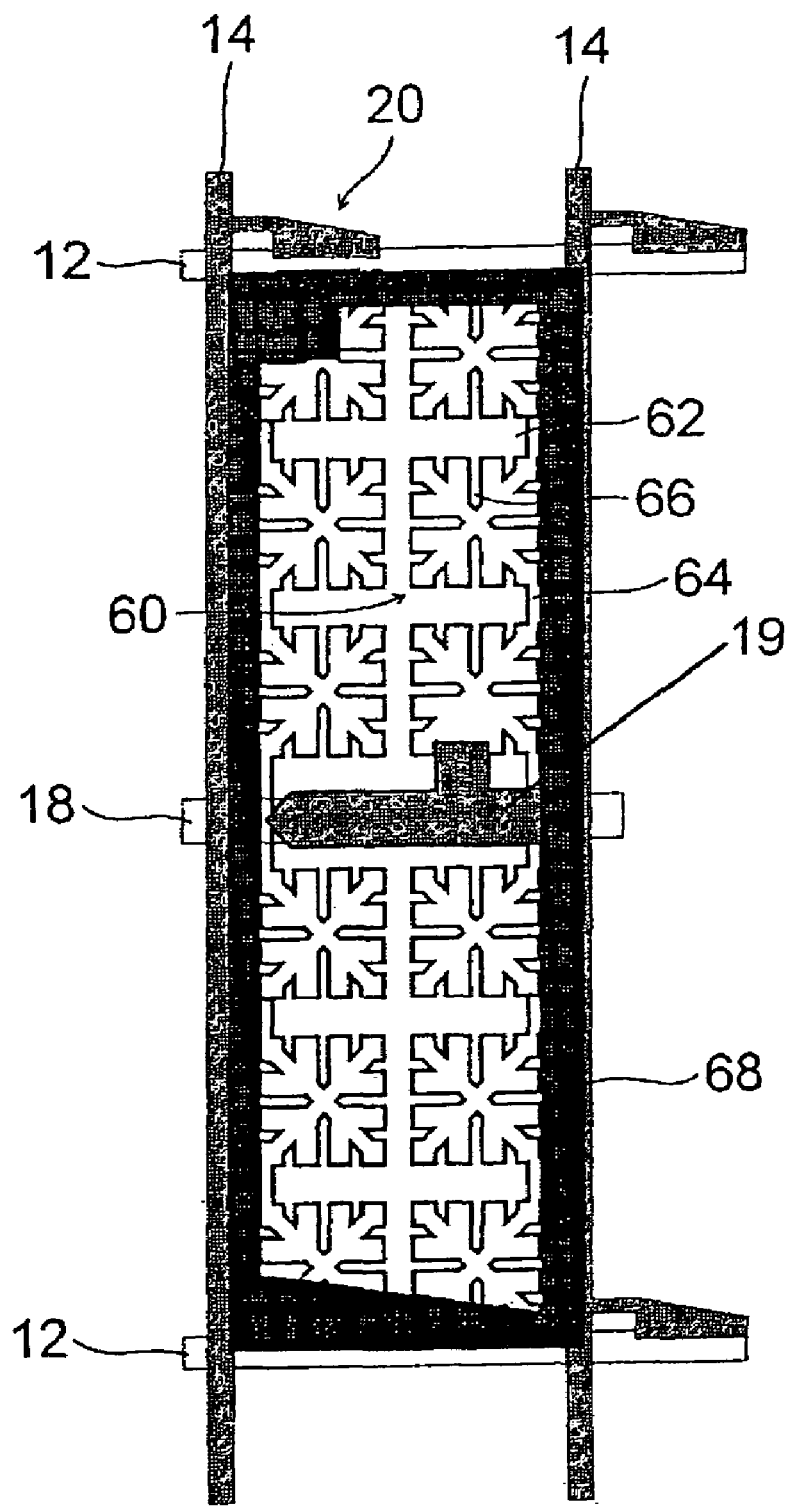
FIG. 4 is a view showing the structure of the liquid crystal display device according to the example 1-1 of the first embodiment of the invention.

FIG. 4 shows a structure of approximately one pixel of the liquid crystal display device according to this example. As shown in FIG. 4, the plurality of gate bus lines 12 (two in FIG. 4) extending in the horizontal direction of the drawing are formed almost in parallel with each other on the TFT substrate 2 of the liquid crystal display device. The plurality of drain bus lines 14 (two in FIG. 4) extending in the vertical direction of the drawing are formed almost in parallel with each other to intersect with the gate bus lines 12 through a not-shown insulating film. The TFT 20 is formed in the vicinity of each of intersecting positions of the gate bus lines 12 and the drain bus lines 14. An area surrounded by the gate bus line 12 and the drain bus line 14 is a pixel area. The storage capacitor bus line 18 extending almost in parallel with the gate bus line 12 is formed to cross almost the center of the pixel area. A storage capacitor electrode 19 is formed on the storage capacitor bus line 18 in each pixel area.

The pixel electrode 16 made of a transparent conductive film of, for example, ITO (Indium Tin Oxide) film is formed in the pixel area. The pixel electrode 16 includes a plurality of electrode units 60 each having a rectangular outer periphery and smaller than the pixel area, an electrode blank part (slit) 62 formed between the adjacent electrode units 60, and a connection electrode 64 for electrically connecting electrode units 60, which are separated by the slit 62, to each other. In the structure shown in FIG. 4, twelve electrode units 60 each having an almost square outer periphery are formed in one pixel. A plurality of spaces 66 cut from the respective end sides almost in parallel with the gate bus line 12 or the drain bus line 14 are formed at the outer periphery of the electrode unit 60. On the other hand, a BM 68 for shading areas other than the pixel area is formed on the opposite electrode.

Figure 5:
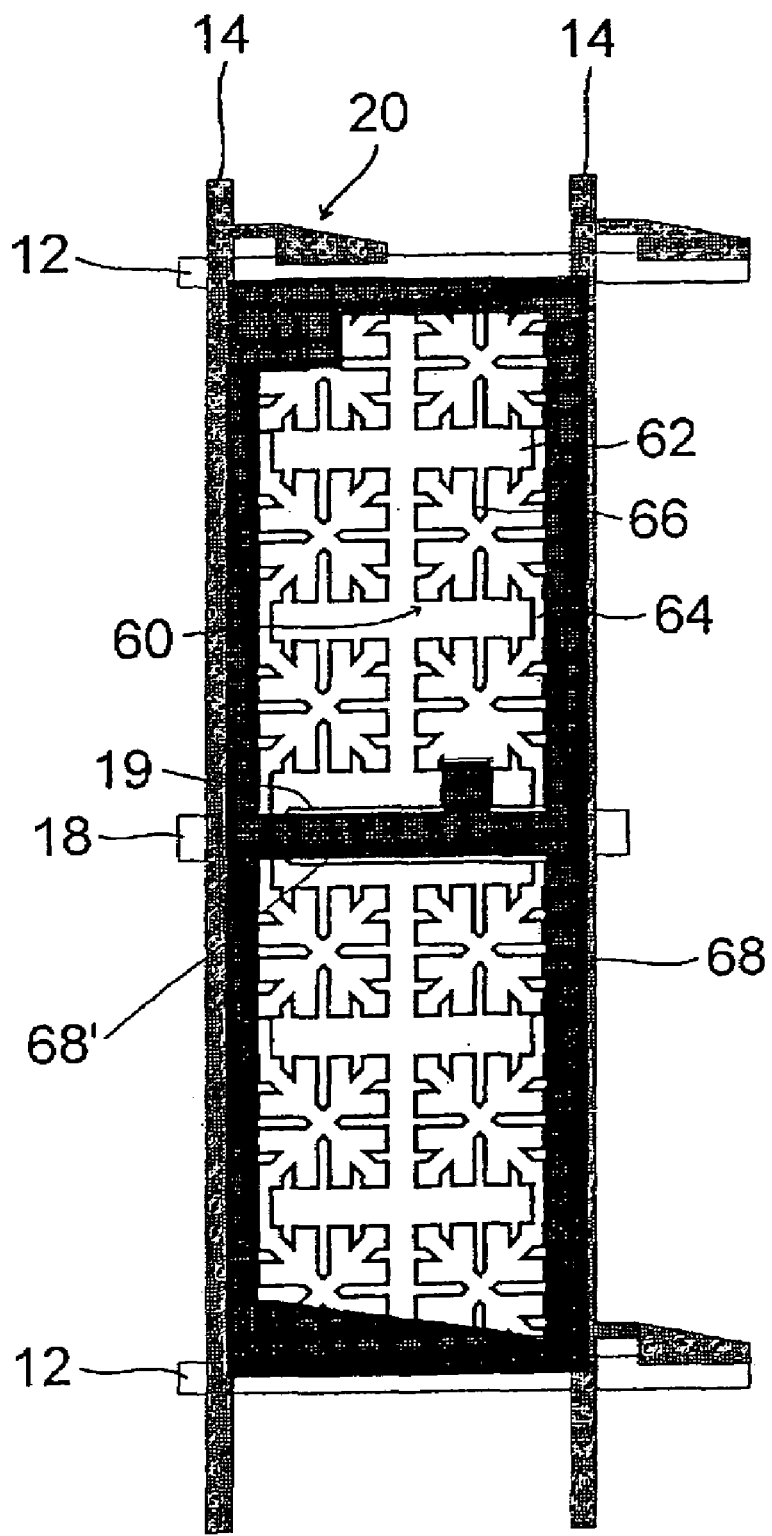
FIG. 5 is a view showing a structure of a conventional liquid crystal display device.

FIG. 5 shows a structure of a conventional liquid crystal display device for comparison with this example. Differently from the conventional liquid crystal display device shown in FIG. 5, the liquid crystal display device of this example is characterized in that a BM 68' on a storage capacitor electrode 19 made of the same formation material as a source/drain electrode of a TFT 20 (or a storage capacitor bus line 18 made of the same formation material as a gate electrode of the TFT 20) is not formed. In the conventional structure, although the BM 68' is provided to prevent the outside light from being reflected by the storage capacitor electrode 19 (or the storage capacitor bus line 18), in this example, the storage capacitor electrode 19 (or the storage capacitor bus line 18) is used as the reflecting plate.

Figure 6:
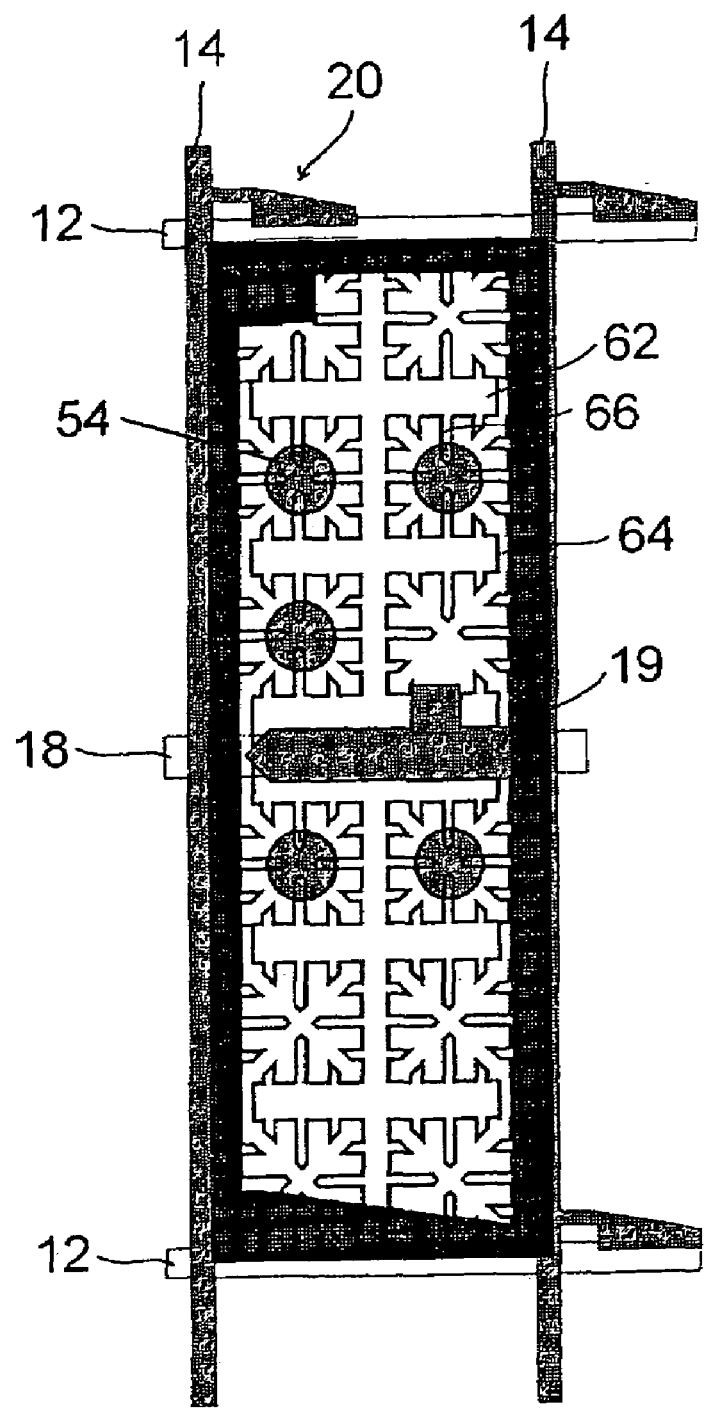
FIG. 6 is a view showing a modified example of the structure of the liquid crystal display device according to the example 1-1 of the first embodiment of the invention.

FIG. 6 shows a modified example of the structure of the liquid crystal display device according to this example. As shown in FIG. 6, in this modified example, the storage capacitor electrode 19 (or the storage capacitor bus line 18) is used as the reflecting plate, and further, circular reflecting plates 54 are separately provided in the pixel area. Each of the reflecting plates 54 is formed of the same formation material as the gate electrode or the source/drain electrode of the TFT 20, and is disposed to overlap with almost the center of the electrode unit 60 when viewed in the direction vertical to the substrate surface. Besides, the reflecting plate 54 is electrically in a float state. Although not shown, LUMISTY (trademark) of Sumitomo Chemical Co., Ltd. is used as the optical path control film 52.

EXAMPLE 1-2

Figure 7:
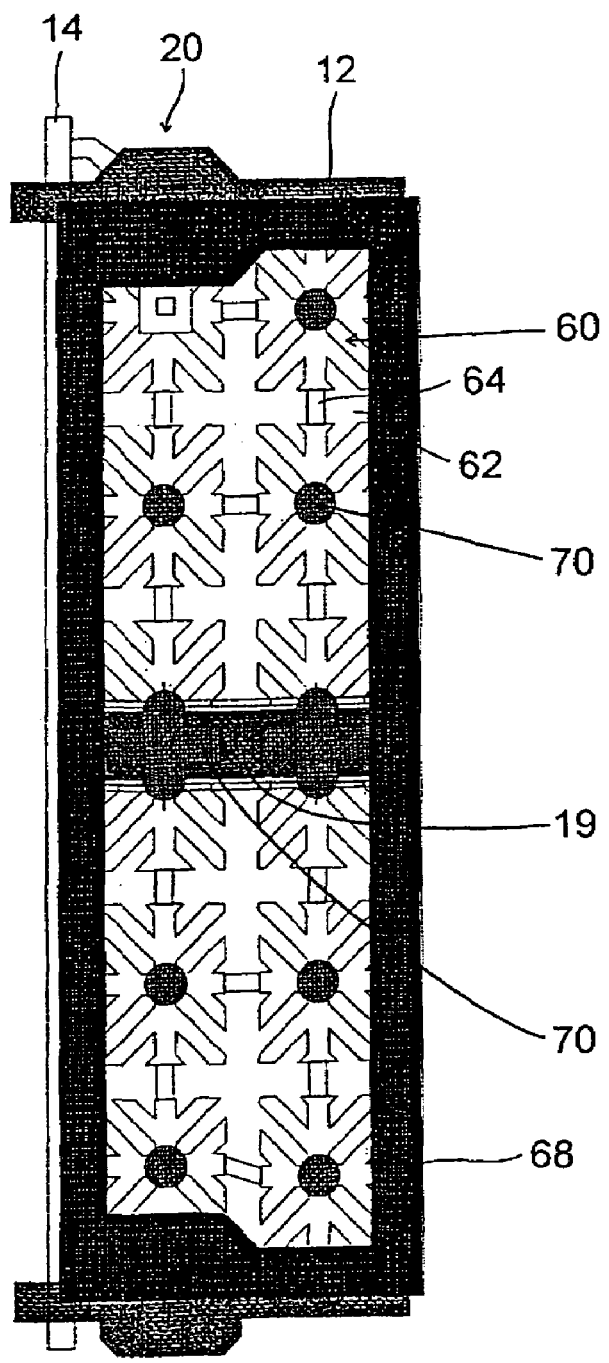
FIG. 7 is a view showing a structure of a liquid crystal display device according to example 1-2 of the first embodiment of the invention.
Figure 8:
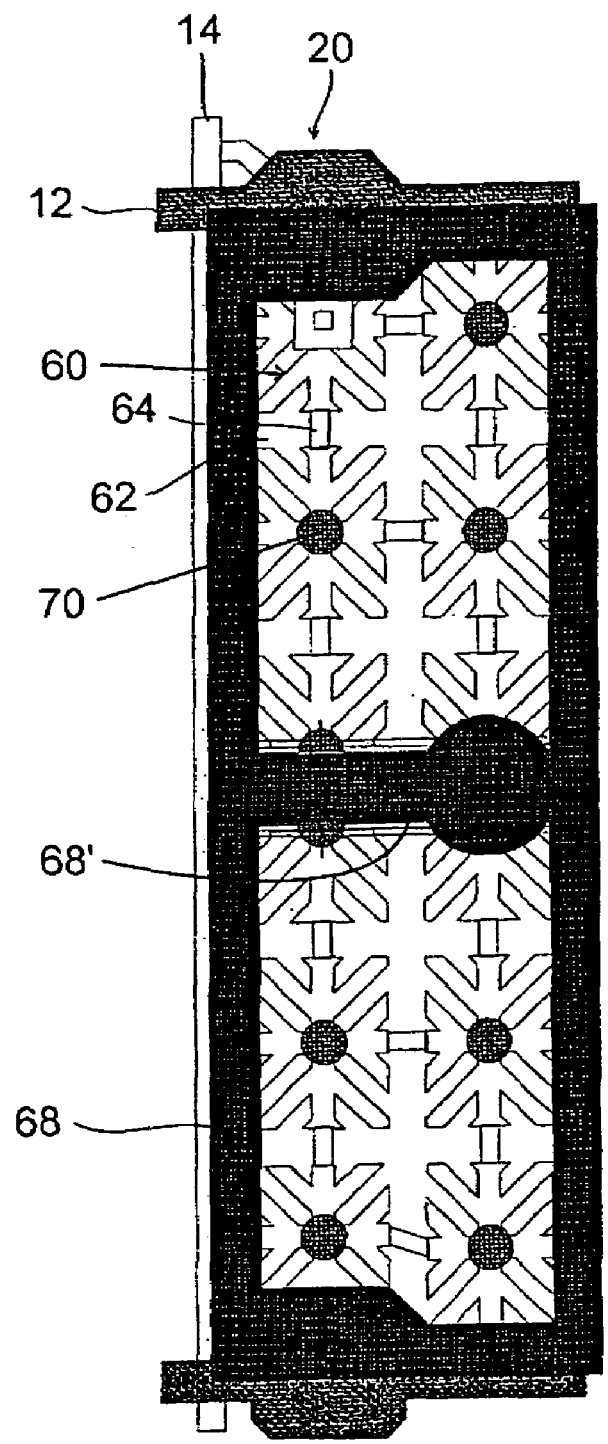
FIG. 8 is a view showing a structure of a conventional liquid crystal display device.

Next, a liquid crystal display device according to example 1-2 of this embodiment will be described with reference to FIGS. 7 to 9. FIG. 7 shows a structure of approximately one pixel of the liquid crystal display device according to this example. FIG. 8 shows a structure of a conventional liquid crystal display device for comparison with this example. Differently from the conventional liquid crystal display device, in this example, a BM 68' on a storage capacitor electrode 19 made of the same formation material as a source/drain electrode of a TFT 20 is not formed. Besides, in this example, a protrusion 70 for alignment control is provided at the opposite electrode side. The protrusion 70 is disposed almost at the center of an electrode unit 60. Besides, the protrusion 70 on the storage capacitor electrode 19 is formed to be cross-shaped. By this, alignment division of liquid crystal is performed on the storage capacitor electrode 19 used as the reflecting plate, and the reflective display excellent in viewing angle characteristics can be realized.

Figure 9:
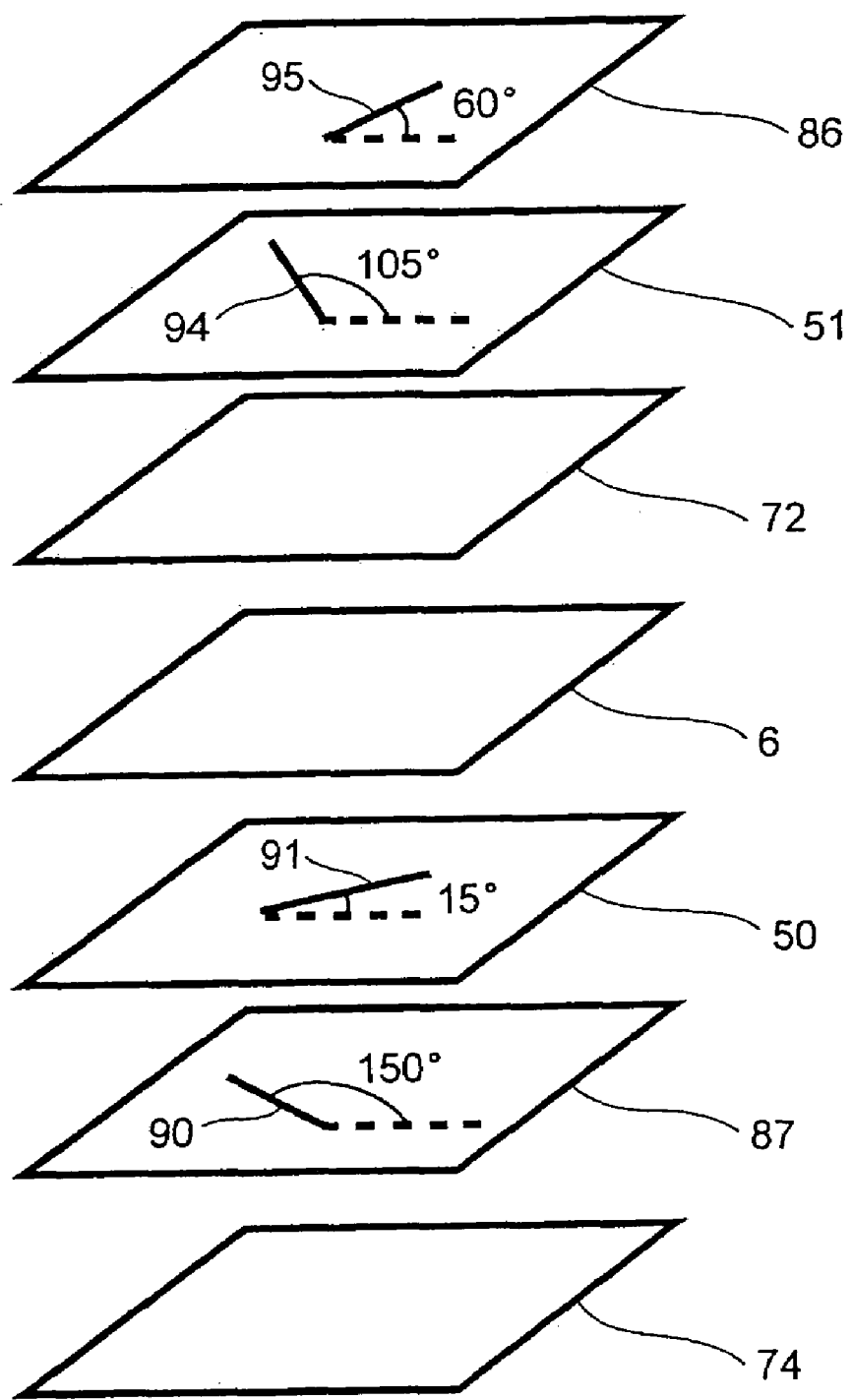
FIG. 9 is a view showing an arrangement of a polarizing plate and the like of the liquid crystal display device according to the example 1-2 of the first embodiment of the invention.

FIG. 9 shows an arrangement of a polarizing plate and the like of the liquid crystal display device according to this example. As shown in FIG. 9, a polarizing plate (for example, SEG 1425, AG 150) 86 and a polarizing plate (for example, SEG 1425) 87, which are disposed in crossed Nicols, are disposed at both sides of a liquid crystal layer 6. A quarter-wave plate 51 is disposed between the liquid crystal layer 6 and the polarizing plate 86. Besides, a quarter-wave plate 50 is disposed between the liquid crystal layer 6 and the polarizing plate 87. For example, an ARTON film having an in-plane phase difference of 140 nm is used for each of the quarter-wave plates 50 and 51. A TAC film 72 having a negative phase difference is disposed between the liquid crystal layer 6 and the quarter-wave plate 51 in order to improve viewing angle characteristics. Besides, an optical film 74 of PCF 350 or the like is disposed at the outer side of the polarizing plate 87. Incidentally, an upper part in the drawing is the observer side, and a lower part in the drawing is the optical source side.

An angle between an optical axis (phase-lag axis) 91 of the quarter-wave plate 50 and an absorption axis 90 of the polarizing plate 87 is approximately 45°. That is, when light emitted from a light source is transmitted through the polarizing plate 87 and the quarter-wave plate 50 in this order, it becomes a circularly polarized light. Besides, an angle between an optical axis 94 of the quarter-wave plate 51 and an absorption axis 95 of the polarizing plate 86 is approximately 45°. The optical axes 91 and 94 of both the quarter-wave plates 50 and 51 are almost orthogonal to each other. In order to realize the symmetry of viewing angles and to optimize viewing angle characteristics in the vertical and horizontal directions with respect to the display screen, the polarizing plates 86 and 87 and the quarter-wave plates 50 and 51 are disposed as described below.

The absorption axis 90 of the polarizing plate 87 is disposed in the counterclockwise direction of 150° with reference to the right part of the display screen. The optical axis 91 of the quarter-wave plate 50 is disposed in the counterclockwise direction of 15° with reference to the right part of the display screen. The optical axis 94 of the quarter-wave plate 51 is disposed in the counterclockwise direction of 105° with reference to the right part of the display screen. The absorption axis 95 of the polarizing plate 86 is disposed in the counterclockwise direction of 60° with reference to the right part of the display screen.

EXAMPLE 1-3

Next, a liquid crystal display device according to example 1-3 of this embodiment will be described with reference to FIG. 10. In the above examples, the same voltage is applied in both the reflection type and the transmission type. However, while light is transmitted only once in the transmission area, light is transmitted twice in the reflection area to go and return. Thus, the optical effect in the reflection area is twice that in the transmission area, and for example, when white is displayed in the transmission area, the reflection area takes on a ting of yellow. In the transmission area, since the reflection area is concealed by the storage capacitor electrode 19 and is not seen, there is no problem. However, in the reflective display, the phenomenon of taking on a tinge of yellow becomes a problem. Thus, in this example, when the reflective display is performed, the driving voltage is lowered.

Figure 10:
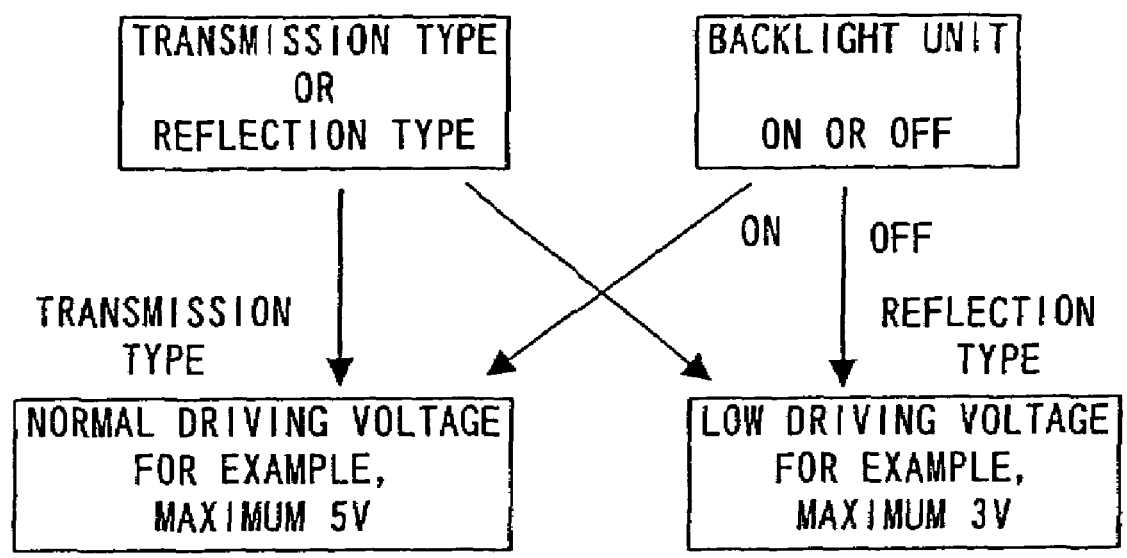
FIG. 10 is a block diagram showing a driving method of a liquid crystal display device according to example 1-3 of the first embodiment of the invention.

FIG. 10 is a block diagram showing a driving method of the liquid crystal display device according to this example. With respect to a changeover between the transmission type and the reflection type, there is a case where it is performed by the user and a case where it is performed in synchronization with ON/OFF of the backlight unit, and FIG. 10 shows both the cases. In the case where the liquid crystal display device is used as the transmission type, a maximum driving voltage is made, for example, 5 V equal to a normal driving voltage, and in the case where it is used as the reflection type, the maximum driving voltage is made, for example, 3 V lower than the normal driving voltage. These driving voltages are selected so that when the same gradation is displayed, $\Delta n$ in the reflection type becomes almost half of $\Delta n$ in the transmission type. Besides, when only the voltage adjustment is performed, gradation characteristics become different between the transmissive display and the reflective display. Thus, the relation between the gradation and the applied voltage is suitably adjusted, so that the gradation characteristics become the same between the transmissive display and the reflective display.

EXAMPLE 1-4

Figure 11:
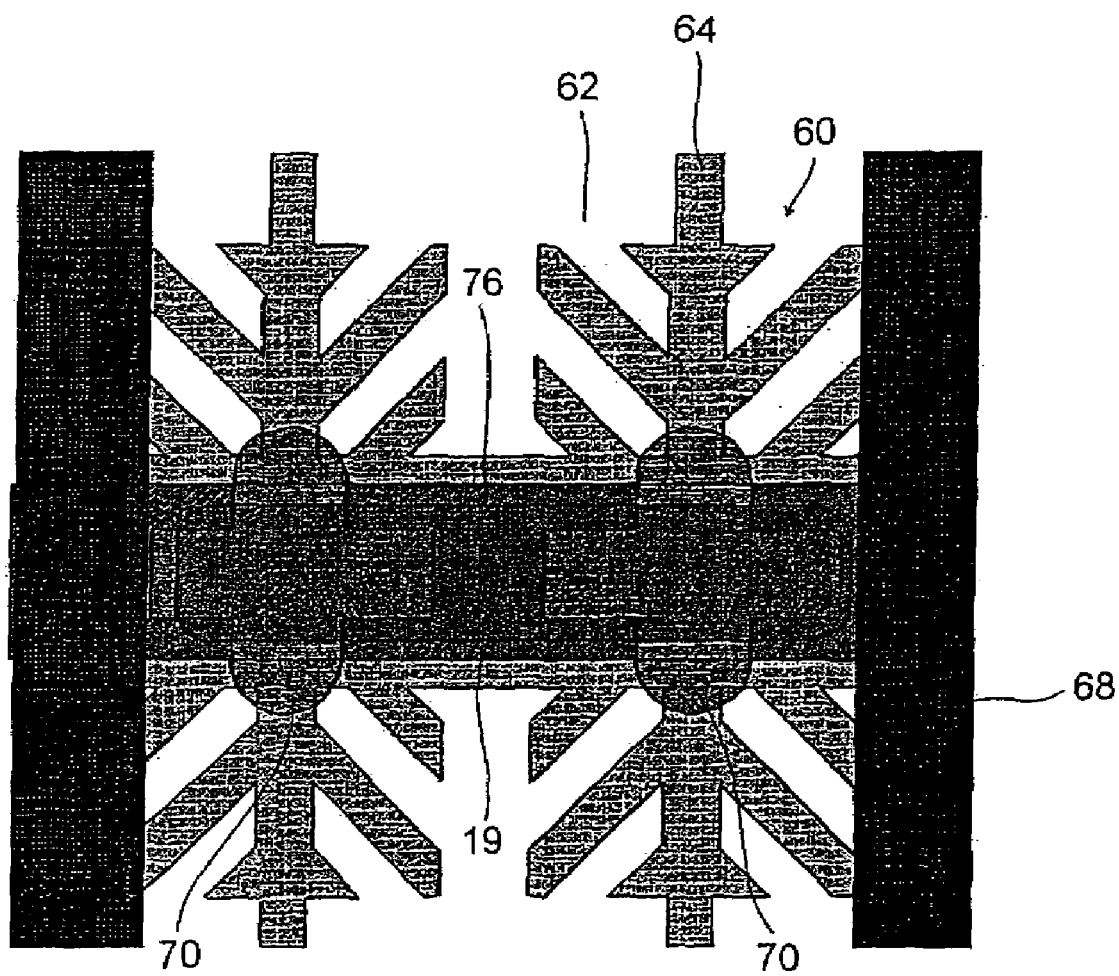
FIG. 11 is a view showing a structure of a liquid crystal display device according to example 1-4 of the first embodiment of the invention.
Figure 12:
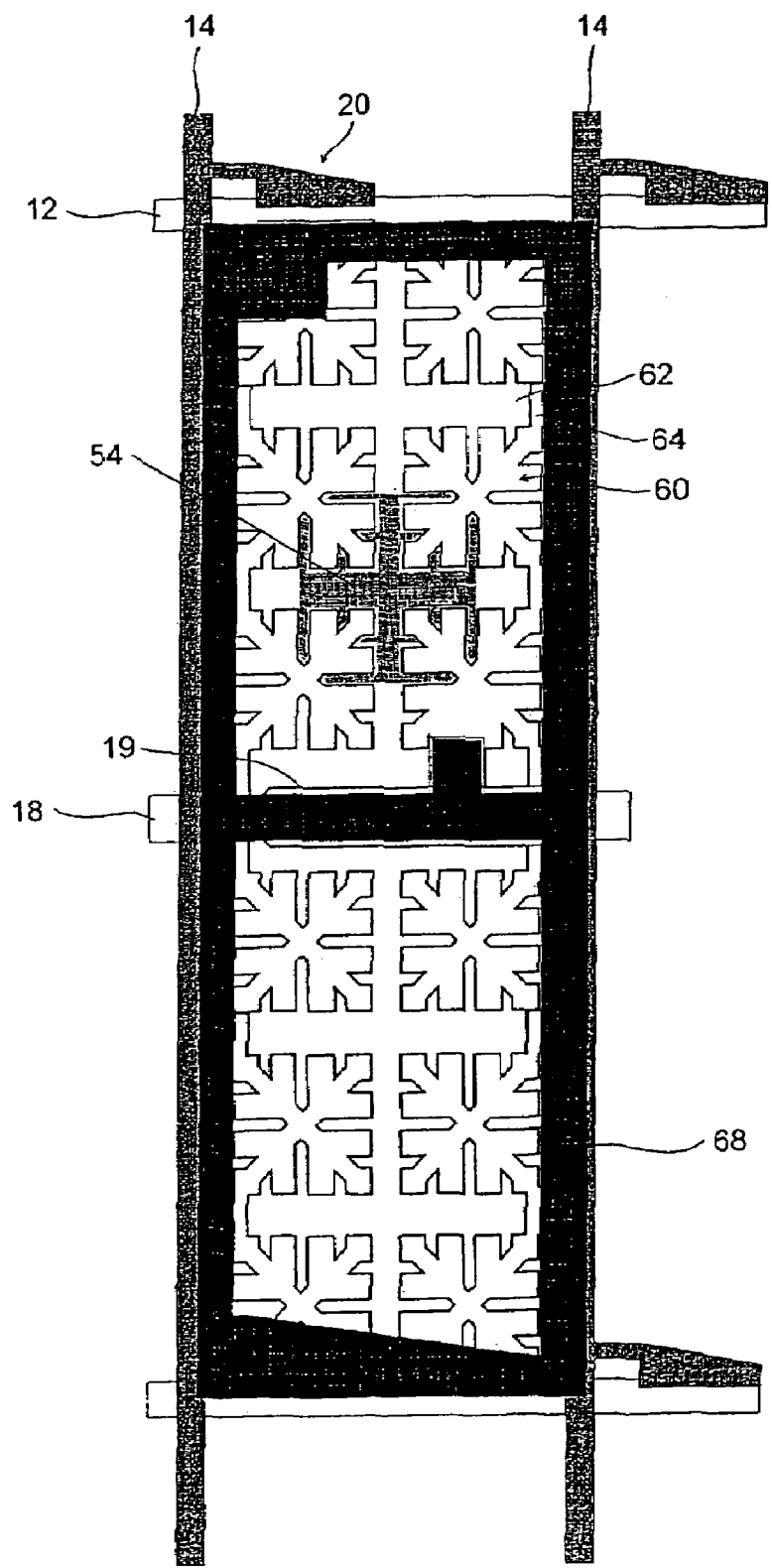
FIG. 12 is a view showing a modified example of the structure of the liquid crystal display device according to the example 1-4 of the first embodiment of the invention.

Next, a liquid crystal display device according to example 1-4 of this embodiment and a method of manufacturing the same will be described with reference to FIG. 11 and FIG. 12. FIG. 11 shows a structure of a part of a pixel of the liquid crystal display device according to this example. As shown in FIG. 11, an opening part (contact hole) 76 in which a protective film (not shown) is opened is formed in most of the portion on a storage capacitor electrode 19 made of a lamination film in which films of aluminum (Al) and titanium (Ti) are grown in this order. In the opening part 76, the Ti layer of the upper layer of the storage capacitor electrode 19 is also removed by etching, and the surface of the Al layer of the lower layer is exposed as the reflecting surface. Besides, an electrode unit 60 (pixel electrode 16 or a connection electrode 64 in FIG. 11) formed on the protective film is electrically connected to the storage capacitor electrode 19 through the opening part 76.

The storage capacitor electrode 19 and the opening part 76 are formed as described below. An Al layer and a Ti layer are grown in this order on an insulating film formed on the whole surface on gate bus lines and storage capacitor bus lines, and a lamination film is formed. Next, the lamination film is patterned into a specified shape, and the storage capacitor electrode 19 is formed. Next, a protective film as an insulating layer is formed on the storage capacitor electrode 19 and on the whole substrate surface. Next, the protective film on the storage capacitor electrode 19 is removed to form the opening part 76, and subsequently, the Ti layer exposed through the opening part 76 is removed by etching. By this, the Al layer of the storage capacitor electrode 19 is exposed. Thereafter, a film of ITO is grown and is patterned, so that the pixel electrode 16 or the connection electrode 64 in FIG. 11 is formed so as to cover, for example, the exposed Al layer.

According to this example, the surface of the Al layer is exposed in most of the storage capacitor electrode 19 functioning as the reflecting plate. The reflectivity of Al is remarkably high as compared with Ti. Thus, the high reflectivity of Al can be used, and high display characteristics can be obtained at the time of the reflective display.

Next, a modified example of the structure of the liquid crystal display device according to this example will be described. In the structure as shown in FIG. 11, the ITO layer and the Al layer are in direct contact with each other. Thus, there arises a problem that there is a fear that corrosion due to a cell effect occurs. FIG. 12 shows the structure of the liquid crystal display device according to this modified example in which this problem does not arise. As shown in FIG. 12, in this modified example, when viewed in the direction vertical to the substrate surface, a reflecting plate 54 is formed which does not overlap with an electrode unit 60 made of ITO and a connection electrode 64. The reflecting plate 54 is formed of the same formation material as the gate electrode of the TFT 20 or the same formation material as the source/drain electrode. Besides, the reflecting plate 54 is electrically in a float state. The reflecting plate 54 is formed in such a manner that for example, after the lamination film of the Al layer and the Ti layer is patterned, the Ti layer of the upper layer is removed in a process for forming the contact hole on the source electrode of the TFT 20 or on the storage capacitor electrode 19. Accordingly, the reflecting surface of the reflecting plate 54 is formed of the Al layer. In this modified example, it is possible to prevent the ITO layer and the Al layer from reacting with each other. The liquid crystal on the reflecting plate 54 is driven by an oblique electric field from the electrode unit 60.

As described above, according to this embodiment, the transreflective type liquid crystal display device which can perform the display in both the transmission and reflection modes can be manufactured by using almost the same manufacture process as the transmission type liquid crystal display device. By this, the inexpensive transreflective type liquid crystal display device can be realized without raising the manufacture cost.

Second Embodiment

Next, a liquid crystal display device according to a second embodiment of the invention will be described with reference to FIGS. 13 to 31. A transreflective type (reflective and transmissive type) liquid crystal display device performs a reflective display using outside light in a bright place, and performs a transmissive display using a backlight unit in a dark place. In the reflection type liquid crystal display device, the display is hard to see in the dark place, and in the transmission type liquid crystal display device, the display is hard to see in the bright place. In the transreflective type liquid crystal display device, since an easily viewable display can be selected in places different in brightness, it is widely used for a portable information terminal and the like.

In the reflection type liquid crystal display device, when a reflecting film (reflecting electrode) is made to have a flat mirror surface, a display becomes bright in a regular reflection area, and a display becomes dark in other areas. Thus, the dependency on viewing angles is high and the display comes to have a metallic luster. Then, there is known a technique in which unevenness having dot-like plane shape is formed on the surface of the reflecting film, so that reflected light is diffused, and a display having no metallic luster is realized (for example, see patent document 4). In the above reflection type liquid crystal display device, since the reflecting surfaces are directed in random directions, in the case where light is incident from all directions, it is reflected to the observer side at high efficiency, and a bright display can be obtained. However, in the case where light is incident from a specified direction as in an indoor place, there arises a problem that the use efficiency of light is low, and the display becomes dark.

Figure 13:
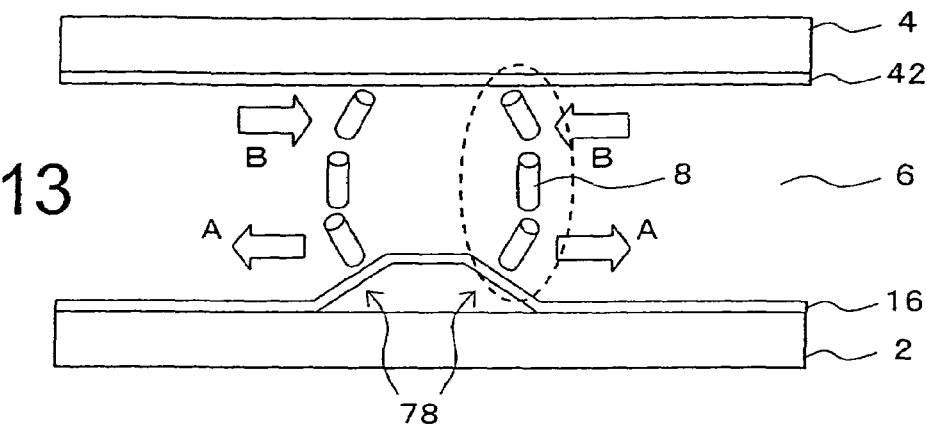
FIG. 13 is a sectional view showing a structure of a liquid crystal display device as the premise of a second embodiment of the invention.
Figure 14:
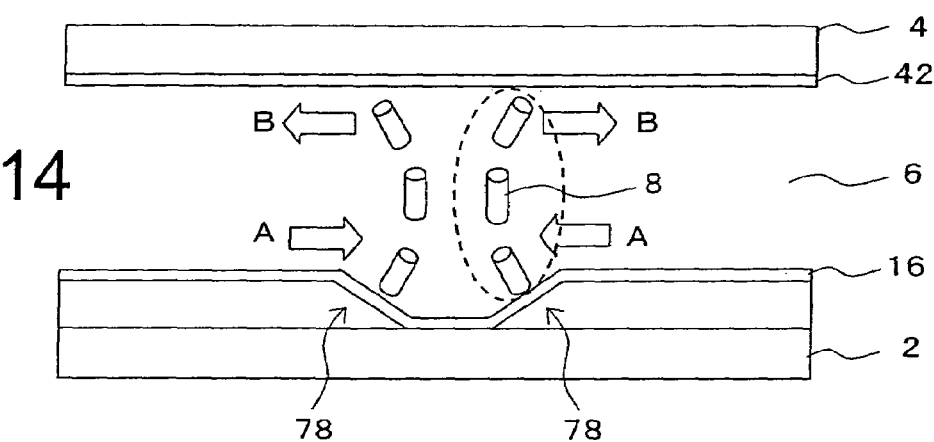
FIG. 14 is a sectional view showing a structure of the liquid crystal display device as the premise of the second embodiment of the invention.

In the transmission type liquid crystal display device, there is known a technique in which an alignment controlling inclination part is formed on at least one of transparent electrodes by partially upraising or caving a contact surface with a liquid crystal layer, and the alignment of the liquid crystal is controlled by the alignment controlling inclination part (for example, see patent document 5). In the above transmission type liquid crystal display device, as shown in FIGS. 13 and 14, since the alignment direction (indicated by an arrow A) of a liquid crystal molecule 8 by an alignment controlling inclination part 78 and the alignment direction (indicated by an arrow B) of a liquid crystal molecule 8 by an electric field distortion become opposite to each other, there arises a problem that the alignment of the liquid crystal 6 does not become stable, poor alignment occurs, and the transmissivity is lowered.

In the transreflective type liquid crystal display device, there is known a technique in which a reflection part and a transmission part are divided and are constructed in one pixel, and the electrode surface of the reflection part is formed into a continuous corrugate shape (for example, see patent document 6). In the above transreflective type liquid crystal display device, in addition to the problem arising in the foregoing reflection type liquid crystal display device, there arises a problem that since the alignment direction of the liquid crystal can not be divided in a pixel, viewing angle characteristics especially in the transmission part are lowered.

An object of this embodiment is to provide a liquid crystal display device which can obtain excellent display characteristics in both the transmission and reflection modes.

This embodiment is characterized in that in a transreflective type liquid crystal display device, a linear protrusion (protrusion column whose plane shape is constituted by straight lines) as an alignment controlling structure is provided on a transparent electrode of one substrate, and a reflecting film is selectively formed on a surface including an inclined surface of the linear protrusion. Here, as long as the plane shape is formed of the straight lines, the alignment controlling structure may be a frame-like protrusion, not the linear protrusion (the same applies to a hollow described below). When the vertical alignment is selected as the alignment state of liquid crystal, there does not occur such a state that a liquid crystal anchored on a substrate interface at the time of black display is not switched and remains. Thus, a contrast ratio becomes high, and an easily viewable display can be realized. Besides, a linear protrusion is provided on a transparent electrode of a substrate at a backlight unit side and a reflecting film is selectively formed on the linear protrusion surface, so that light incident from a front direction and an oblique direction can be efficiently reflected toward the observer side by using the inclined surface of the linear protrusion. Further, loss of transmissivity can be suppressed to the minimum by causing an area above the linear protrusion to become a reflection area. Besides, since the thickness of the liquid crystal layer is different between the reflection area and the transmission area, it becomes possible to match gradation characteristics of the reflective display and the transmissive display.

Besides, this embodiment is characterized in that a hollow linearly extending on one substrate is provided, and a reflecting film is selectively formed on a surface including an inclined surface of the hollow. That is, the alignment direction of the liquid crystal is controlled by the hollow instead of the linear protrusion. Although the sectional shape and the thickness of the liquid crystal layer in the reflection area become opposite to those in the case of the linear protrusion, a similar effect to the linear protrusion can be expected.

Figure 15:
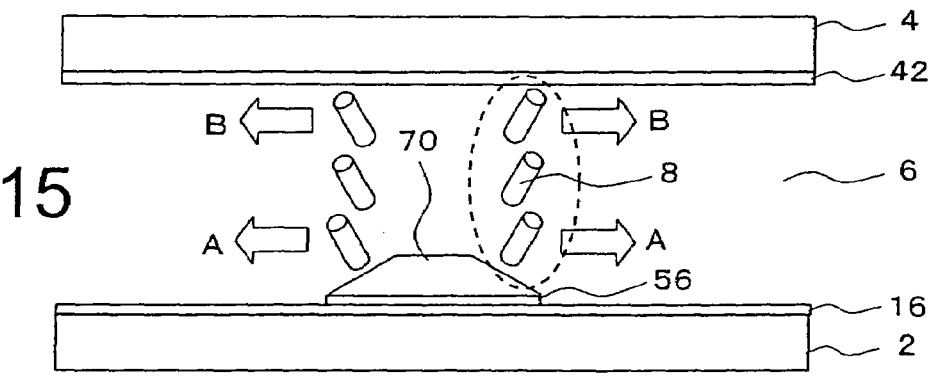
FIG. 15 is a sectional view showing a structure of a liquid crystal display device according to the second embodiment of the invention.

Further, this embodiment is characterized in that a linear protrusion is provided on a transparent electrode of one substrate, and a reflecting film is selectively formed as an under layer of the linear protrusion. FIG. 15 is a sectional view of a liquid crystal display device having the above structure. As shown in FIG. 15, a reflecting film 56 is formed as an under layer of a linear protrusion 70. Since the linear protrusion 70 acts as a dielectric, an alignment direction (indicated by an arrow A) of a liquid crystal molecule 8 by an inclined surface of the linear protrusion 70 is coincident with an alignment direction of a liquid crystal molecule 8 by an electric field distortion, and the alignment of the liquid crystal 6 becomes more stable.

Further, this embodiment is characterized in that an alignment controlling structure such as a linear protrusion or a hollow is formed to extend in a direction inclined by 45° with respect to an end side of a pixel electrode, a direction substantially parallel thereto or a direction substantially orthogonal thereto. By this, light incident from these directions can be efficiently reflected toward the observer side.

Besides, this embodiment is characterized in that a reflecting film and a transparent electrode are electrically separated from each other. For example, when a voltage is enabled to be applied to only the reflecting film at the time of reflective display, and a voltage is enabled to be applied to only the transparent electrode at the time of transmissive display, an oblique electric field can be generated at boundary part between a transmission area T and a reflection area R, and the alignment direction of the liquid crystal can be uniformly made the direction orthogonal to the boundary part. Besides, the reflecting film and the transparent electrode different in ionization tendency can be insulated from each other, and deterioration due to electrical corrosion can also be prevented.

Figure 16:
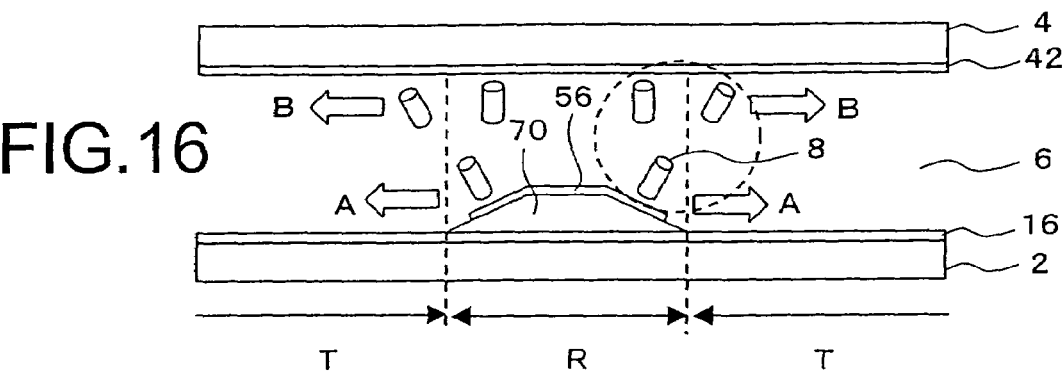
FIG. 16 is a sectional view showing a structure of the liquid crystal display device according to the second embodiment of the invention.
Figure 17:
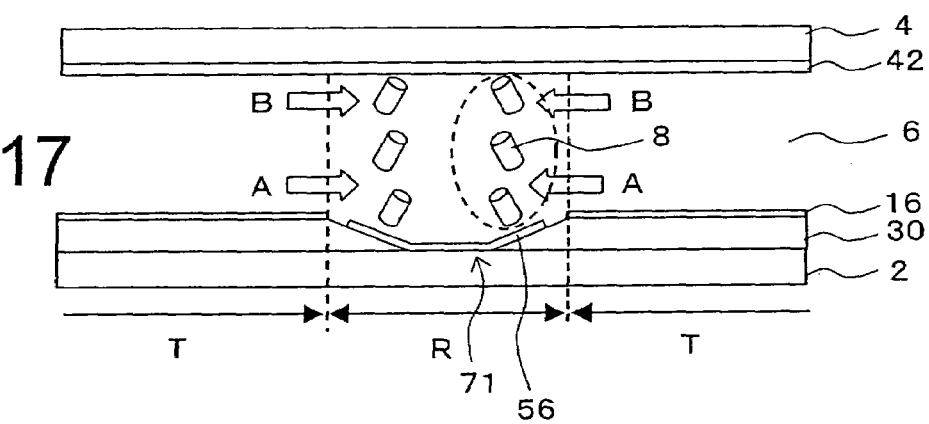
FIG. 17 is a sectional view showing a structure of the liquid crystal display device according to the second embodiment of the invention.

FIGS. 16 and 17 are sectional views of liquid crystal display devices having the above structure. FIG. 16 shows a state where a voltage is applied to a pixel electrode 16, and a voltage is not applied to a reflecting film 56 on a linear protrusion 70. FIG. 17 shows a state where a voltage is applied to a reflecting film 56 on a hollow 71 and a voltage is not applied to a pixel electrode 16. As shown in FIGS. 16 and 17, the alignment direction (indicated by an arrow A) of a liquid crystal molecule 8 by the inclined surface of the linear protrusion 70 or the hollow 71 is coincident with the alignment direction (indicated by an arrow B) of a liquid crystal molecule 8 by electric field distortion, and the alignment of the liquid crystal 6 becomes more stable.

Figure 18:
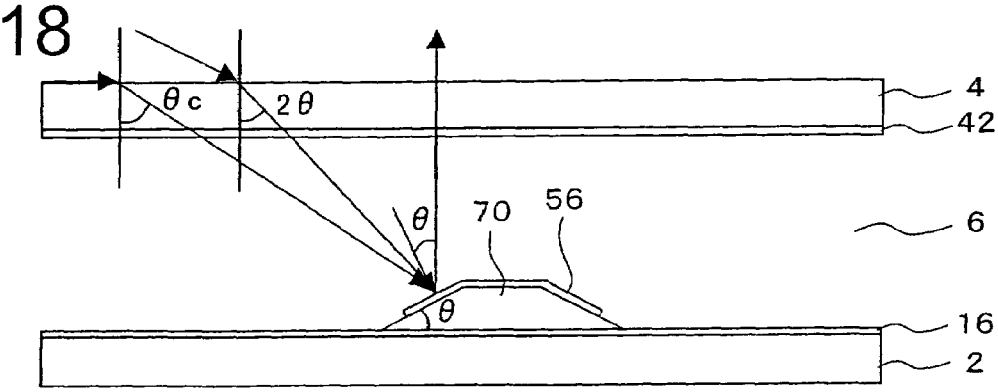
FIG. 18 is a sectional view showing a structure of the liquid crystal display device according to the second embodiment of the invention.

Further, this embodiment is characterized in that a range of an average inclination angle of an inclined surface of the alignment controlling structure with respect to the substrate surface is made not less than approximately 0° and less than 20°. FIG. 18 shows a relation between light outgoing in the front direction and an average inclination angle θ of an inclined surface of the reflecting film 56. Although the light reflected in the front direction by the inclined surface of the reflecting film 56 is incident in an oblique direction, the incident angle depends on the inclination angle of the inclined surface. The refractive index of a member constituting the transreflective type liquid crystal display device is approximately 1.5, and the maximum incident angle θc of the light incident on the reflecting film 56 becomes approximately 40° by Snell's law. Since the incident light is mirror reflected at the reflecting film 56, in order to reflect the light incident at an incident angle of from 0° to 40° toward the front direction, it is necessary that the inclination angle of the inclined surface is not less than 0° and less than 20°. However, since the inclination angle of the inclined surface is continuously changed, when the average inclination angle indicating the average value of the inclination angle distribution is in this range, obliquely incident light can be efficiently reflected in the front direction.

Figure 19:
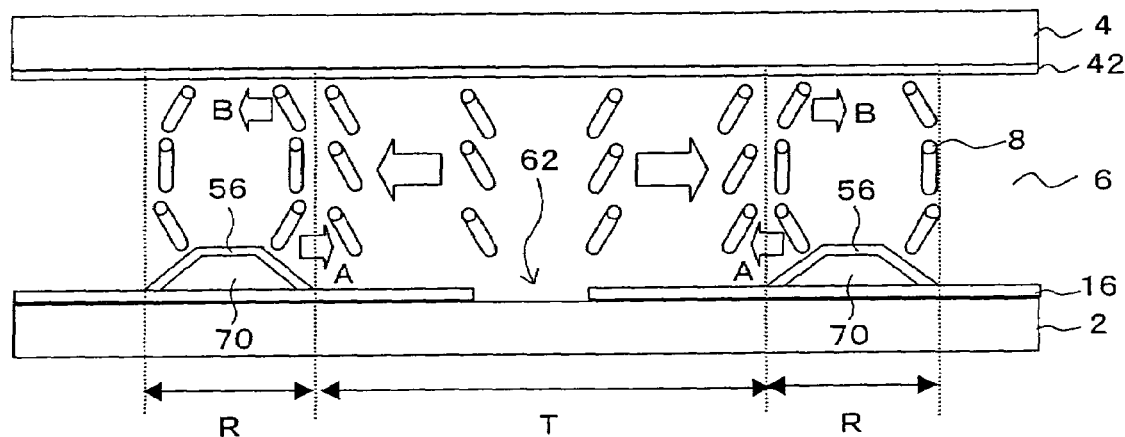
FIG. 19 is a sectional view showing a structure of the liquid crystal display device according to the second embodiment of the invention.

Further, this embodiment is characterized in that another alignment controlling structure (third alignment controlling structure) is formed in a gap part of alignment controlling structures extending in parallel with each other on one substrate. FIG. 19 is a sectional view of a liquid crystal display device having the above structure. As shown in FIG. 19, when a reflecting film 56 is electrically connected to a pixel electrode 16, the reflecting film 56 and the linear protrusion 70 function as a conductive protrusion. In this case, as described above, since the alignment direction of the liquid crystal molecule 8 by the inclined surface and the alignment direction of the liquid crystal molecule 8 by the electric field distortion become opposite to each other, the alignment of the liquid crystal 6 does not become stable, and poor alignment occurs. Then, a slit 62 is formed in the gap part between the adjacent linear protrusions 70. By this, an alignment controlling force is made to exert in the substrate plane direction, and the liquid crystal alignment on the reflecting film 56 and the linear protrusion 70 is aligned in the direction due to the electric field distortion. Incidentally, the alignment controlling structure in which the reflecting film 56 is not formed on the upper layer functions as a dielectric. Thus, the alignment direction of the liquid crystal molecule 8 by the inclined surface is coincident with the alignment direction of the liquid crystal molecule 8 by the electric field distortion, and the alignment of the liquid crystal 6 becomes stable.

Figure 20:
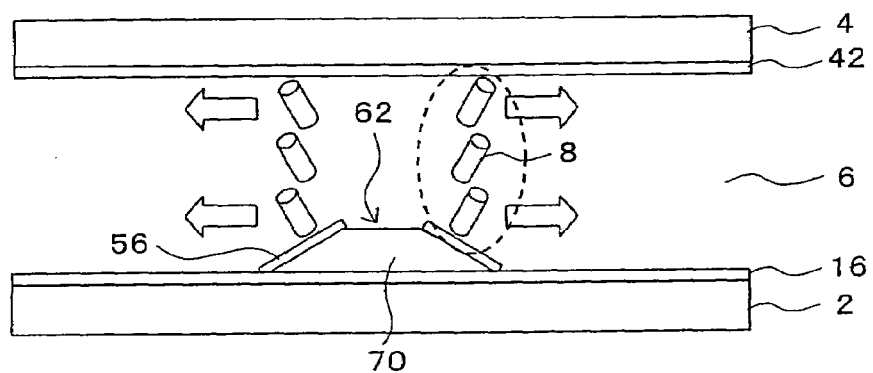
FIG. 20 is a sectional view showing a structure of the liquid crystal display device according to the second embodiment of the invention.
Figure 21:
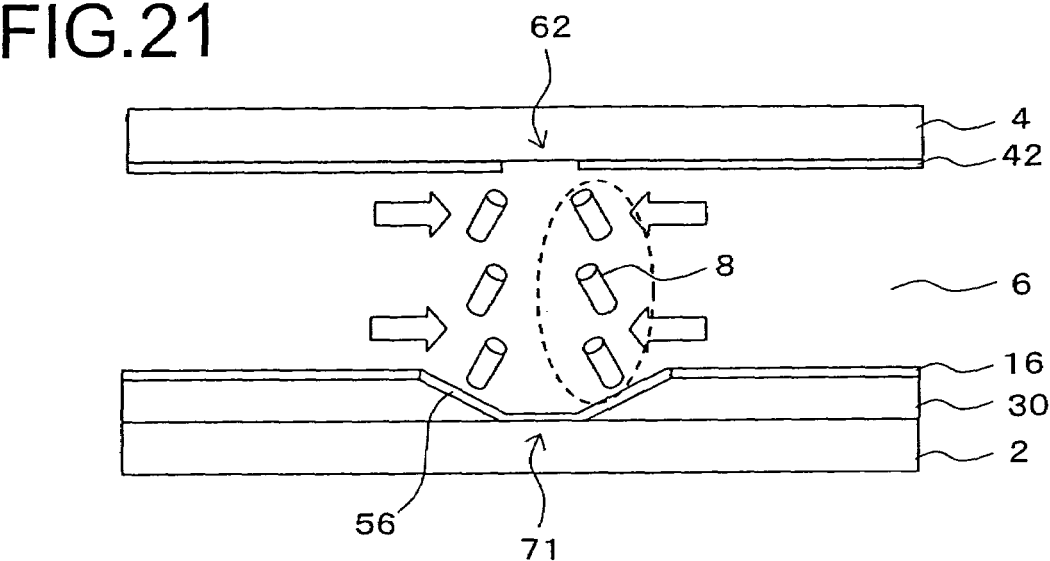
FIG. 21 is a sectional view showing a structure of the liquid crystal display device according to the second embodiment of the invention.

Besides, this embodiment is characterized in that a slit obtained by removing a part of a reflecting film on an alignment controlling structure is formed. FIG. 20 is a sectional view of a liquid crystal display device having the above structure. As shown in FIG. 20, a reflecting film 56 on an almost flat surface of a linear protrusion 70 is removed, and a slit 62 is formed. Further, this embodiment is characterized in that another alignment controlling structure (second alignment controlling structure) is formed on the other substrate in an area opposite to an alignment controlling structure through a liquid crystal. FIG. 21 is a section view of a liquid crystal display device having the above structure. As shown in FIG. 21, a slit 62 is formed on an opposite substrate 4 in an area opposite to a hollow 71. An alignment controlling force is made to exert in a substrate vertical direction by the slit 62, and liquid crystal alignment on the reflecting film 56 and the linear protrusion 70, or on the reflecting film 56 and the hollow 71 is made uniform in the direction due to the electric field distortion. By this, the alignment of the liquid crystal 6 becomes stable.

Figure 22:
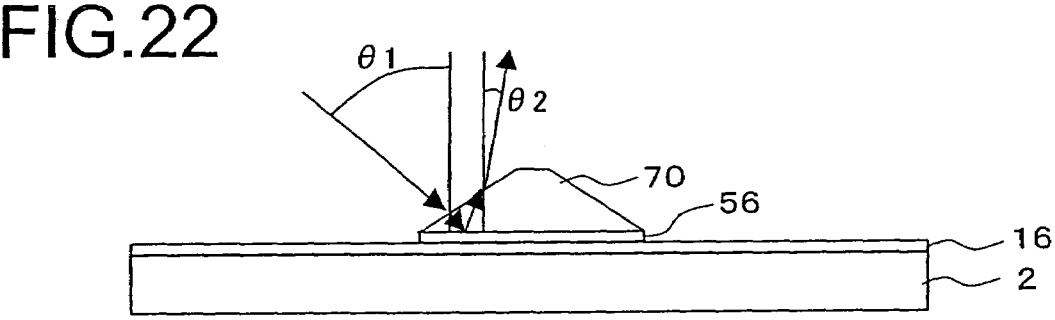
FIG. 22 is a sectional view showing a structure of the liquid crystal display device according to the second embodiment of the invention.

Further, this embodiment is characterized in that a linear protrusion has a convex sectional shape, and is formed of a transparent material having a refractive index larger than liquid crystal. FIG. 22 is a partial sectional view of a liquid crystal display device having the above structure. As shown in FIG. 22, a reflecting film 56 is formed as an under layer of a linear protrusion 70. The linear protrusion 70 has a convex (trapezoidal) sectional shape and is formed of a transparent resin having a refractive index larger than the liquid crystal 6.

Figure 23:
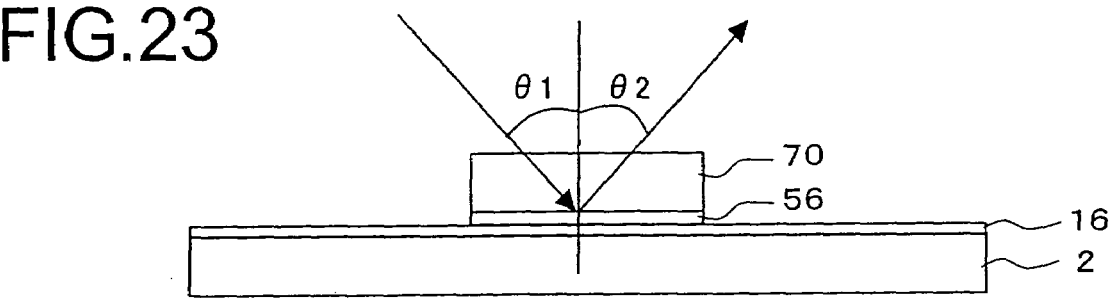
FIG. 23 is a view for explaining the liquid crystal display device according to the second embodiment of the invention.
Figure 24:
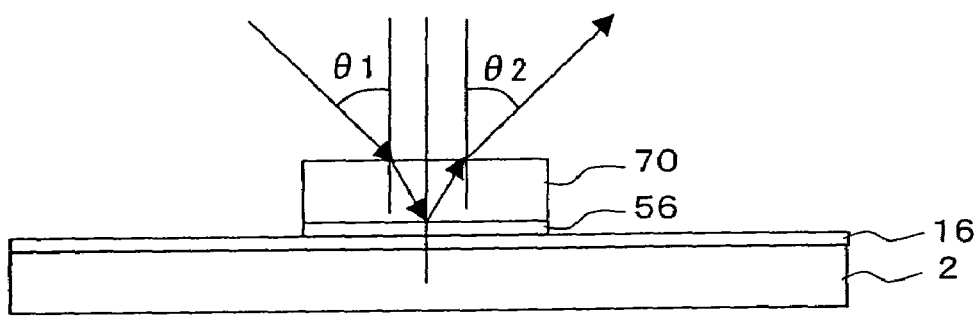
FIG. 24 is a view for explaining the liquid crystal display device according to the second embodiment of the invention.

FIG. 23 is a sectional view of a liquid crystal display device in which a linear protrusion 70 has a rectangular sectional shape, and is formed of transparent resin having almost the same refractive index as the liquid crystal 6. FIG. 24 is a sectional view of a liquid crystal display device in which a linear protrusion 70 has a rectangular sectional shape and is formed of transparent resin having a refractive index larger than the liquid crystal 6. As shown in FIGS. 23 and 24, in the case where the sectional shape of the linear protrusion 70 is rectangular, irrespective of the refractive index of the formation material, an incident angle $\theta 1$ and an outgoing angle $\theta 2$ become almost equal to each other, and mirror reflection is obtained. On the other hand, as shown in FIG. 22, in the case where the linear protrusion 70 has the convex sectional shape and is formed of transparent resin having the refractive index larger than the liquid crystal 6, an outgoing angle $\theta 2$ with respect to the reflecting film 56 becomes smaller than an incident angle $\theta 1$ with respect to the reflecting film 56. Accordingly, light incident from an oblique direction is reflected in the front direction.

Hereinafter, a description will be given of specific examples.

EXAMPLE 2-1

Figure 25:
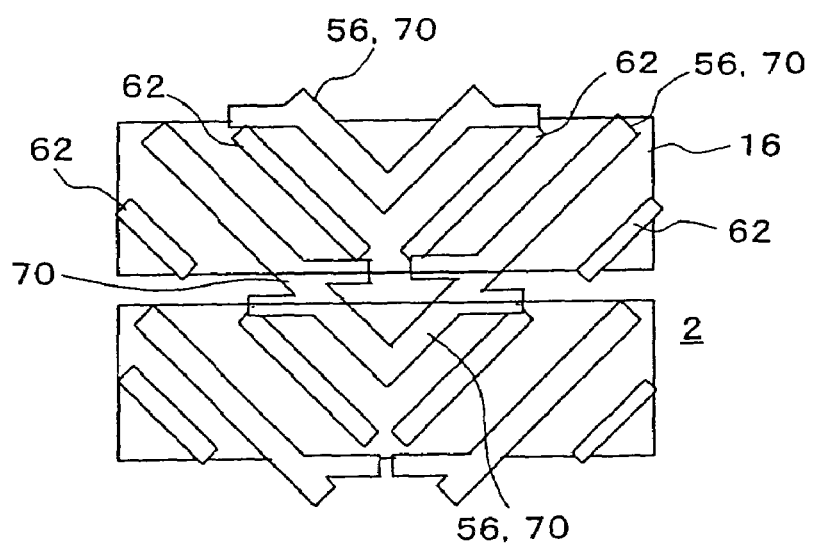
FIG. 25 is a view showing an arrangement of a reflecting protrusion of a liquid crystal display device according to example 2-1 of the second embodiment of the invention.
Figure 26:
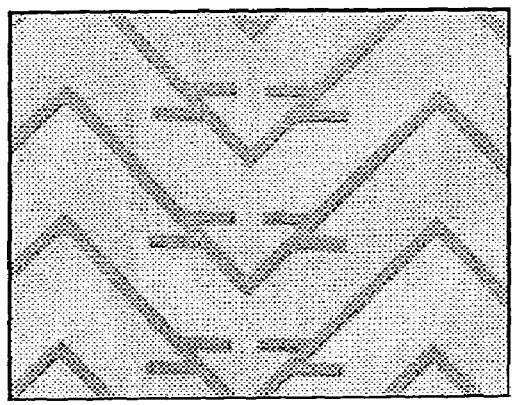
FIG. 26 is a photograph showing a structure of the liquid crystal display device according to the example 2-1 of the second embodiment of the invention.

A liquid crystal display device according to example 2-1 of this embodiment will be described with reference to FIGS. 25 to 31. FIG. 25 shows an arrangement of a reflecting protrusion of the liquid crystal display device according to this example. FIG. 26 is a photograph showing a structure of the liquid crystal display device according to this example. As shown in FIGS. 25 and 26, a linear protrusion 70 and a reflecting film 56 as its upper layer are formed as the reflecting protrusion on a TFT substrate 2. The linear protrusion 70 is formed on a pixel electrode 16 by using a resist (made by Shipley Far East Ltd.). The sectional shape of the linear protrusion 70 is convex, an average inclination angle is 8°, and a peak height is 1.5 μm. The linear protrusion 70 is formed almost in parallel with or inclined at an angle of 45° with respect to an end side of the pixel electrode 16. The reflecting film 56 is selectively formed on the linear protrusion 70. The reflecting film 56 is electrically independently formed in each pixel and is electrically connected to each pixel electrode 16. Besides, a slit 62 is formed in a gap part between the adjacent linear protrusions 70. Both the linear protrusion 70 and the slit 62 are formed on the TFT substrate 2.

Figure 27:
FIG. 27 is an alignment photograph when white is displayed in a reflection mode.
Figure 28:
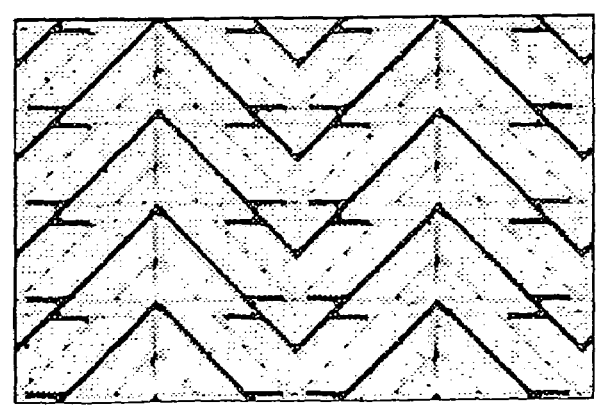
FIG. 28 is an alignment photograph when white is displayed in a transmission mode.

After the TFT substrate 2 and an opposite substrate 4 are formed, a vertical alignment film (made of JSR Corporation) is applied to both the substrates 2 and 4. Thereafter, a spacer (made by Sekisui Fine Chemical Co., Ltd.) with a bead diameter of 4.5 μm is scattered, and both the substrates 2 and 4 are bonded to each other to form a hollow panel. A liquid crystal (made by MERCK JAPAN LTD) having a negative dielectric anisotropy is injected into the hollow panel, and a liquid crystal display component is prepared. A right-handed circular polarizing plate (a polarizing plate and a quarter-wave plate) and a left-handed polarizing plate are bonded to both surfaces of the liquid crystal display component so that lag axes of quarter-wave plates are orthogonal to each other, and a transreflective type liquid crystal display device is fabricated. Alignment observation is made in both reflection and transmission display modes. FIG. 27 is an alignment photograph when white is display in the reflection mode, and FIG. 28 is an alignment photograph when white is displayed in the transmission mode. In the respective display modes, the occurrence of poor alignment is not seen. This is because the slit 62 is formed in the gap portion of the linear protrusions 70, the alignment controlling force exerts in the direction parallel to the substrate, and the alignment direction is stabilized.

Figure 29:
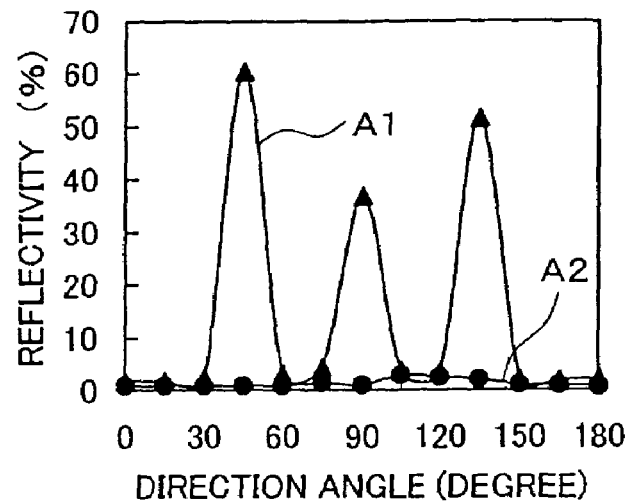
FIG. 29 is a graph showing a result of measurement of reflection characteristics of the liquid crystal display device according to the example 2-1 of the second embodiment of the invention.
Figure 30:
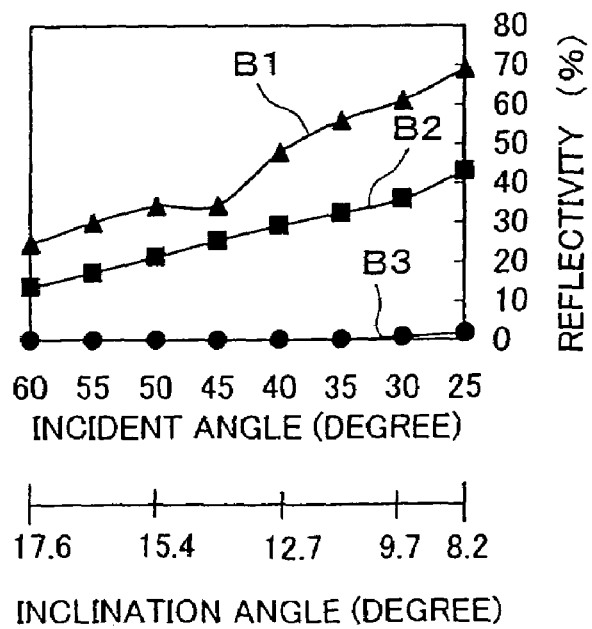
FIG. 30 is a graph showing a result of measurement of reflection characteristics of the liquid crystal display device according to the example 2-1 of the second embodiment of the invention.

FIGS. 29 and 30 are graphs showing results of measurement of reflection characteristics of the liquid crystal display device according to this example. FIG. 29 shows a change of reflectivity with respect to a change of a direction angle. The horizontal axis indicates the direction angle, and the vertical axis indicates the reflectivity. A line A1 indicates reflection characteristics of the liquid crystal display device according to this example, and a line A2 indicates reflection characteristics of a conventional liquid crystal display device in which an Al (aluminum) mirror reflecting film is formed. Light is incident from a direction of a polar angle of 30°, and is received in a direction of a polar angle of 0°. FIG. 30 shows a change of reflectivity with respect to a change of an incident angle (polar angle). The horizontal axis indicates the incident angle and the inclination angle of a corresponding inclined surface, and the vertical axis indicates the reflectivity. A line B1 indicates reflection characteristics when light is incident from a direction of a direction angle of 45° to the liquid crystal display device according to this example, and a line B2 indicates reflection characteristics when light is incident from a direction of a direction angle of 90° to the liquid crystal display device according to this example. A line B3 indicates reflection characteristics of the conventional liquid crystal display device in which the Al mirror reflecting film is formed.

As shown in FIG. 29, direction angle dependency occurs such that when light is incident from a direction of 45°, direction of 90° and direction of 135°, the reflectivity becomes high.

Besides, it has been found that as shown in FIG. 30, incident angle dependency occurs such that as the incident angle of light becomes small, the reflectivity becomes high, and even at a considerably large incident angle, light of 15 to 30% is reflected in the front direction. In this example, although the reflecting film 56 and the linear protrusion 70 are formed almost in parallel with or at an angle of 45° with respect to the end side of the pixel electrode 16, when the reflecting film 56 and the linear protrusion 70 are formed to be almost orthogonal to the end side of the pixel electrode 16, even if light is incident from a direction of 0° and a direction of 180°, the reflectivity can be made high.

Figure 31:
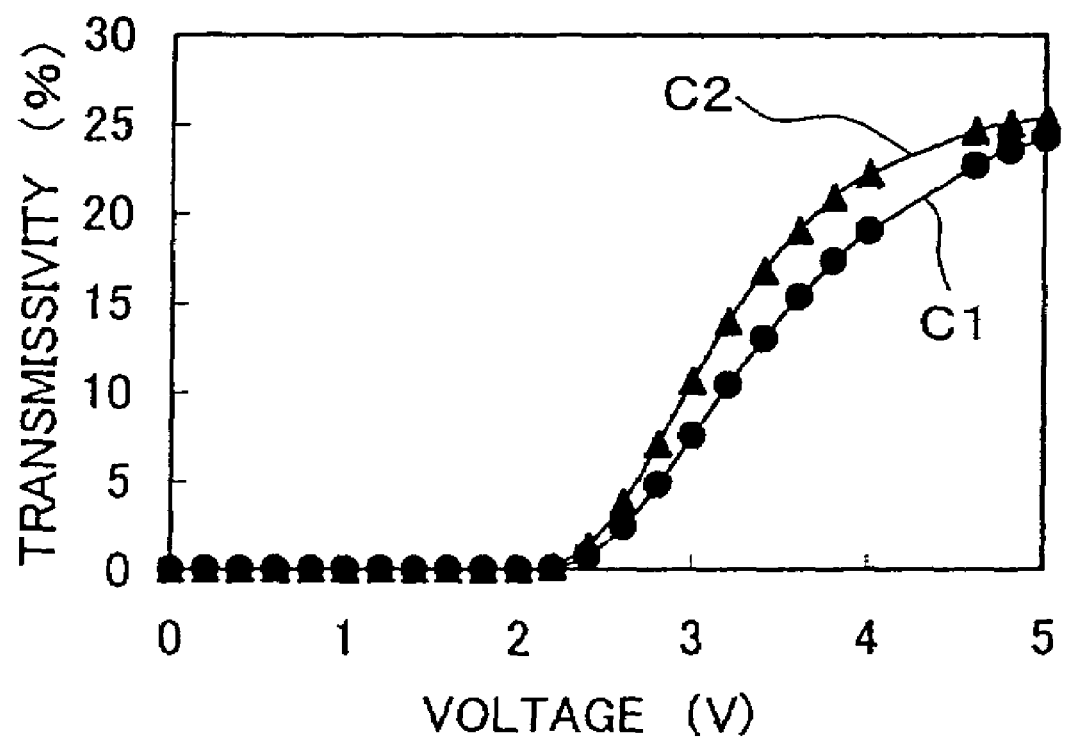
FIG. 31 is a graph showing a result of measurement of transmission characteristics of the liquid crystal display device according to the example 2-1 of the second embodiment of the invention.

FIG. 31 is a graph showing a result of measurement of transmission characteristics of the liquid crystal display device according to this example. The horizontal axis indicates the voltage, and the vertical axis indicates the transmissivity. A line C1 indicates transmission characteristics of the transreflective type liquid crystal display device according to this example, and a line C2 indicates transmission characteristics of a conventional transmission type liquid crystal display device in which the reflecting film 56 is not formed. Light is incident at a polar angle of 180°, and is received at a polar angle of 0°. As shown in FIG. 31, in the liquid crystal display device according to this example, since the reflecting film 56 is formed on the linear protrusion 70, as compared with the conventional transmission type liquid crystal display device, the transmissivity is lowered by the amount of light transmitted through the linear protrusion 70. However, the rate of lowering of the transmissivity is slight in the vicinity of a saturation voltage, and the transmission characteristics comparable to the transmission type liquid crystal display device are obtained. Accordingly, according to this example, it is possible to realize the transreflective type (minute reflection type) liquid crystal display device which can perform a reflective display while the lowering of transmission characteristics is suppressed.

EXAMPLE 2-2

Next, a liquid crystal display device according to example 2-2 of this embodiment will be described. In this example, instead of a part of the protrusion 70, a hollow 71 is formed, and a reflecting film 56 and a pixel electrode 16 are electrically separated from each other. Besides, a slit 62 is formed on an opposite electrode 4 of an area opposite to a gap portion between the adjacent protrusions 70 or hollows 71 through a liquid crystal 6. The liquid crystal display device similar to the example 2-1 except for the above is fabricated. The hollow 71 is formed using a resist so that a sectional shape is concave, an average inclination angle is 8°, and a peak height difference becomes 1.5 µm. Besides, a reflecting film 56 is formed on the protrusion 70 and the hollow 71 in such a manner that the film is electrically separated from the pixel electrode 16. Alignment observation is performed in both the reflection and transmission display modes. As a result, in the transmissive display in the vicinity of the protrusion 70, and in reflective display in the vicinity of the hollow 71, similarly to the alignment photographs shown in FIGS. 27 and 28, an alignment state without poor alignment is obtained. It has been confirmed that by electrically separating the reflecting film 56 on the protrusion 70 and the hollow 71 from the pixel electrode 16 and separately driving them, the alignment direction by the inclined surface of the protrusion 70 and the hollow 71 is coincident with the alignment direction by electric field distortion, and the alignment of the liquid crystal 6 becomes stable.

EXAMPLE 2-3

Next, a liquid crystal display device according to example 2-3 of this embodiment will be described. In this example, a slit 62 is formed in a reflecting film 56 on a protrusion 70. Besides, a slit 62 is formed on an opposite substrate 4 of an area opposite to a gap between the adjacent protrusions 70 through a liquid crystal 6, and a slit 62 is not formed on a TFT substrate 2 of a gap portion of the protrusions 70. The liquid crystal display device similar to the example 2-1 except for the above is fabricated. Alignment observation is performed in both the reflection and transmission display modes. As a result, in the respective display modes, similarly to the alignment photographs shown in FIGS. 27 and 28, an alignment state without poor alignment is obtained. It has been confirmed that since the slit 62 is formed in the reflecting film 56 on the protrusion 70, the alignment direction by the inclined surface of the protrusion 70 is coincident with the alignment direction by the electric field distortion, and the alignment of the liquid crystal 6 becomes stable.

EXAMPLE 2-4

Next, a liquid crystal display device according to example 2-4 of this embodiment will be described. In this embodiment, except that a reflecting film 56 on a hollow 71 is electrically connected to a pixel electrode 16, the liquid crystal display device is fabricated similarly to the example 2-2. Alignment observation is made in both the reflection and transmission display modes. As a result, in the respective display modes, similarly to the alignment photographs shown in FIGS. 27 and 28, the alignment state without poor alignment is obtained. It has been confirmed that since the slit 62 is formed on the opposite electrode 4 of the area opposite to the hollow 71 through the liquid crystal 6, the alignment direction by the inclined surface of the hollow 71 is coincident with the alignment direction by the electric field distortion, and the alignment of the liquid crystal 6 becomes stable.

EXAMPLE 2-5

Next, a liquid crystal display device according to example 2-5 of this embodiment will be described. In this example, a protrusion 70 having a convex sectional shape is formed using a transparent resin (made by JSR Corporation) with a refractive index of 1.7 larger than the refractive index of liquid crystal, and a reflecting film 56 is selectively formed as an under layer of the protrusion 70. Besides, a slit 62 is formed on an opposite substrate 4 in an area opposite to a gap portion between the adjacent protrusions 70 through a liquid crystal 6, and a slit 62 is not formed on a TFT substrate 2 in the gap portion between the protrusions 70. The liquid crystal display device similar to the example 2-1 except for the above is fabricated. Alignment observation is made in both the reflection and transmission display modes. As a result, in the respective display modes, similarly to the alignment photographs shown in FIGS. 27 and 28, the alignment state without poor alignment is obtained. The reflecting film 56 is selectively formed as the under layer of the protrusion 70, so that the protrusion 70 and the reflecting film 56 function as an insulating protrusion. Thus, it has been confirmed that the alignment direction by the inclined surface of the protrusion 70 is coincident with the alignment direction by the electric field distortion, and the alignment of the liquid crystal 6 becomes stable.

As described above, in the liquid crystal display device according to this embodiment, the bright reflective display can be realized with little loss of transmissivity, and the transmissive display with a wide viewing angle range can be realized. By this, it is possible to realize the liquid crystal display device having an easily viewable display in any places.

Third Embodiment

Next, a liquid crystal display device according to a third embodiment of the invention will be described.

In a vertical alignment type liquid crystal display device, a liquid crystal having a negative dielectric anisotropy is aligned in the vertical direction by using a vertical alignment film when no voltage is applied, and is aligned to be inclined when a voltage is applied. In the vertical alignment type liquid crystal display device, since the liquid crystal is aligned in the vertical direction when no voltage is applied, there are merits that black display quality is excellent, a display with high contrast is possible, a viewing angle is wide, and a response is quick.

In the vertical alignment type liquid crystal display device, as a method of performing the alignment control of liquid crystal, a method is proposed in which a plurality of electrode units each smaller than one pixel are provided in one pixel, and these are made pixel electrodes to constitute the one pixel.

For example, patent document 7 discloses a method of forming a solid electrode unit smaller than one pixel in the one pixel.

Figure 32:
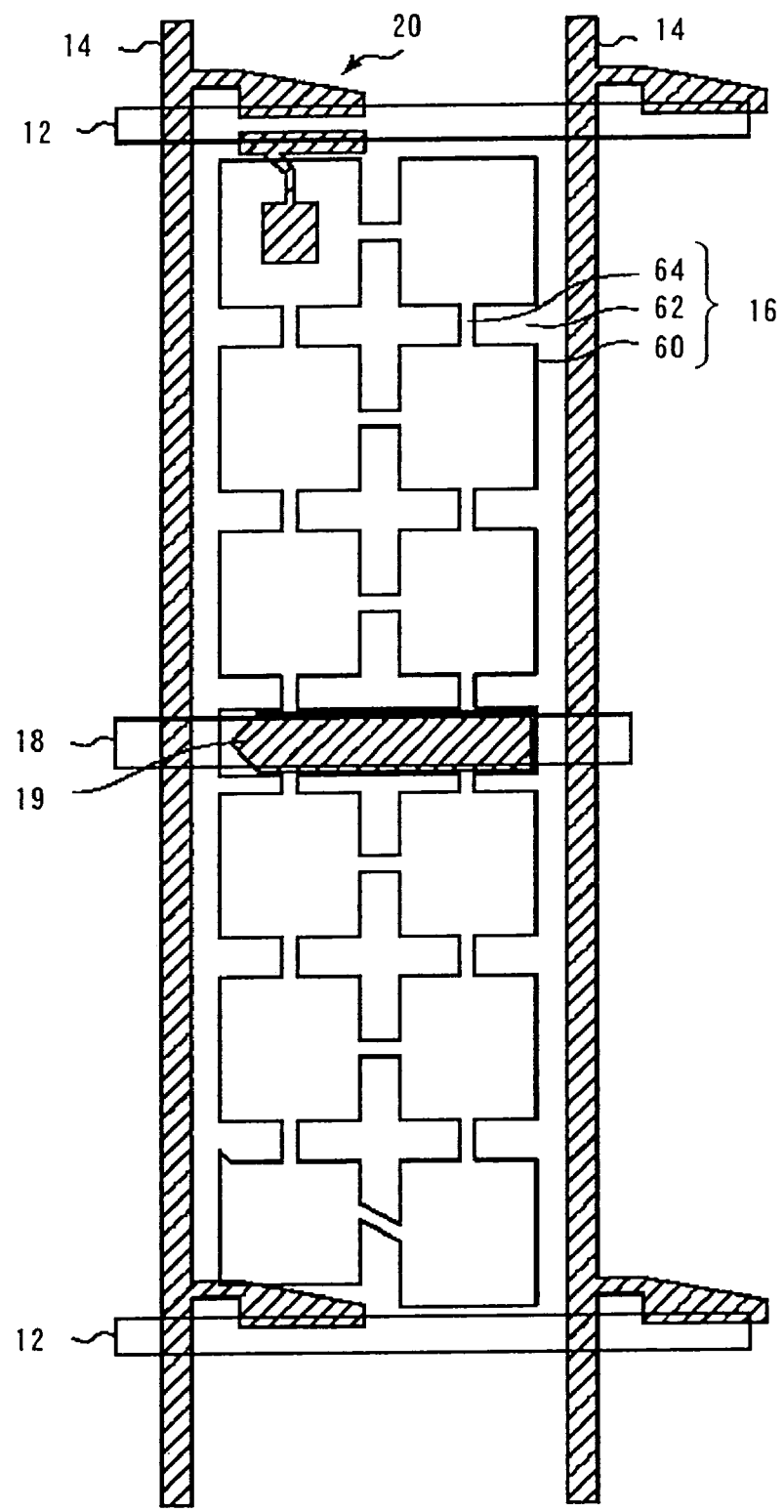
FIG. 32 is a plan view showing a structure of one pixel of a conventional liquid crystal display device.

FIG. 32 is a plan view showing a structure of one pixel of a liquid crystal display device disclosed in patent document 7. As shown in the drawing, gate bus lines 12 extending in the horizontal direction in the drawing are formed on a TFT substrate almost in parallel with each other at predetermined intervals. Further, drain bus lines 14 almost vertically intersecting with the gate bus lines 12 through an insulating film and extending in the vertical direction in the drawing are formed almost in parallel with each other at predetermined intervals. Areas surrounded by the plurality of gate bus lines 12 and the drain bus lines 14 are pixel areas. A storage capacitor bus line 18 extending almost in parallel with the gate bus line 12 is formed to intersect with almost the center of each of the pixel areas. A storage capacitor electrode 19 is formed on the storage capacitor bus line 18 through an insulating film in each of the pixels.

A TFT 20 is formed in the vicinity of each of intersection positions of the gate bus lines 12 and the drain bus lines 14.

A pixel electrode 16 made of a transparent conductive film is formed in the pixel area.

The pixel electrode 16 includes a plurality of square electrode units 60 each smaller than the pixel area, electrode blank parts (slits) 62 formed between the adjacent electrode units 60, and connection electrodes 64 for electrically connecting the electrode units 60, separated by the slits 62, to each other. In FIG. 32, the six electrode units 60 (twelve units in total) of three lines in the direction parallel to the gate bus line 12 and two lines in the direction parallel to the drain bus line 14 are disposed at each of both sides of the storage capacitor bus line 18 in the vertical direction in the drawing.

In the liquid crystal display device shown in FIG. 32 and disclosed in patent document 7, a portion where the electrode is not formed is provided in the vicinity of a side or a corner of the electrode unit 60, and at the time of voltage application, the liquid crystal molecules in the vertical alignment to the substrate are inclined in other directions and are aligned by the oblique electric field generated in this portion.

In the liquid crystal display device disclosed in patent document 7, the pattern of the electrode unit 60 is solid all over the surface, and only the electric field at the outer peripheral part of the electrode unit 60 causes the liquid crystal molecules to be inclined and aligned toward the center part of the electrode unit 60. Thus, the size of the electrode unit 60 which can incline and align the liquid crystal molecules toward the center part by the oblique electric field of the outer peripheral part of the electrode unit 60 is limited. Specifically, in the case where the size of the electrode unit 60 is 50 μm or more, the control of a singular point of an alignment vector of the liquid crystal molecule becomes difficult. Especially, at the outside of the electrode unit 60, since there is no means for fixing the singular point, a fluctuation occurs in the occurrence position of the singular point. Thus, it becomes difficult to uniformly align the liquid crystal molecules toward the center part of the electrode unit 60 from outside, and roughness occurs on the display. Besides, when an external force is applied, for example, when the liquid crystal panel is pressed by a finger, it becomes difficult to return the once broken singular point to the original state.

On the other hand, when an attempt is made to realize a liquid crystal display device having two functions of a reflection type and a transmission type, liquid crystal display devices disclosed in non-patent document 1 and non-patent document 2 have difficulties as described below.

First, with respective to the reflection type liquid crystal display device disclosed in non-patent document 1, a use in combination with the transmission type has not been realized. This is because the liquid crystal layer is hybrid aligned on the assumption that light is transmitted through the liquid crystal layer twice. When the liquid crystal layer of the hybrid alignment is used for the transmission type, its birefringence is small, and a sufficient white display can not be realized. Besides, there is a difficulty that viewing angle characteristics are inferior in the transmission type.

Besides, the transreflective type liquid crystal display device disclosed in non-patent document 2 includes the reflecting electrode having uneven reflecting surface. In order to form the reflecting electrode having the uneven reflecting surface, in addition to the manufacture process of a normal transmission type liquid crystal display device, a process, such as formation of a resin layer, patterning of the resin layer and formation of the reflecting electrode, is further required. Thus, there is a disadvantage that the manufacture cost is raised.

Besides, in general, in the case where one liquid crystal display device is used for both the transmission type and the reflection type, the optical paths in the transmission area and the reflection area become different from each other. In the transmission area, light from a backlight unit provided at a lower part of a liquid crystal panel is transmitted from the lower part of the liquid crystal panel to the upper part, so that the display is realized. That is, in the transmission area, the light is transmitted through the liquid crystal layer only once. On the other hand, in the reflection area, the light incident from the upper part of the liquid crystal panel is reflected at the lower part of the liquid crystal panel, and is again transmitted to the upper part of the liquid crystal panel, so that the display is realized. That is, in the reflection area, the light is transmitted through the liquid crystal layer twice. Thus, in the reflection area, as compared with the transmission area, the optical effect by the liquid crystal layer becomes twice, and there is a problem that the reflection area takes on a ting of yellow.

An object of this embodiment is to provide a liquid crystal display device which can suppress the occurrence of uneven display and can obtain excellent display quality, and a method of manufacturing the same.

Besides, another object of this embodiment is to provide a liquid crystal display device which has functions of both the transmission type and the reflection type, can be manufactured at low cost without increasing a manufacture process of the transmission type, and can obtain excellent display quality, and a method of manufacturing the same.

The above object is achieved by a liquid crystal display device including a first substrate which includes a plurality of gate bus lines disposed almost in parallel with each other, a plurality of drain bus lines disposed almost in parallel with each other to intersect with the gate bus lines, a plurality of thin film transistors respectively provided at intersection parts between the gate bus lines and the drain bus lines, and a plurality of pixel electrodes respectively formed in pixel areas surrounded by the gate bus lines and the drain bus lines and respectively connected to the plurality of thin film transistors, a second substrate disposed to be opposite to the first substrate and having an opposite electrode opposite to the plurality of pixel electrodes, and a liquid crystal layer sealed between the first substrate and the second substrate and having a negative dielectric anisotropy, and characterized in that each of the pixel electrodes includes a plurality of electrode units disposed through slits and electrically connected to each other, and each of the electrode units includes a solid part, and a plurality of extension parts extending from the solid part toward an outer peripheral direction of the electrode unit.

Besides, the above object is achieved by a liquid crystal display device including a first substrate which includes a plurality of gate bus lines disposed almost in parallel with each other, a plurality of drain bus lines disposed almost in parallel with each other to intersect with the gate bus lines, a plurality of thin film transistors respectively provided at intersection parts between the gate bus lines and the drain bus lines and a plurality of pixel electrodes respectively formed in pixel areas surrounded by the gate bus lines and the drain bus lines and respectively connected to the plurality of thin film transistors, a second substrate disposed to be opposite to the first substrate and having an opposite electrode opposite to the plurality of pixel electrodes, and a liquid crystal layer sealed between the first substrate and the second substrate and having a negative dielectric anisotropy, and characterized in that each of the pixel electrodes includes a plurality of electrode units disposed through slits, having solid parts and electrically connected to each other, and the first substrate further includes reflecting electrodes formed under areas in which the solid parts of all of or a part of the plurality of electrode units are formed.

Besides, the above object is achieved by a liquid crystal display device including a first substrate which includes a plurality of gate bus lines disposed almost in parallel with each other, a plurality of drain bus lines disposed almost in parallel with each other to intersect with the gate bus lines, a plurality of thin film transistors respectively provided at intersection parts between the gate bus lines and the drain bus lines, a plurality of pixel electrodes respectively formed in pixel areas surrounded by the gate bus lines and the drain bus lines and respectively connected to the plurality of thin film transistors, and reflecting electrodes partially formed under areas where the plurality of pixel electrodes are formed, a second substrate disposed to be opposite to the first substrate and having an opposite electrode opposite to the plurality of pixel electrodes, and a liquid crystal layer sealed between the first substrate and the second substrate and having negative dielectric anisotropy, and characterized in that a thickness of the liquid crystal in reflection areas where the reflecting electrodes are formed is thinner than that in other areas.

Besides, the above object is achieved by a liquid crystal display device including a first substrate which includes a plurality of gate bus lines disposed almost in parallel with each other, a plurality of drain bus lines disposed almost in parallel with each other to intersect with the gate bus lines, a plurality of thin film transistors respectively provided at intersection parts between the gate bus lines and the drain bus lines, and a plurality of pixel electrodes respectively formed in pixel areas surrounded by the gate bus lines and the drain bus lines and respectively connected to the plurality of thin film transistors, a second substrate disposed to be opposite to the first substrate and having an opposite electrode opposite to the plurality of pixel electrodes, and a liquid crystal layer sealed between the first substrate and the second substrate and having a negative dielectric anisotropy, and characterized in that each of the pixel electrodes includes a plurality of electrode units disposed through slits, having solid parts and electrically connected to each other, and the first substrate further includes a reflecting electrode formed under an area in which the electrode unit is not formed in each of the pixel areas.

The liquid crystal display device according to this embodiment and a method of manufacturing the same will be described with reference to FIGS. 33 to 40C.

Figure 33:
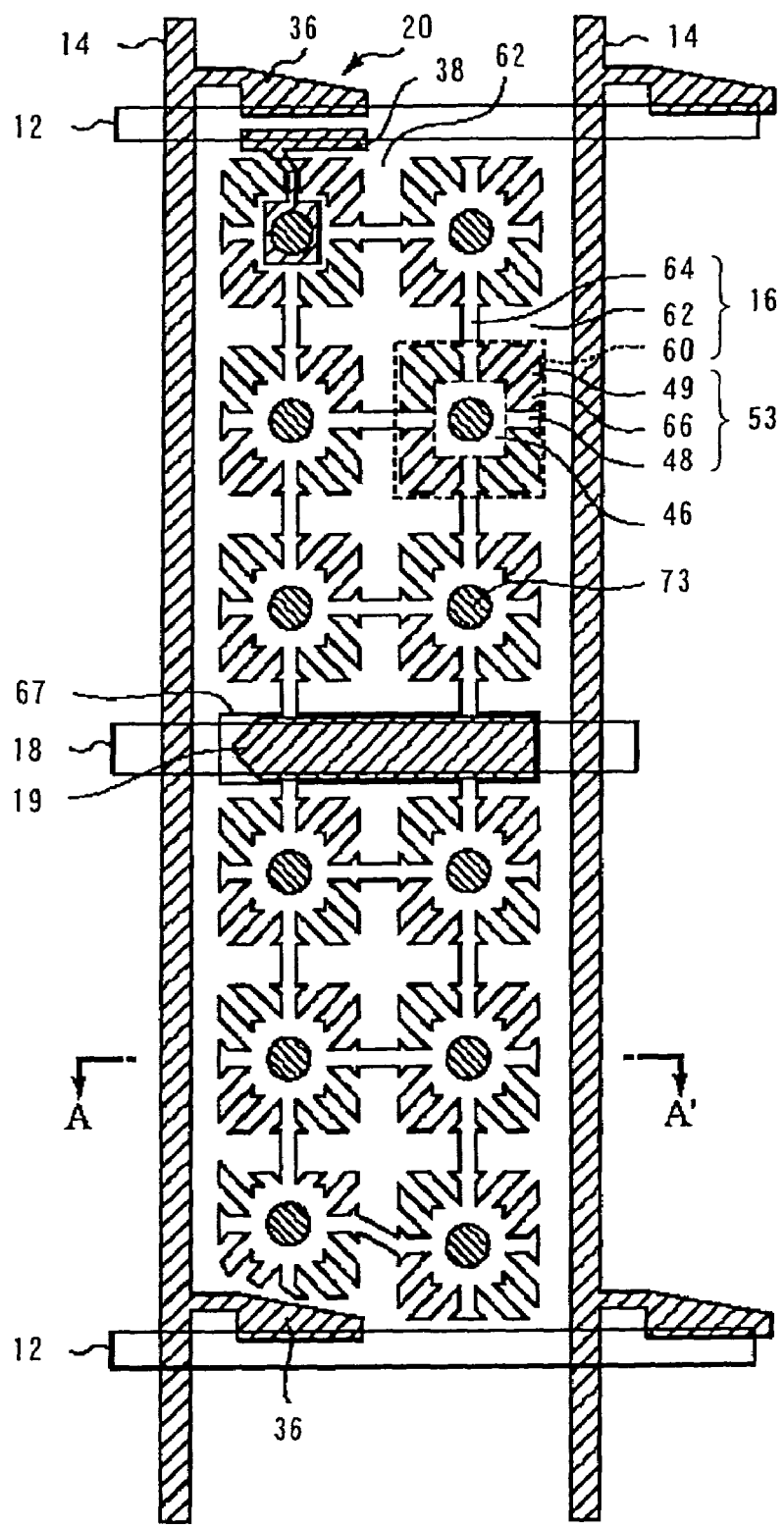
FIG. 33 is a plan view showing a structure of one pixel of a liquid crystal display device according to a third embodiment of the invention.
Figure 34:
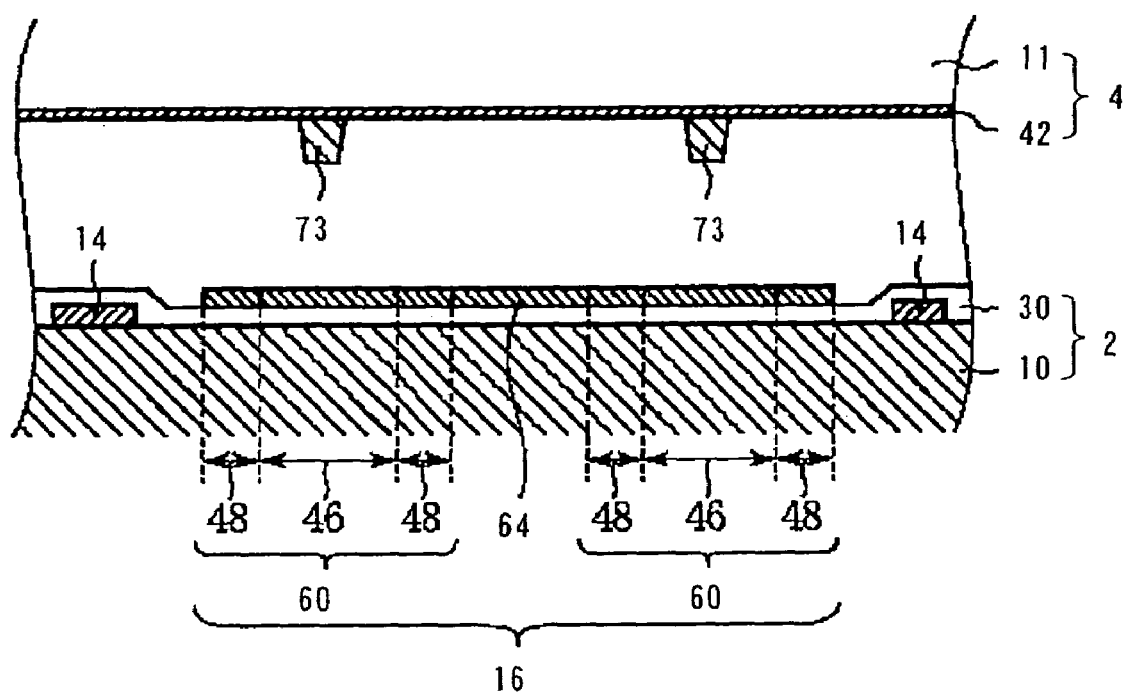
FIG. 34 is a sectional view showing a structure of the liquid crystal display device according to the third embodiment of the invention.
Figure 35:
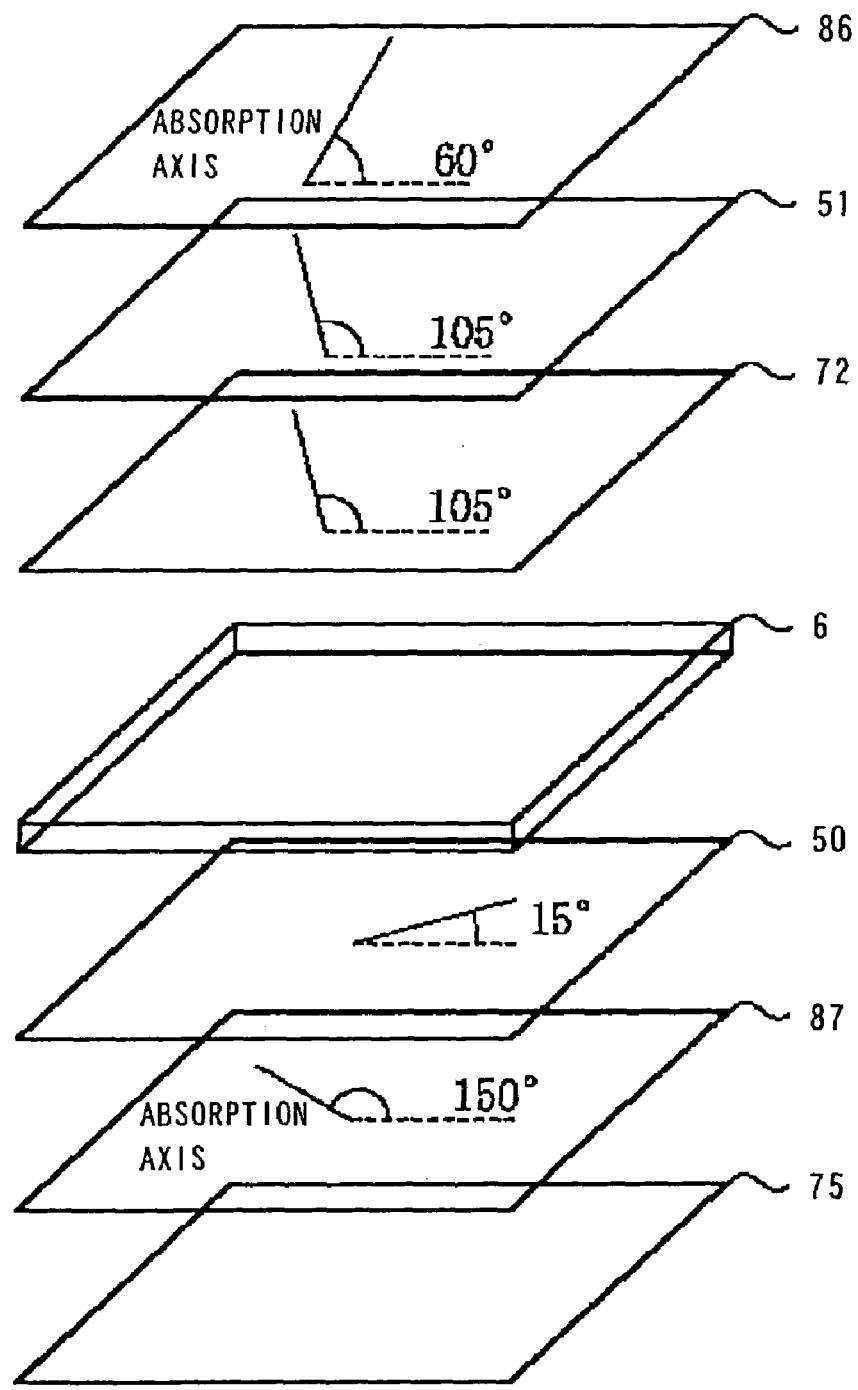
FIG. 35 is a view showing an arrangement of a polarizing plate and the like of the liquid crystal display device according to the third embodiment of the invention.
Figure 36:
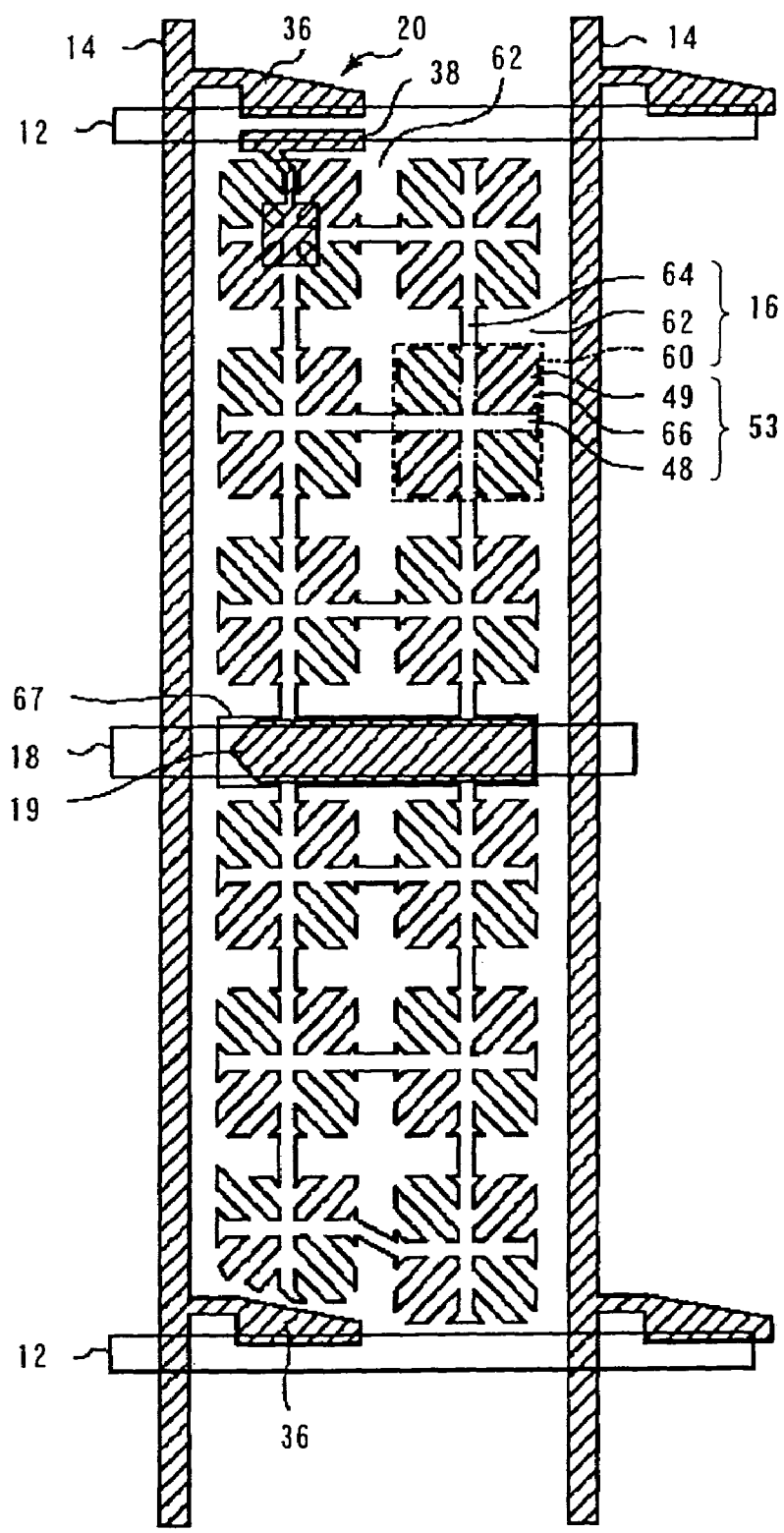
FIG. 36 is a plan view showing a structure of one pixel in a case where an electrode unit is made of only comb electrodes.
Figure 37:
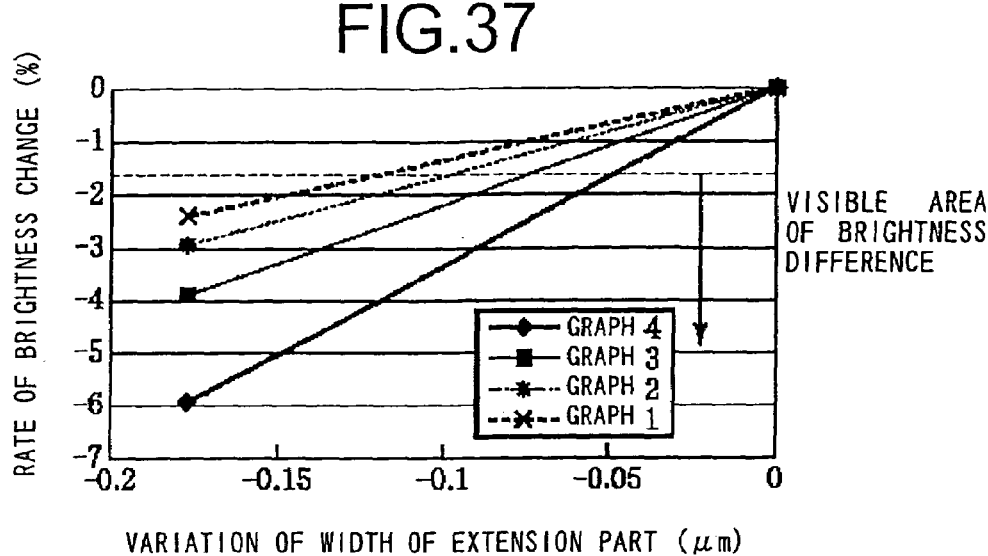
FIG. 37 is a graph of measurement of a rate of change in brightness with respect to a variation in width of an extension part of a comb electrode.

First, the liquid crystal display device according to this embodiment will be described with reference to FIGS. 33 to 37. FIG. 33 is a plan view showing a structure of one pixel of the liquid crystal display device according to this embodiment, FIG. 34 is a sectional view taken along line A-A' of FIG. 33, FIG. 35 is a view showing an arrangement of a polarizing plate and the like of the liquid crystal display device according to this embodiment, FIG. 36 is a plan view showing a structure of one pixel in a case where an electrode unit is made of only a comb electrode, and FIG. 37 is a graph of measurement of a rate of change in brightness with respect to a variation in width of an extension part of the comb electrode.

FIG. 33 shows the structure of one pixel of the liquid crystal display device according to this embodiment. As shown in the drawing, a plurality of gate bus lines 12 extending in the horizontal direction in the drawing are formed on a TFT substrate 2 in parallel with each other at intervals of, for example, 300 µm (FIG. 33 shows two gate bus lines). A plurality of drain bus lines 14 almost vertically intersecting with the gate bus lines 12 through an insulating film such as, for example, a silicon oxide film and extending in the vertical direction in the drawing are formed in parallel with each other at intervals of, for example, 100 µm (FIG. 33 shows two drain bus lines). The widths of both the gate bus line 12 and the drain bus line 14 are, for example, 7 µm. Areas surrounded by the plurality of gate bus lines 12 and the drain bus lines 14 are pixel areas. A storage capacitor bus line 18 crossing almost the center of each of the pixel areas and extending almost in parallel with the gate bus line 12 is formed. A storage capacitor electrode 19 is formed in each pixel on the storage capacitor bus line 18 through an insulating film.

A TFT 20 is formed in the vicinity of each of intersection positions between the gate bus lines 12 and the drain bus lines 14. A drain electrode 36 of the TFT 20 is extended from the drain bus line 14, and is formed to be positioned at the side of one end side of an active layer formed on the gate bus line 12 and a channel protective film formed thereon. On the other hand, a source electrode 38 of the TFT 20 is opposite to the drain electrode 36 through a predetermined gap, and is formed to be positioned at the side of the other end side of the active layer and the channel protective film. The drain electrode 36, the active layer and the source electrode 38 are formed of, for example, the same semiconductor layer, and areas where impurities are injected at high concentration are the drain electrode 36 and the source electrode 38. An area just under the channel protective film of the gate bus line 12 functions as a gate electrode of the TFT 20.

A pixel electrode made of a transparent conductive film of, for example, ITO (Indium Tin Oxide) is formed in the pixel area.

The pixel electrode 16 includes a plurality of electrode units 60 each having a square outer periphery and smaller than the pixel area, electrode blank parts (slits) 62 formed between the adjacent electrode units 60, and connection electrodes 64 for electrically connecting the electrode units 60, separated by the slits 62, to each other. In FIG. 33, the six electrode units 60 (twelve units in total) of three lines in the direction parallel to the gate bus line 12 and two lines in the direction parallel to the drain bus line 14 are disposed at each of both sides of the storage capacitor bus line 18 in the vertical direction in the drawing. The plurality of electrode units 60 constituting the pixel electrode 16 are formed of the same conductive film.

Each of the electrode units 60 includes an almost square solid part 46 having sides almost parallel to or vertical to the gate bus line 12 and the drain bus line 14. The length of one side of the square solid part 46 is, for example 25 µm.

Besides, the electrode unit 60 includes a stem part 48 branching from the center of each of the sides of the solid part 46 and extending almost in parallel with or vertically to the gate bus line 12 and the drain bus line 14. The size of the stem part 48 is, for example, 5 µm in length and 5 µm in width.

Further, the electrode unit 60 includes a plurality of branch parts 49 branching from the solid part 46 and the stem part 48 and extending obliquely with respect to the stem part 48 to form a comb shape, and electrode blank parts (spaces) 66 between the adjacent branch parts 49. In an area partitioned by the adjacent stem parts 48, the respective branch parts 49 branching from the solid part 46 and the stem part 48 extend almost in the same direction. In FIG. 33, the two small branch parts 49 branch from the one stem part 48, and the two large branch parts 49 are branch from one side of the solid part 46. That is, in the area partitioned by the adjacent stem parts 48, the four branch parts 49 extend in the same direction. Incidentally, in this specification, a comb portion of the electrode unit 60 in which the stem parts 48 as the extension parts and the branch parts 49 as the extension parts are formed through the blank parts 66 is called a comb electrode 53.

An angle between the stem part 48 and the branch part 49, in other words, an angle between the side of the outer periphery of the electrode unit 60 and the branch part 49 is, for example, 45°. The width of the branch part 49 is, for example, 3 µm, and the width of the blank part 66 is, for example, 3 µm.

The end of each of the branch parts 49 is formed to be almost parallel to or vertically to the gate bus line 12 and the drain bus line 14, and by this, the outer periphery of the electrode unit 60 is almost square. The length of one side of the square electrode unit 60 is, for example, 35 µm.

As stated above, the square solid part 46 with one side having a length of, for example, 25 µm is formed at the center part of the electrode unit 60 having the square outer periphery with one side of, for example, 35 µm, and the comb electrode 53 is formed in an area having a width of 5 µm from the outer periphery of the electrode unit 60 toward the inside. Incidentally, although the width of the area where the comb electrode 53 is formed is not limited to this, it is preferable that the area where the comb electrode 53 is formed has a width of 5 µm or more from the outer periphery of the electrode unit 60 toward the inside. This is because when the width is smaller than this, it becomes difficult to accurately pattern the comb electrode 53.

The adjacent electrode units 60 are electrically connected to each other by the connection electrode 64 formed to be connected to the stem parts 48 positioned at the centers of the respective facing sides. As stated above, by providing the connection electrode 64 to connect the centers of the respective facing sides of the adjacent electrode units 60, the singular point can be certainly fixed.

Besides, at the lower part of the pixel area in the drawing, the drain electrode 36 of the TFT 20 of the pixel area adjacent to the lower part is formed to protrude. When the pixel electrode 16 is formed to overlap with the drain electrode 36 when viewed in the direction vertical to the substrate surface, a disturbance occurs in the alignment of liquid crystal molecules in this area, and there is a possibility that cross talk occurs. Thus, it is necessary that the pixel electrode 16 and the drain electrode 36 are formed not to overlap with each other. Thus, the shape of the outer periphery of the electrode unit 60 (lower left in FIG. 33) corresponding to this area is formed into such a shape that a part of the square is cut away in accordance with the shape of the drain electrode 36. Specifically, while the shape of the outer periphery of the other electrode unit 60 has, for example, a square shape of 35 µm×35 µm, the shape of the electrode unit 60 in this area has such a shape that a part of the square is cut away so that it is spaced from the drain electrode 36 by, for example, 7 µm.

The pixel electrode 16 is electrically connected to the source electrode 38 through a contact hole formed in an insulating film under the solid part 46 of the electrode unit 60 (upper left in FIG. 33) close to the TFT 20. The shape of the contact hole is, for example, a square having one side of 5 µm. Here, it is preferable that the upper part of the conductive film of the source electrode 38 in the area where the electrode unit 60 close to the TFT 20 is formed, is covered with the conductive film of the pixel electrode 16. This is because when the conductive film of the source electrode 38 is positioned in the area of the slit 62 of the electrode unit 60, the oblique electric field by the slit 62 is not sufficiently generated, and there is a fear that the alignment control of liquid crystal in this area becomes insufficient.

Besides, a rectangular contact area 67 is formed in the pixel electrode 16 on the storage capacitor electrode 19 through an insulating film. The contact area 67 is electrically connected to the stem part 48 of the adjacent electrode unit 60 through the connection electrode 64. The pixel electrode 16 is electrically connected to the storage capacitor electrode 19 through the contact hole formed in the insulating film under the contact area 67.

A BM (Black Matrix) as a light shielding layer for shading the end part of the pixel area is formed at the side of a CF substrate 4 disposed to be opposite to the TFT substrate 2. The BM is formed into a lattice having a width of, for example, 23 µm. A lattice interval in the extending direction of the gate bus line 12 is 100 µm, and a lattice interval in the extending direction of the drain bus line 14 is 300 µm. A CF resin layer of one of red (G), green (G) and blue (B) is formed in the opening part of the BM. The opposite electrode (common electrode) made of, for example, ITO is formed on the whole surface of the CF resin layer.

FIG. 34 is a sectional view taken along line A-A' of FIG. 33. As shown in the drawing, the drain bus lines 14 are formed on a glass substrate 10 constituting the TFT substrate 2. An insulating film 30 is formed on the glass substrate 10 on which the drain bus lines 14 are formed. The pixel electrode 16 is formed on the insulating film 30 between the drain bus lines 14.

On the other hand, the CF substrate 4 disposed to be opposite to the TFT substrate 2 includes a glass substrate 11 and an opposite electrode 42 formed on the surface of the glass substrate 11 opposite to the TFT substrate 2. Incidentally, the CF resin layer (not shown) is formed between the glass substrate 11 and the opposite electrode 42.

Further, as shown in FIGS. 33 and 34, a cylindrical protruding structure 73 is provided on the surface opposite to the TFT substrate 2 so that it is positioned almost at the center of each of the electrode units 60 of the TFT substrate 2. The protruding structure 73 is made of, for example, acryl resin, and its size is 10 µm in diameter and 2 µm in height.

Besides, alignment films (not shown) are formed on the facing surfaces of both the substrates 2 and 4. The alignment film has a vertical alignment, and causes liquid crystal molecules to be aligned in the direction vertical to the substrate surface (alignment film surface) in a steady state. The liquid crystal display device is manufactured by injecting and sealing the liquid crystal having a negative dielectric anisotropy into the liquid crystal cell in which both the substrates 2 and 4 are bonded to each other.

FIG. 35 shows an arrangement of a polarizing plate and the like of the liquid crystal display device according to this embodiment. As shown in the drawing, polarizing plates 86 and 87 disposed crossed Nicols are disposed at both sides of a liquid crystal layer 6 made of the liquid crystal cell in which the liquid crystal is sealed. A quarter-wave plate 50 is disposed between the liquid crystal layer 6 and the polarizing plate 87. Besides, a quarter-wave plate 51 is disposed between the liquid crystal layer 6 and the polarizing plate 86. As the quarter-wave plates 50 and 51, for example, ARTON plates (in-plane phase difference is 140 nm) made by JSR Corporation can be used. A layer having a negative phase difference, such as a TAC (triacetylcellulose) film 72, may be disposed between the liquid crystal layer 6 and the quarter-wave plate 51 in order to improve the viewing angle characteristics. Incidentally, an upper part in the drawing is an observer side and a lower part in the drawing is an optical source side where a backlight unit is disposed. A reflection polarizing plate 75 is disposed between the polarizing plate 87 and the light source side. As the reflection polarizing plate 75, for example, PCF 350D made by Nitto Denko Co., Ltd. can be used.

An angle between the optical axis (lag axis) of the quarter-wave plate 50 and the absorption axis of the polarizing plate 87 is approximately 45°. That is, when light emitted from a light source is transmitted through the polarizing plate 87 and the quarter-wave plate 50 in this order, it becomes a circularly polarized light. Besides, an angle between the optical axis of the quarter-wave plate 51 and the absorption axis of the polarizing plate 86 is approximately 45°. The optical axes of both the quarter-wave plates 50 and 51 are almost orthogonal to each other. In order to realize the symmetry of viewing angles and optimize the viewing angle characteristics in the vertical and horizontal directions with respect to the display screen, the polarizing plates 86 and 87, and the quarter-wave plates 50 and 51 are disposed as described below.

The absorption axis of the polarizing plate 87 is disposed in the counterclockwise direction of 150° with reference to the right part (direction of three o'clock) of the display screen. The optical axis of the quarter-wave plate 50 is disposed in the counterclockwise direction of 15° with reference to the right part of the display screen. The optical axis of the TAC film 72 and the optical axis of the quarter-wave plate 51 disposed at the observer side of the liquid crystal layer 6 are disposed in the counterclockwise direction of 105° with reference to the right part of the display screen. The absorption axis of the polarizing plate 86 is disposed in the counterclockwise direction of 60° with reference to the right part of the display screen.

In this way, the liquid crystal display device according to this embodiment is constructed.

In the liquid crystal display device according to this embodiment constructed as described above, when a voltage is applied between the opposite electrode 42 and the pixel electrode 16, the liquid crystal is put in an alignment state described below.

In the area of the electrode unit 60 where the comb electrode 53 is formed, the liquid crystal molecule is aligned in the extension direction of the blank part 66 between the branch parts 49 by the comb electrode 53. On the other hand, in the area of the center part of the electrode unit 60 where the solid part 46 is formed, the liquid crystal molecule is aligned in the direction toward the center part of the electrode unit 60 by the oblique electric field of the outer peripheral part of the solid part 46 and by the liquid crystal alignment from the outside due to the comb electrode 53. That is, the alignment division in four directions is roughly realized.

One of the main features of the liquid crystal display device according to this embodiment is that each of the plurality of electrode units 60 constituting the pixel electrode 16 of one pixel includes the square solid part 46, the stem part 48 branching from the center of each of the sides of the solid part 46 and extending almost in parallel with or vertically to the gate bus line 12 and the drain bus line 14, and the plurality of branch parts 49 branching from the solid part 46 and the stem part 48 and extending obliquely with respect to the stem part 48 to form the comb shape.

In the vertical alignment type liquid crystal display device, it is conceivable that as a method of performing alignment control of the liquid crystal, as shown in FIG. 36, slits are provided on almost the whole surface of an electrode unit 60, a solid part 46 is not provide, and the electrode unit 60 is formed of only a comb electrode 53 of stem parts 48 and branch parts 49. In this case, as shown in FIG. 36, the electrode unit 60 includes the two stem parts 48 extending almost in parallel with or vertically to the gate bus line 12 and the drain bus line 14 and intersecting with each other crosswise. Further, the electrode unit 60 includes the plurality of branch parts 49 branching from the stem parts 48 and extending obliquely with respect to the stem parts 48 to form the comb shape, and electrode blank parts 66 between the adjacent branch parts 49. In the area partitioned by the adjacent stem parts 48, the respective branch parts 49 branching from the stem parts 48 extend in almost the same direction.

However, as shown in FIG. 36, when the electrode unit 60 is patterned, it is difficult to make the widths of the slits constant in all areas in terms of process. Besides, at the time of patterning, all display area is divided into a plurality of areas, and when the patterning of the pixel electrode is performed for each of the divided areas, a variation in slit width becomes large at the boundary portion between the divided areas. In the case where the variation in the slit width occurs, that is, in the case where the variation occurs in the width of the stem part 48 and the branch part 49, a difference in brightness occurs when a display is actually performed, and as a result, uneven display occurs.

On the other hand, in the liquid crystal display device according to this embodiment, the square solid part 46 is provided at the center of the electrode unit 60, and the stem parts 48 and the branch parts 49 branch from the solid part 46. Thus, as compared with the case shown in FIG. 36, the ratio of the stem parts 48 and the branch parts 49 to the electrode unit 60, that is, the ratio of the comb electrode 53 is small. Accordingly, it becomes possible to suppress the occurrence of the difference in brightness due to the variation in the widths of the stem parts 48 and the branch parts 49, to reduce the uneven display, and to obtain excellent display quality.

Incidentally, in order to sufficiently suppress the occurrence of the difference in brightness due to the variation in the widths of the stem parts 48 and the branch parts 49, it is preferable that the ratio of the square measure of the solid part 46 to the square measure of the area within the outer periphery of the electrode unit 60 is 50% or more.

FIG. 37 is a graph of measurement of a rate of change in brightness with respect to a variation in width of the stem part 48 and the branch part 49 (extension part) of the comb electrode 53. In FIG. 37, a graph 1 is a graph in the case where the ratio of the square measure of the solid part 46 to the square measure of the area within the outer periphery of the electrode unit 60 is 58%. A graph 2 is a graph in the case where the ratio of the square measure of the solid part 46 to the square measure of the area within the outer periphery of the electrode unit 60 is 50%. A graph 3 is a graph in the case where the ratio of the square measure of the solid part 46 to the square measure of the area within the outer periphery of the electrode unit 60 is 33%. A graph 4 is a graph in the case shown in FIG. 36 in which the electrode unit 60 is formed of only the comb electrode 53 and the solid part 46 is not provided.

From the graphs shown in FIG. 37, it is understood that as compared with the case shown in FIG. 36 in which the electrode unit 60 is formed of only the comb electrode 53, the change in the brightness can be suppressed by providing the solid part 46. Further, as described above, it is understood that when the ratio of the square measure of the solid part 46 to the square measure of the area within the outer periphery of the electrode unit 60 is made 50% or more, the change in the brightness can be sufficiently suppressed.

Besides, in the liquid crystal display device according to this embodiment, since the solid part 46 is provided at the center part of the electrode unit 60, as compared with the case shown in FIG. 36 in which the electrode unit 60 is formed of only the comb electrode 53, the lengths of the stem part 48 and the branch part 49 of the comb electrode 53 are short. Thus, as compared with the case shown in FIG. 36, the liquid crystal display device according to this embodiment can improve the response speed of the liquid crystal molecule. The reason is as follows. That is, in the case where the length of the comb electrode 53 is long as shown in FIG. 36, a liquid crystal portion which is hardly influenced by a surrounding oblique electric field is generated at a midway position of the comb electrode 53. At this position, it becomes difficult to determine whether a direction in which the liquid crystal is aligned is a direction toward the center with respect to the comb electrode 53, or a direction toward the outer peripheral part. On the other hand, as in the liquid crystal display device according to this embodiment, when the length of the comb electrode 53 is short because the solid part 46 is formed, the liquid crystal is apt to be influenced by the surrounding oblique electric field, and the alignment angle at which the liquid crystal molecule is aligned becomes easy to determine. As a result, the response speed of the liquid crystal molecule becomes fast.

Besides, in the liquid crystal display device according to this embodiment, the quarter-wave plates 50 and 51 and the polarizing plates 87 and 86 are disposed at the outside of both the substrates 2 and 4 in this order. By doing so, as compared with the case where only the polarizing plates 87 and 86 disposed in crossed Nicols are used, the quarter-wave plates 50 and 51 whose optical axes are orthogonal to each other are disposed, so that the transmissivity of light at the time of white display can be improved, and it is possible to realize the liquid crystal display device in which the brightness is high and the clear display can be obtained. In the case where the quarter-wave plates 50 and 51 are not disposed, a dark line is generated at a position of a boundary where the domain direction is not divided into four. Besides, in an area where the comb electrode 53 does not exist, differently from the area where the comb electrode 53 exists, it is difficult to give a direction angle in a specific direction. Thus, as compared with the case where the comb electrode 53 exists in the whole area, the brightness is lowered. Since all the dark lines generated in these portions can be made transparent by disposing the quarter-wave plates 50 and 51, the transmissivity can be improved.

Next, a method of manufacturing the liquid crystal display device according to this embodiment will be described with reference to FIGS. 38A to 40C. FIGS. 38A to 40C are process sectional views showing the method of manufacturing the liquid crystal display device according to this embodiment, and correspond to the section in the direction along the drain bus line 14 of FIG. 33. Incidentally, in the following, a description will be given to the method up to the formation of the pixel electrode 16 on the glass substrate 10 of the TFT substrate 2.

Figure 38A:
FIGS. 38A to 38D are process sectional views (No. 1) showing a method of manufacturing the liquid crystal display device according to the third embodiment of the invention.

First, a gate layer 21 made of an aluminum film is formed on the glass substrate 10 by, for example, a sputtering method (see FIG. 38A).

Figure 38B:

Next, the gate layer 21 is patterned, so that a gate bus line 12 and a storage capacitor bus line 18 are formed (see FIG. 38B). Incidentally, in FIGS. 38A to 40C, the storage capacitor bus line 18 is omitted.

Figure 38C:

Next, an insulating film 22 made of a silicon oxide film is formed on the whole surface by, for example, a CVD (Chemical Vapor Deposition) method (see FIG. 38C).

Figure 38D:

Next, a semiconductor layer 23 made of a polysilicon film is formed on the insulating film 22 by, for example, the CVD method (see FIG. 38D).

Figure 39A:
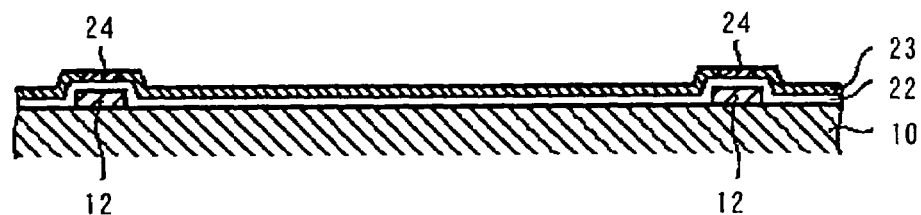
FIGS. 39A to 39C are process sectional views (No. 2) showing the method of manufacturing the liquid crystal display device according to the third embodiment of the invention.

Next, an impurity is ion implanted into the semiconductor layer 23 other than an area on the gate bus line 12, which becomes an active layer 24 (see FIG. 39A).

Figure 39B:
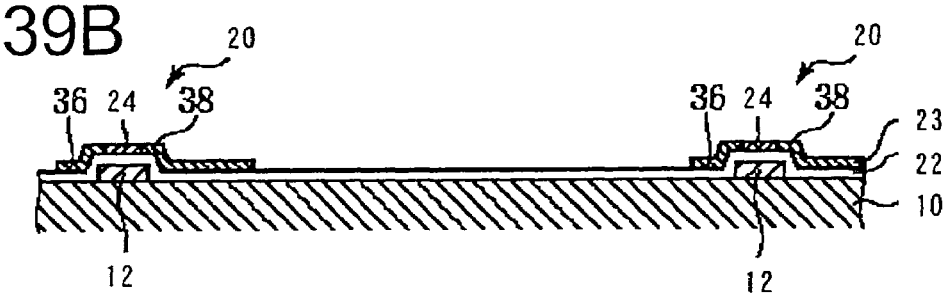

Next, the semiconductor layer 23 in which the impurity is ion implanted is patterned, so that a drain bus line 14, a drain electrode 36, a source electrode 38 and a storage capacitor electrode 19 are formed (see FIG. 39B). In this way, a TFT 20 is formed in the vicinity of an intersection position of the gate bus line 12 and the drain bus line 14.

Figure 39C:
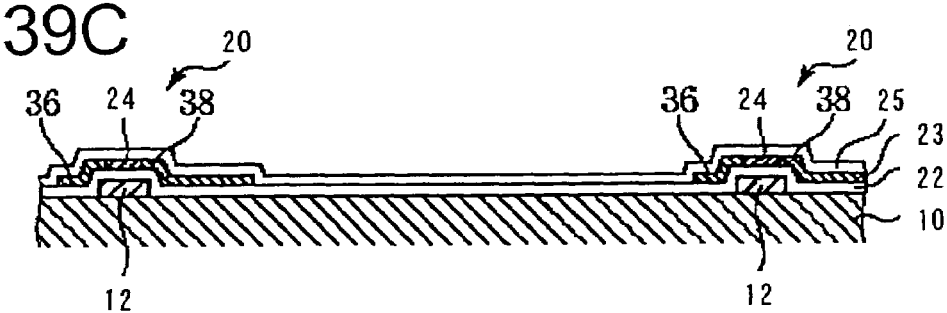

Next, an insulating film 25 made of a silicon oxide film is formed on the whole surface by, for example, the CVD method (see FIG. 39C).

Figure 40A:
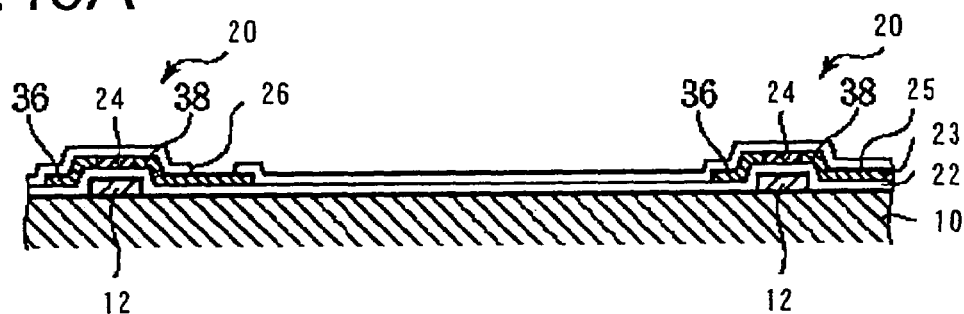
FIGS. 40A to 40C are process sectional views (No. 3) showing the method of manufacturing the liquid crystal display device according to the third embodiment of the invention.

Next, the insulating film 25 is selectively etched, so that a contact hole 26 reaching the source electrode 38 of the TFT 20 is formed (see FIG. 40A).

Figure 40B:
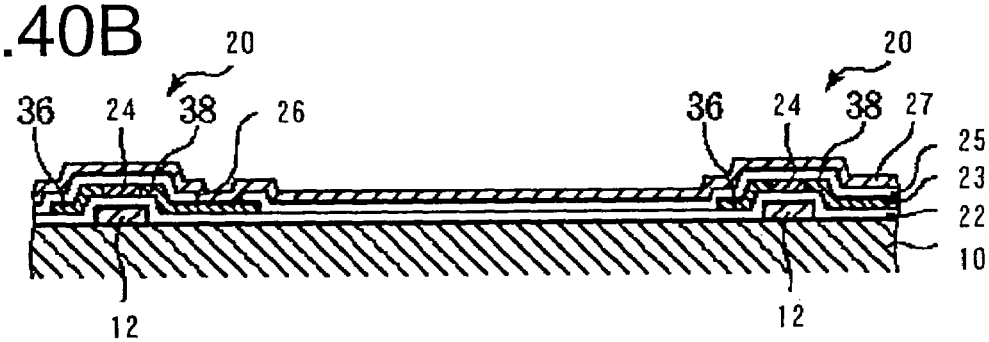

Next, a transparent conductive film 27 made of ITO is formed on the whole surface by, for example, the sputtering method (see FIG. 40B).

Figure 40C:
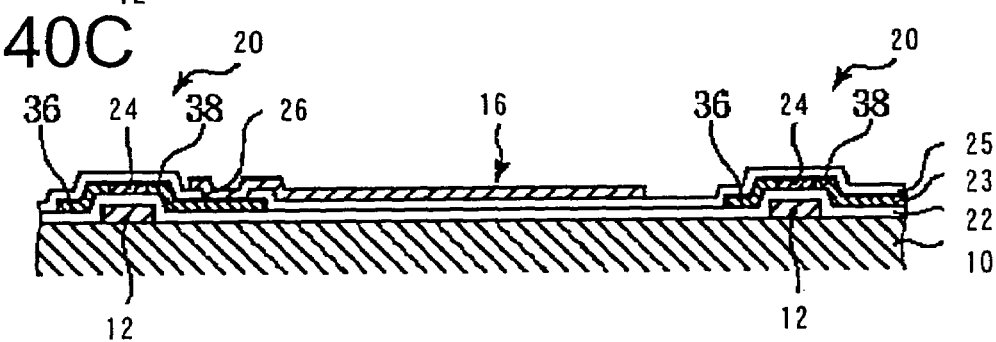

Next, the transparent conductive film 27 is patterned, so that an electrode unit 60, a connection electrode 64 and a contact area 67 are formed (see FIG. 40C). In this way, the pixel electrode 16 electrically connected to the source electrode 38 through the contact hole 26 is formed on the glass substrate 10 of the TFT substrate 2.

Although not shown, subsequently to this, a process similar to a manufacture process of a normal liquid crystal display device is performed, so that the liquid crystal display device according to this embodiment can be completed.

As stated above, according to this embodiment, the square solid part 46 is provided at the center of the electrode unit 60, and the ratio of the comb electrode 53 to the electrode unit 60 is small, so that the occurrence of difference in brightness due to the variation in width of the comb electrode 53 is suppressed, and the uneven display can be reduced. By this, the liquid crystal display device excellent in display quality can be provided.

MODIFIED EXAMPLE

Figure 41A:
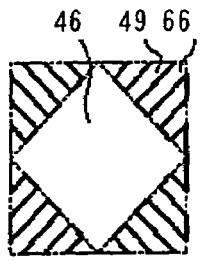
FIGS. 41A to 41N are plan views showing shapes of electrode units of a liquid crystal display device according to a modified example of the third embodiment of the invention.

A liquid crystal display device according to a modified example of this embodiment will be described with reference to FIGS. 41A to 41N. FIGS. 41A to 41N are plan views showing shapes of electrode units in the liquid crystal display device according to this modified example.

In the above, as shown in FIG. 33, although the square solid part 46 is provided at the center part of the electrode unit 60, the shape of the electrode unit 60 can be made to have various shapes other than this.

For example, as shown in FIG. 41A, the shape of the solid part 46 may be made a rhombic shape obtained by connecting center points of the respective sides of the outer periphery of the electrode unit 60. Incidentally, the rhombic solid part 46 may be smaller than that shown in FIG. 41A, and its shape may be distorted.

Figure 41B:
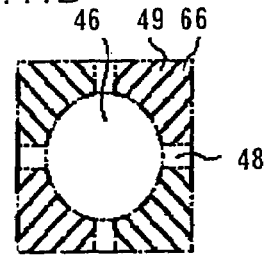

Besides, as shown in FIG. 41B, the shape of the solid part 46 may be made a circular shape. Besides, the shape of the solid part 46 may be made an elliptic shape.

Figure 41C:
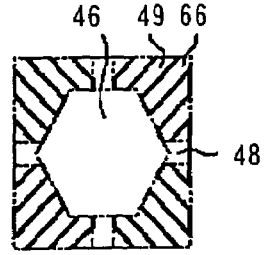

Besides, as shown in FIG. 41C, the shape of the solid part 46 may be made a convex polygon. Here, the convex polygon is the polygon in which all angles are less than 180°.

Figure 41D:
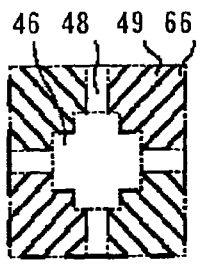

Besides, as shown in FIG. 41D, the shape of the solid part 46 may be made a cruciform shape wider than the stem part 48.

Figure 41E:
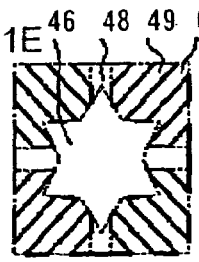

Besides, as shown in FIG. 41E, the shape of the solid part 46 may be made a concave polygon. Here, the concave polygon is the polygon in which at least one angle is larger than 180°.

Besides, in the above, although the solid part 46 is provided almost the center part of the electrode unit 60, the position where the solid part 46 is provided is not limited to the center part.

Figure 41F:
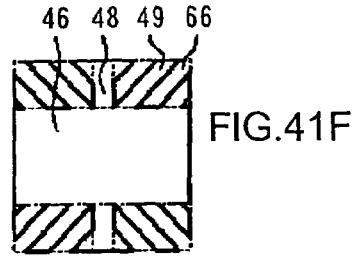
Figure 41G:
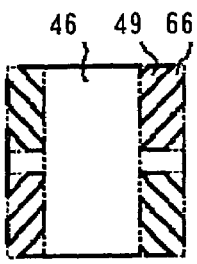

For example, as shown in FIGS. 41F and 41G, the solid part 46 is continuously formed between two opposite sides of the outer periphery of the electrode unit 60, and the comb electrode 53 may be formed at the other two sides, that is, at both sides of the solid part 46 continuously formed between the two opposite sides. The direction in which the solid part 46 is continuously formed may be almost parallel to the drain bus line 14 or may be parallel to the gate bus line 12.

Figure 41H:
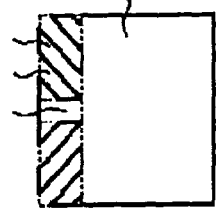

Besides, as shown in FIG. 41H, the comb electrode 53 is formed in an area close to one side of the outer periphery of the electrode unit 60, and the other area may be made the solid part 46. Incidentally, the liquid crystal display device including the electrode unit 60 having the shape shown in FIG. 41H will be described in a fourth embodiment.

Figure 41I:
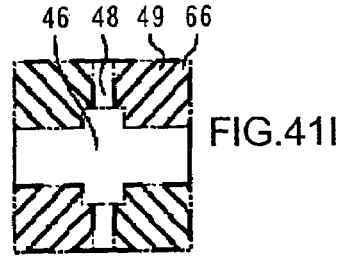

Besides, as shown in FIG. 41I, similarly to FIG. 41D, the shape of the solid part 46 may be made a cruciform shape, and the solid part 46 may be continuously formed between two opposite sides of the outer periphery of the electrode unit 60 in one direction of the cross.

Figure 41J:
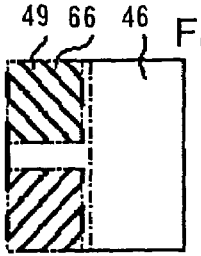

Besides, as shown in FIG. 41J, the comb electrode 53 is formed in a half area of the electrode unit 60, and the other half area may be made the solid part 46.

Figure 41K:
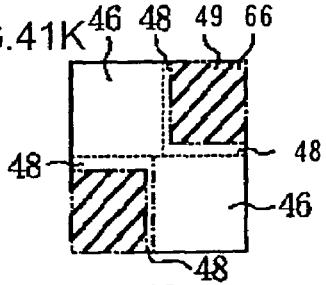

Besides, as shown in FIG. 41K, among four areas divided by the stem parts 48 extending crosswise from the center of the electrode unit 60 toward the center points of the outer periphery of the electrode unit 60, one pair of areas positioned diagonally are made the solid part 46, and the comb electrode 53 may be formed in each of the other pair of areas positioned diagonally. As stated above, the four areas are defined in the electrode unit 60 by the cross-shaped boundary lines, the comb electrode 53 is formed in at least one of the four areas, and the solid part 46 may be formed in the other areas.

Besides, in the above, although the description has been given to the case where the electrode unit 60 is divided into the four square areas by the stem parts 48 crosswise extending from the center of the electrode unit 60 toward the center points of the outer periphery of the electrode unit 60, the division shape of the electrode unit 60 may be another shape.

Figure 41L:
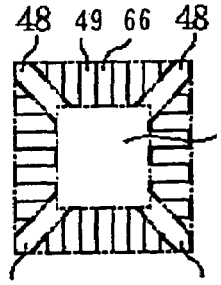

For example, as shown in FIG. 41L, the electrode unit is divided into four triangular areas by the stem parts 48 crosswise extending from the center of the electrode unit 60 toward vertexes of the outer periphery of the electrode unit 60, and the square solid part 46 may be provided at the center part of the electrode unit 60. In this case, the branch parts 49 branch from the solid part 46 and the stem parts 48, and extend obliquely with respect to the stem parts 48 to form the comb shape. In the triangular area divided by the adjacent stem parts 48, the branch parts 49 branching from the solid part 46 and the stem parts 48 extend in almost the same direction. An angle between the stem part 48 and the branch part 49 is, for example, approximately 45°, in other words, an angle between the side of the outer periphery of the electrode unit 60 and the branch part 49 is, for example, approximately 90°.

Figure 41M:
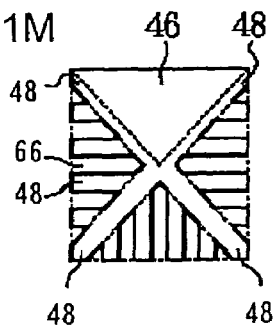
Figure 41N:
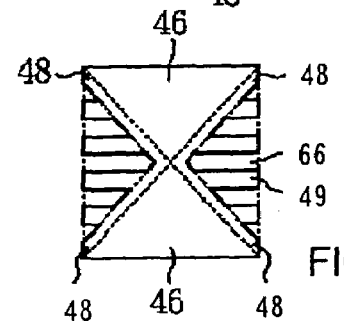

Besides, as shown in FIG. 41M, the electrode unit is divided into four triangular areas by the stem parts 48 provided on the diagonal lines of the electrode unit 60 having the square outer periphery, and the solid part 46 may be provided in one area of them. In this case, in the other triangular areas, the branch parts 49 branch from the stem parts 48, and extend obliquely with respect to the stem parts 48 to form the comb shape. In the triangular area partitioned by the adjacent stem parts 48, the branch parts 49 branching from the solid part 46 and the stem parts 48 extend in almost the same direction. An angle between the stem part 48 and the branch part 49 is, for example, approximately 45°.

Besides, as shown in FIG. 41N, the electrode unit is divided into four triangular areas by the stem parts 48 provided on diagonal lines of the electrode unit 60 having the square outer periphery, and the solid part 46 may be provided in one pair of areas symmetric with respect to the center point of the electrode unit 60. In this case, in the other pair of areas symmetric with respect to the point, the branch parts 49 branches from the stem parts 48, and extend obliquely with respect to the stem parts 48 to form the comb shape. In the triangular area partitioned by the adjacent stem parts 48, the branch parts 49 branching from the solid part 46 and the stem parts 48 extend in almost the same direction. An angle between the stem part 48 and the branch part 49 is, for example, approximately 45°.

As shown in FIGS. 41M and 41N, the four areas are defined in the electrode unit 60 by the diagonal lines of the outer periphery of the electrode unit 60, the comb electrode 53 is formed in at least one of the four areas, and the solid part 46 may be formed in the other area. Incidentally, as shown in FIG. 41N, among the four areas, the comb electrodes 53 are formed in one pair of areas positioned diagonally and the solid parts 46 are formed in the other pair of areas, and the one pair of areas in which the comb electrodes 53 are formed may become areas including the sides almost parallel to the drain bus line 14 of the outer periphery of the electrode unit 60.

Besides, as shown in FIGS. 41A to 41N, the shape of the electrode unit 60 is not limited to those in which the branch parts 49 extend almost in parallel with each other in the area partitioned by the adjacent stem parts 48. For example, in the electrode unit 60, a plurality of extension parts (stem parts 48, branch parts 49) branching from the solid part 46 may be formed so as to extend in the radial direction from the center part of the electrode unit 60 toward the outer periphery of the electrode unit 60.

Fourth Embodiment

Figure 42:
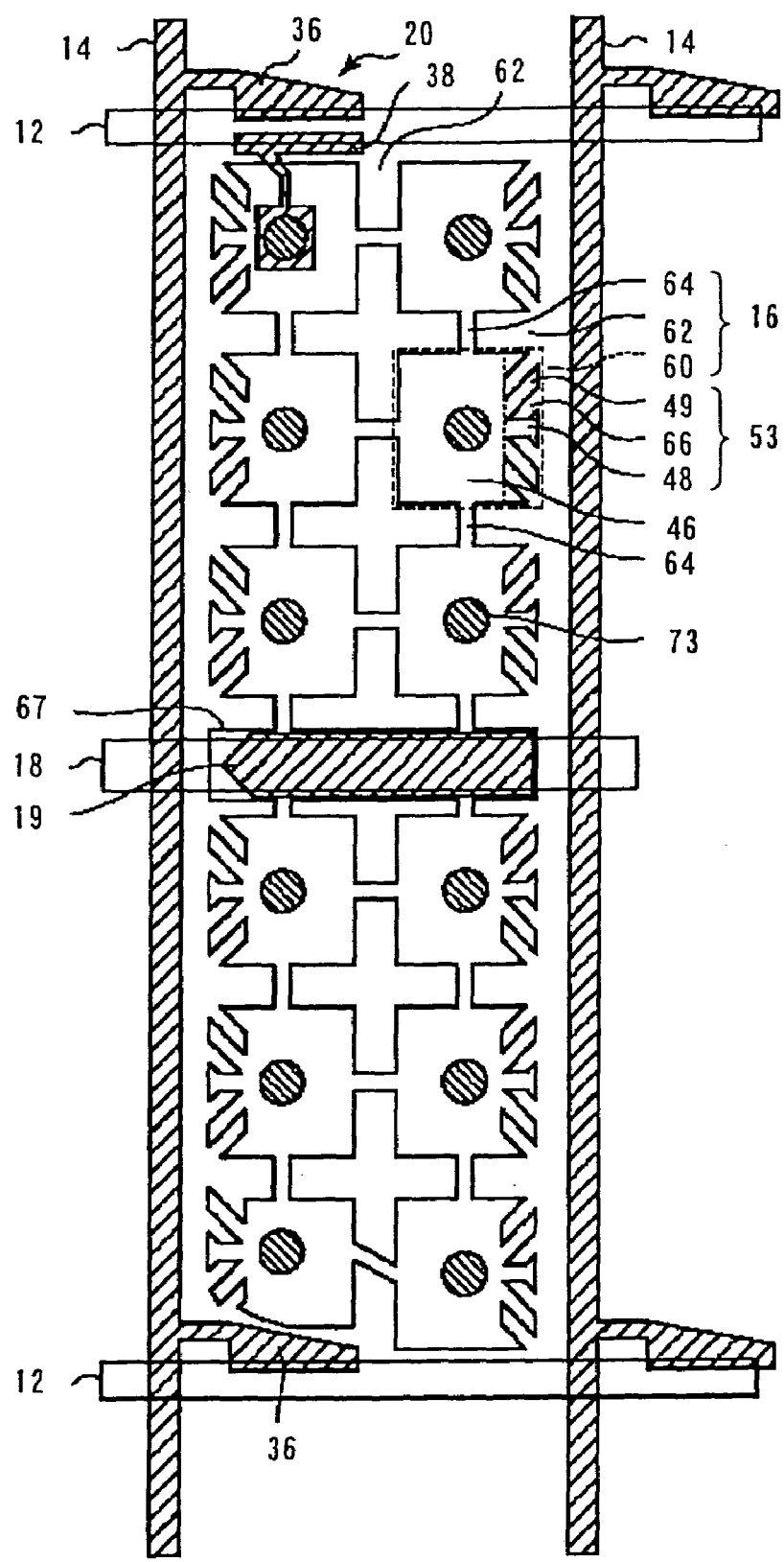
FIG. 42 is a plan view showing a structure of one pixel of a liquid crystal display device according to a fourth embodiment of the invention.

A liquid crystal display device according to a fourth, embodiment of this invention will be described with reference to FIG. 42. FIG. 42 is a plan view showing a structure of one pixel of the liquid crystal display device according to this embodiment. Incidentally, structural elements similar to those of the liquid crystal display device of the third embodiment are denoted by the same reference numerals, and their description will be omitted or simplified.

The basic structure of the liquid crystal display device according to this embodiment is almost the same as the liquid crystal display device according to the third embodiment except for the shape of an electrode unit 60 constituting a pixel electrode 16. A main feature of the liquid crystal display device according to this embodiment is that in the electrode unit 60, a comb electrode 53 is formed in an area close to one side of a square outer periphery at a drain bus line 14 side, and the other area is a solid part 46.

In the liquid crystal display device according to this embodiment, as shown in FIG. 42, in the electrode unit 60 having the square outer periphery, the comb electrode 53 made of a stem part 48 and branch parts 49 is formed in the area close to one side, adjacent to the drain bus line 14, of the sides of the outer periphery parallel to the drain bus line 14. The other area of the electrode unit 60 is the solid part 46. The solid part 46 is formed to have a width of, for example 28 μm from the side, farther from the drain bus line 14, of the sides of the outer periphery parallel to the drain bus line 14. In this case, the area of 80% of the electrode unit 60 having the square outer periphery of 35 μm×35 μm is the solid part 46.

An adjacent electrode unit 60 is electrically connected by a connection electrode 64 formed to be connected to the solid part 46.

In the electrode unit 60 of the liquid crystal display device according to this embodiment, the reason why the comb electrode 53 is formed in the area close to the one side of the square outer periphery at the drain bus line 14 side is as follows.

Similarly to the case of the third embodiment, the adjacent electrode unit 60 is disposed to be separated by a slit 62, and the connection electrode 64 is formed to connect center parts of the sides of the outer peripheries of the adjacent electrode units 60.

In the electrode unit 60, at the side where the connection electrode 64 is connected. That is, among the four sides of the outer periphery of the electrode unit 60, the control of singular points of the three sides to which the connection electrodes 64 are connected is suitably performed.

The domain of liquid crystal in the vicinity of the drain bus line 14 is pulled by the flow of this singular point, and an inclination alignment occurs in an unexpected vertical direction. As a result, the balance of alignment division of the liquid crystal is lost, roughness of the display occurs, and a mark remains in the case where the liquid crystal panel is pressed by a finger.

In the liquid crystal display device according to this embodiment, since the area of the comb electrode 53 is provided along the drain bus line 14, the alignment of the liquid crystal at the end part of the drain bus line 14 is clearly divided into two areas of an upper direction (in FIG. 42, upper right direction/upper left direction) and a lower direction (in FIG. 42, lower right direction/lower left direction) by this comb electrode 53. Since the two alignment areas are provided, the domain of the liquid crystal divided into upper and lower parts passes through the portion of the stem part 48 without fail. By this, it is possible to obtain such effects that the disturbance of the domain of the liquid crystal along the drain bus line 14 can be prevented, the roughness of the display is suppressed, and a mark does not remain in the case where an outer force is applied, for example, the liquid crystal panel is pressed by a finger.

Besides, as compared with the liquid crystal display device according to the third embodiment, in the liquid crystal display device according to this embodiment, since the square measure of the solid part 46 in the electrode unit 60 is large, the occurrence of brightness difference or uneven display due to the dimension variation of the comb electrode 53 can be further effectively suppressed.

Fifth Embodiment

Figure 43:
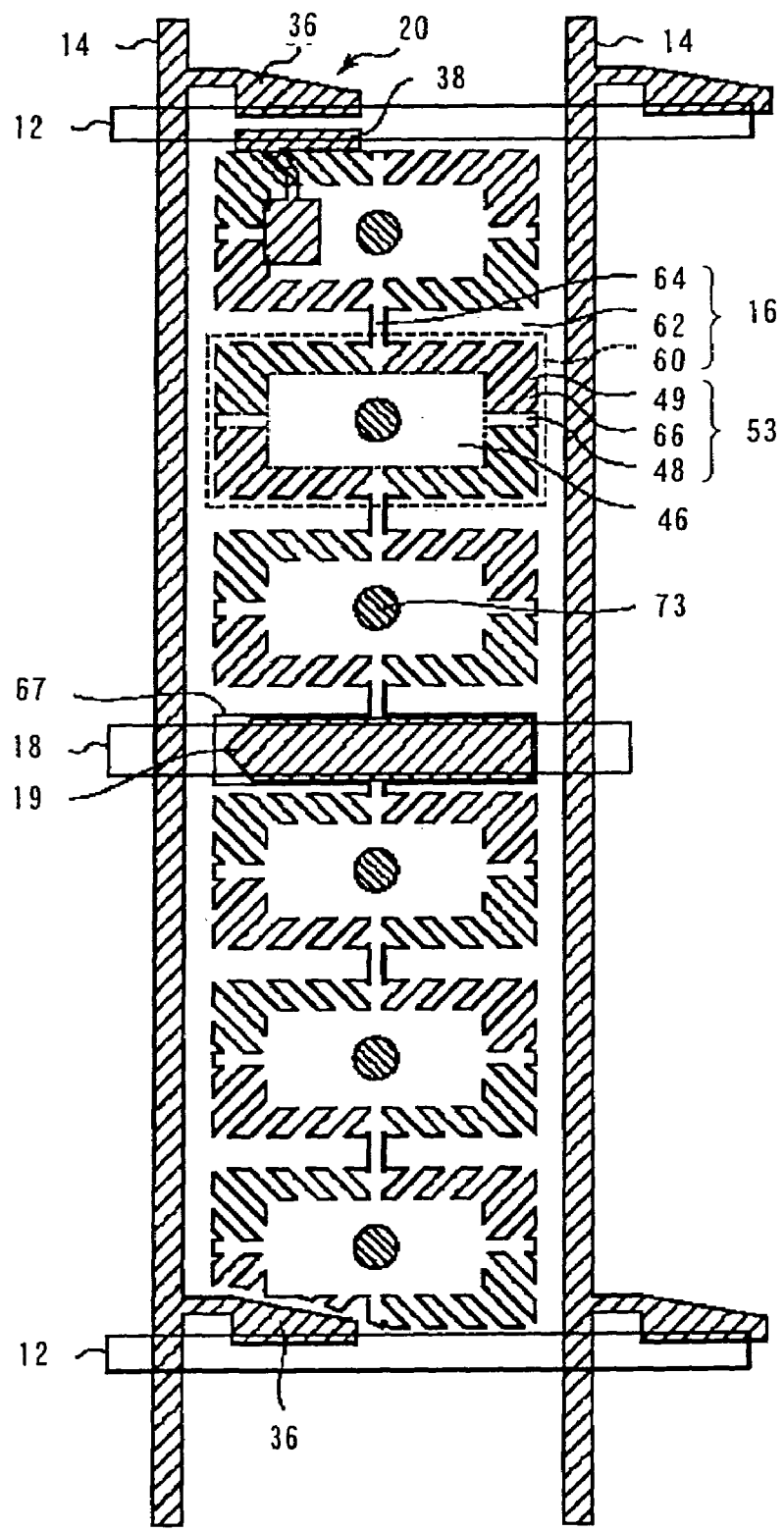
FIG. 43 is a plan view showing a structure of one pixel of a liquid crystal display device according to a fifth embodiment of the invention.

A liquid crystal display device according to a fifth embodiment of the invention will be described with reference to FIG. 43. FIG. 43 is a plan view showing a structure of one pixel of the liquid crystal display device according to this embodiment. Incidentally, structural elements similar to those of the liquid crystal display device according to the third embodiment are denoted by the same reference number, and their description will be omitted or simplified.

The basic structure of the liquid crystal display device according to this embodiment is almost the same as the liquid crystal display device according to the third embodiment except for the shape of an electrode unit 60 constituting a pixel electrode 16. The liquid crystal display device according to this embodiment is different from the liquid crystal display device according to the third embodiment in that the electrode unit 60 has a rectangular outer periphery.

As shown in FIG. 43, the pixel electrode 16 in the liquid crystal display device according to this embodiment has the rectangular outer periphery, and includes a plurality of electrode units 60 smaller than the pixel area, a slit 62 formed between the adjacent electrode units 60, and a connection electrode 64 for electrically connecting the electrode units 60, separated by the slit 62, to each other. In FIG. 43, the three electrode units 60 (six units in total) of three lines in the direction parallel to a gate bus line 12 and one line in the direction parallel to a drain bus line 14 are disposed at each of both sides of a storage capacitor bus line 18 in the vertical direction in the drawing.

The electrode unit 60 includes an almost rectangular solid part 46 having sides almost parallel to or vertical to the gate bus line 12 and the drain bus line 14. The width of the rectangular solid part 46 in the direction parallel to the gate bus line 12 is, for example, 60 μm. Besides, the width of the rectangular solid part 46 parallel to the drain bus line 14 is, for example, 25 μm.

Besides, the electrode unit 60 includes a stem part 48 branching from the center of each of sides of the solid part 46 and extending almost in parallel with or vertically to the gate bus line 12 and the drain bus line 14. The size of the stem part 48 extending almost in parallel with the gate bus line 12 is, for example, 9 μm in length and 5 μm in width. The size of the stem part 48 extending almost in parallel with the drain bus line 14 is, for example, 5 μm in length and 5 μm in width.

Further, the electrode unit 60 includes a plurality of branch parts 49 branching from the solid part 46 and the stem part 48 and extending obliquely with respect to the stem part 48 to form a comb shape, and electrode blank parts 66 between the adjacent branch parts 49. In an area partitioned by the adjacent stem parts 48, the branch parts 49 branching from the solid part 46 and the stem parts 48 extend in almost the same direction. In FIG. 43, the six branch parts 49 extend in the same direction in the area partitioned by the adjacent stem parts 48.

An angle between the stem part 48 and the branch part 49 is, for example, 45°. The width of the branch part 49 is, for example, 3 μm, and the width of the blank part 66 is, for example, 3 μm.

Similarly to the liquid crystal display device according to the third embodiment, the end part of each of the branch parts 49 is formed almost in parallel with or vertically to the gate bus line 12 and the drain bus line 14, and by this, the outer periphery of the electrode unit 60 becomes almost rectangular. The width of the outer periphery of the electrode unit 60 in the direction parallel to the gate bus line 12 is, for example, 78 μm. Besides, the width in the direction parallel to the drain bus line 14 is, for example, 35 μm.

The adjacent electrode units 60 are electrically connected to each other by the connection electrode 64 formed to be connected to the stem parts 48 positioned at the centers of the respective sides of the outer peripheries of the electrode units 60. Since the electrode units 60 in only one line is provided in the direction parallel to the drain bus line 14, the connection electrode 64 is formed only in the direction parallel to the drain bus line 14.

Besides, in the lower part of the pixel area in the drawing, a drain electrode 36 of a TFT 20 of a lower adjacent pixel area is formed to protrude. From the same reason as the case of the third embodiment, the shape of the electrode unit 60 (at the lower part in FIG. 43) positioned in this area is formed into such a shape that a part of the rectangle corresponding to the shape of the drain electrode 36 is cut away. Specifically, while the shape of the outer periphery of the other electrode unit 60 is a rectangular shape of 35 μm×78 μm, the shape of the outer periphery of the electrode unit 60 in this area is such a shape that a part of the rectangle is cut away so that it is spaced from the drain electrode by 7 μm.

A main feature of the liquid crystal display device according to this embodiment is that the electrode unit 60 includes the rectangular solid part 46 having the same long axis direction as the rectangular outer periphery.

In the case where the outer peripheral shape of the electrode unit 60 is rectangular, when the square solid part 46 is merely formed as in the case according to the third embodiment, the areal ratio of the solid part 46 to the electrode unit 60 becomes small. Thus, it is conceivable that even if the solid part 46 is formed, the effect to suppress the change of brightness due to the variation of width of the comb electrode 53 can not be sufficiently obtained. On the other hand, in the case where almost all area of the electrode unit 60 is made the solid part 46, since the outer peripheral shape of the electrode unit 60 is rectangular, it is conceivable that the control of a singular point becomes difficult.

In the liquid crystal display device according to this embodiment, in the electrode unit 60 having the rectangular outer periphery, the rectangular solid part 46 having the same long axis direction as the outer periphery is formed in conformity with the shape of the outer periphery of the rectangular shape. Thus, the change of brightness due to the variation of width of the comb electrode 53 can be sufficiently suppressed, and the control of the singular point does not become difficult.

Incidentally, also in the liquid crystal display device according to this embodiment, similarly to the case of the liquid crystal display device according to the third embodiment in which the outer periphery of the electrode unit 60 is square, in order to sufficiently suppress the occurrence of the difference in brightness due to the variation in width of the branch part 49, it is preferable that the ratio of the square measure of the solid part 46 to the square measure of the area within the outer periphery of the electrode unit 60 is a predetermined value or more, for example, 50% or more.

MODIFIED EXAMPLE

Figure 44A:
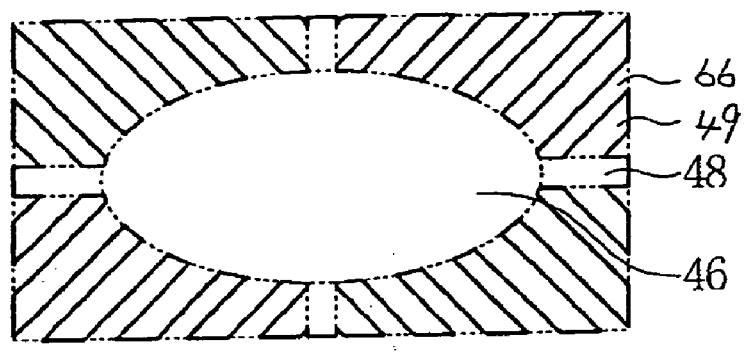
FIGS. 44A to 44C are plan views showing shapes of electrode units of a liquid crystal display device according to a modified example of the fifth embodiment of the invention.
Figure 44B:
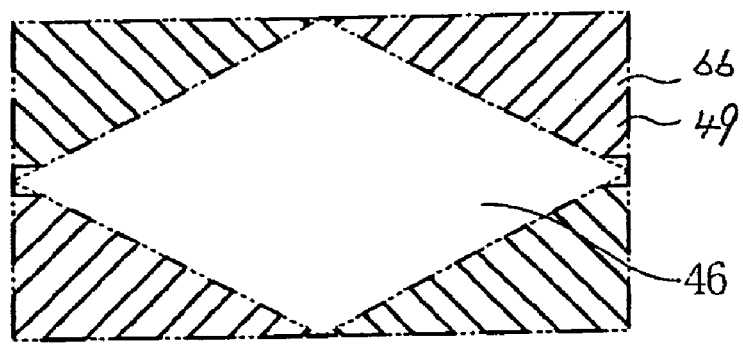
Figure 44C:
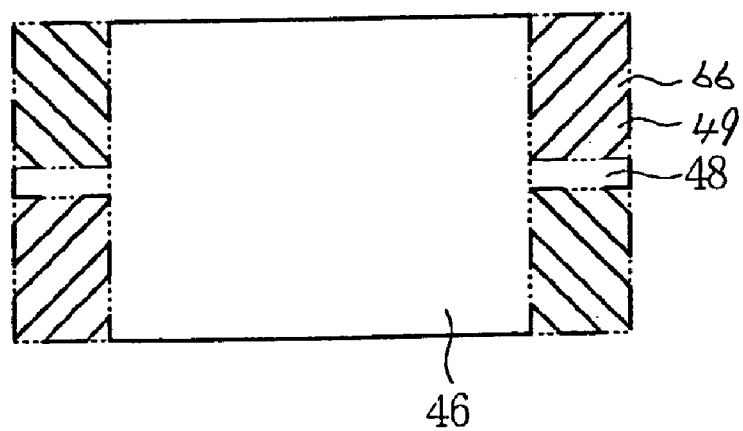

A liquid crystal display device according to a modified example of the fifth embodiment of the invention will be described with reference to FIGS. 44A to 44C. FIGS. 44A to 44C are plan views showing shapes of electrode units in the liquid crystal display device according to this modified example.

In the above, as shown in FIG. 43, although the rectangular solid part 46 is provided at the center part of the electrode unit 60 having the rectangular outer periphery, similarly to the case according to the modified example of the third embodiment shown in FIGS. 41A to 41N, the shape of the electrode unit 60 can be made various shapes in addition to this.

For example, the shape of the solid part 46 may be made an elliptical shape as shown in FIG. 44A.

Besides, as shown in FIG. 44B, the shape of the solid part 46 may be made a rhombic shape formed by connecting the center points of the respective sides of the outer periphery of the electrode unit 60. Incidentally, the rhombic solid part 46 may be smaller than that shown in FIG. 44B, and the shape may be distorted.

Besides, for example, as shown in FIG. 44C, the shape of the solid part 46 maybe made a band shape reaching two opposite sides of the outer periphery of the electrode unit 60, and the comb electrodes 53 may be formed at the other two sides, that is, at both sides of the band-shaped solid part 46. Incidentally, the liquid crystal display device including the electrode unit 60 having the shape shown in FIG. 44C will be described in detail in a sixth embodiment.

Sixth Embodiment

Figure 45:
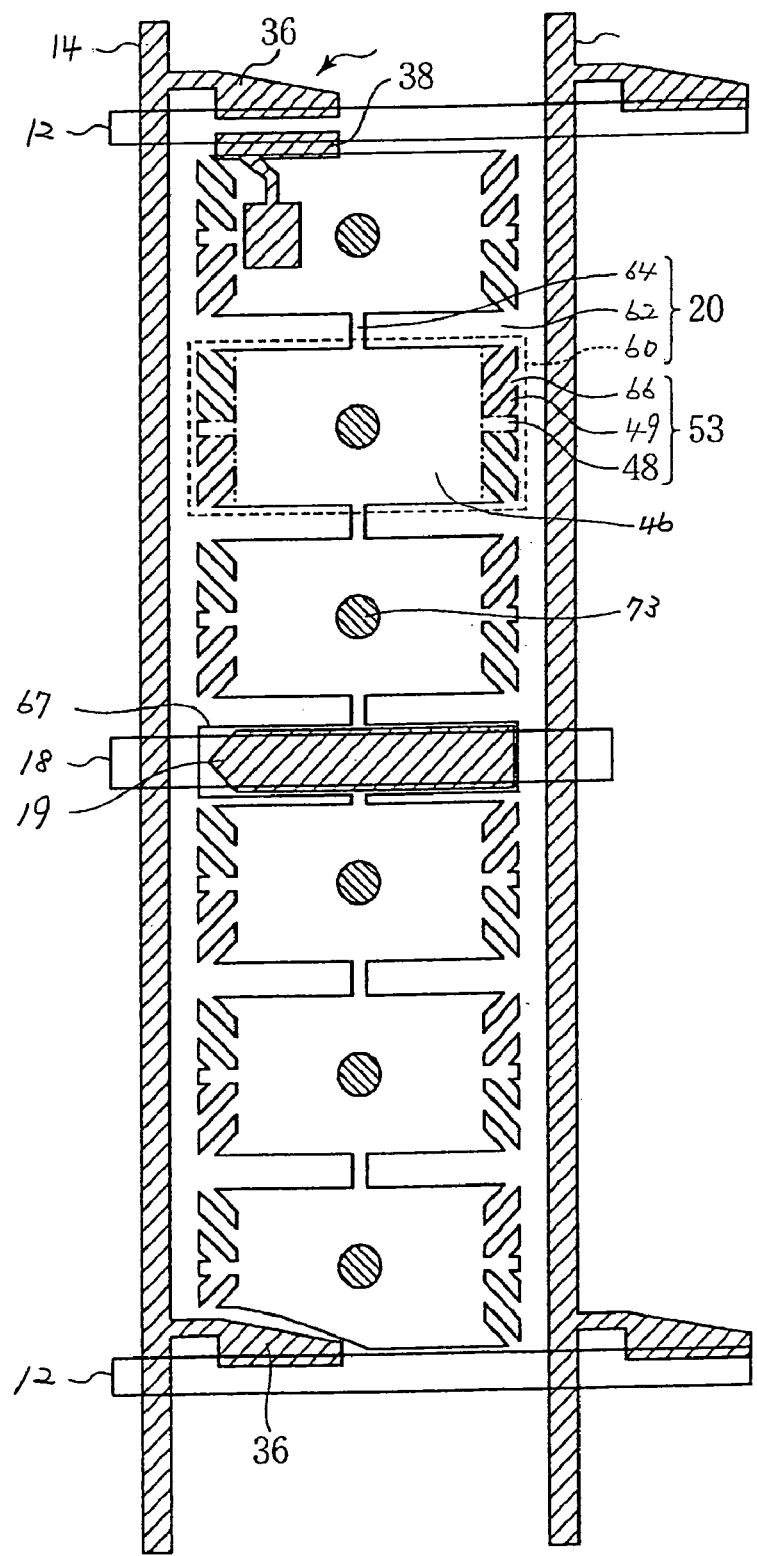
FIG. 45 is a plan view showing a structure of one pixel of a liquid crystal display device according to a sixth embodiment of the invention.

A liquid crystal display device according to a sixth embodiment of the invention will be described with reference to FIG. 45. FIG. 45 is a plan view showing a structure of one pixel of the liquid crystal display device according to this embodiment. Incidentally, structural elements similar to those of the liquid crystal display device according to the fifth embodiment are denoted by the same reference numerals, and their description will be omitted or simplified.

The basic structure of the liquid crystal display device according to this embodiment is almost the same as the liquid crystal display device according to the fifth embodiment except for the shape of an electrode unit 60 constituting a pixel electrode 16. A main feature of the liquid crystal display device according to this embodiment is that in the electrode unit 60, comb electrodes 53 are formed in areas close to the two sides of the rectangular outer periphery at the drain bus line 14 side, and the other area is a solid part 46.

As shown in FIG. 45, in the electrode unit 60 having the rectangular outer periphery, the comb electrodes 53 each made of a stem part 48 and branch parts 49 are formed in the areas close to the two sides of the outer periphery parallel to the drain bus line 14. In the case where the width of the outer periphery of the electrode unit 60 is made, for example, 35 μm×78 μm similarly to the liquid crystal display device according to the fifth embodiment, the widths of the areas where the comb electrodes 53 are formed are respectively, for example, 7 μm from the two sides of the outer periphery of the electrode unit 60 parallel to the drain bus line 14. In this case, the width of the solid part 46 in the direction parallel to the gate bus line 12 is 64 μm.

In the liquid crystal display device according to this embodiment, similarly to the liquid crystal display device according to the fourth embodiment, since the comb electrode 53 is formed in the area along the drain bus line 14, by this comb electrode 53, the alignment of liquid crystal at the end part of the drain bus line 14 is clearly divided into two areas of the upper direction (in FIG. 45, upper right direction/upper left direction) and the lower direction (in FIG. 45, lower right direction/lower left direction). Since the two alignment areas are provided as stated above, the domain of the liquid crystal divided vertically passes through the portion of the stem part 48 without fail. By this, it is possible to obtain such effects that the disturbance of the domain of the liquid crystal along the drain bus line 14 can be prevented, roughness of the display is suppressed, and in the case where outer force is applied, for example, the liquid crystal panel is pressed by a finger, a mark does not remain.

Besides, in the liquid crystal display device according to this embodiment, as compared with the liquid crystal display device according to the fifth embodiment including the electrode unit 60 having the rectangular outer periphery, since the square measure of the solid part 46 is large in the electrode unit 60, it is possible to further effectively suppress the occurrence of brightness difference and uneven display due to the size variation of the comb electrode 53.

Seventh Embodiment

Figure 46:
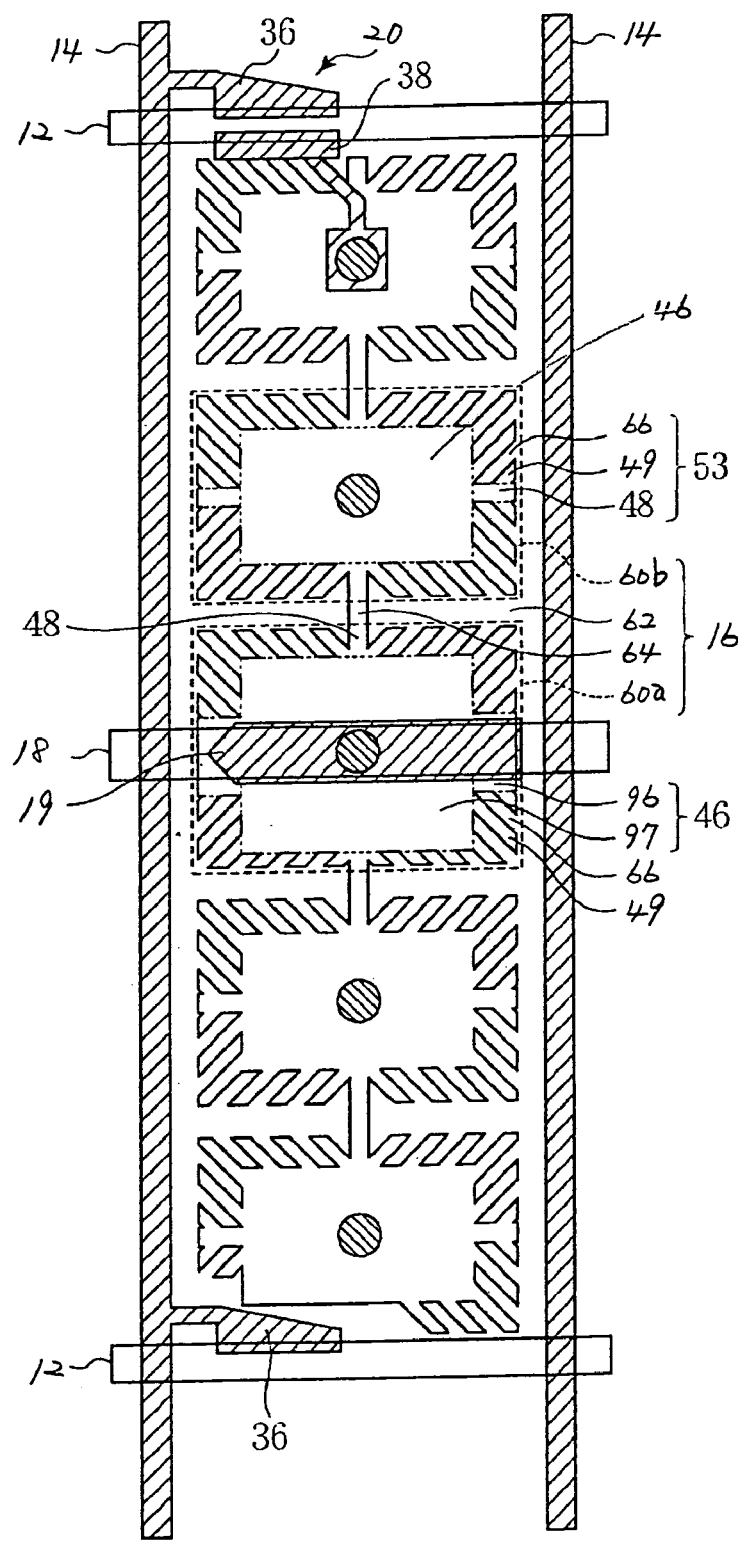
FIG. 46 is a plan view showing a structure of one pixel of a liquid crystal display device according to a seventh embodiment of the invention.

A liquid crystal display device according to a seventh embodiment of the invention will be described with reference to FIG. 46. FIG. 46 is a plan view showing a structure of one pixel of the liquid crystal display device according to this embodiment. Incidentally, structural elements similar to those of the liquid crystal display device according to the fifth embodiment are denoted by the same reference numerals and their description will be omitted or simplified.

The basic structure of the liquid crystal display device according to this embodiment is almost the same as the liquid crystal display device according to the fifth embodiment except for the shape of an electrode unit 60 constituting a pixel electrode 16. A main feature of the liquid crystal display device according to this embodiment is that an electrode unit 60a is formed on a storage capacitor electrode 19.

As shown in FIG. 46, the pixel electrode 16 of the liquid crystal display device according to this embodiment includes the electrode unit 60a which is formed at the center of the pixel area in which the storage capacitor electrode 19 is formed, has the rectangular outer periphery, and is smaller than the pixel area, and a plurality of electrode units 60b which are formed between the electrode unit 60a and upper and lower gate bus lines 12, and each of which has a rectangular outer periphery and is smaller than the pixel area. The electrode units 60a and 60b are separated by a slit 62. Further, the pixel electrode 16 includes a connection electrode 64 for electrically connecting the electrode units 60a and 60b, separated by the slit 62, to each other. In FIG. 46, in the direction parallel to the drain bus line 14, there are disposed the one electrode unit 60a, and the two (four in total) electrode units 60b disposed between the electrode unit 60a and the upper and lower gate bus line 12.

The electrode unit 60a is electrically connected to the storage capacitor electrode 19 through a contact hole formed in an insulating film under the electrode unit 60a.

The electrode unit 60a includes a rectangular portion 96 having sides almost parallel to or vertical to the gate bus line 12 and the drain bus line 14, and a solid part 46 having convex portions 97 protruding from the sides of the rectangular portion 96 parallel to a drain bus line 14 and covering the upper sides of both ends of the storage capacitor electrode 19.

Besides, the electrode unit 60a includes a stem part 48 branching from the center of the side of the rectangular portion 96 of the solid part 46 parallel to the gate bus line 12 and extending almost parallel to the drain bus line 14, and the size of the stem part 48 is, for example, 5 μm in length and 5 μm in width.

Further, the electrode unit 60a includes a plurality of branch parts 49 branching from the rectangular portion 96 of the solid part 46 and the convex portion 97 and extending obliquely with respect to the stem part 48 to form a comb shape, and electrode blank parts 66 between the adjacent branch parts 49. In an area partitioned by the adjacent stem parts 48 and the rectangular portion 96, the respective branch parts 49 branching from the solid part 46 extend in almost the same direction.

On the other hand, the electrode unit 60b includes a rectangular solid part 46 having sides almost parallel to or vertical to the gate bus line 12 and the drain bus line 14. The width of the rectangular solid part 46 of the electrode unit 60b in the direction parallel to the gate bus line 12 is, for example, 60 μm. Besides, the width in the direction parallel to the drain bus line 14 is, for example, 39 μm.

Besides, the electrode unit 60b includes a stem part 48 branching from the center of each of the sides of the solid part 46 and extending almost in parallel with or vertically to the gate bus line 12 and the drain bus line 14. The size of the stem part 48 extending almost in parallel with the gate bus line 12 is, for example, 9 μm in length and 5 μm in width. The size of the stem part 48 extending almost in parallel with the drain bus line 14 is, for example, 5 μm in length and 5 μm in width.

Further, the electrode unit 60b includes a plurality of branch parts 49 branching from the solid part 46 and extending obliquely with respect to the stem part 48 to form a comb shape, and electrode blank parts 66 between the adjacent branch parts 49. In an area partitioned by the adjacent stem parts 48, the branch parts branching from the solid part 46 and the stem parts 48 extend in almost the same direction.

An angle between the stem part 48 and the branch part 49 in the electrode units 60a and 60b is, for example, 45°. The width of the branch part 49 is, for example, 3 μm and the width of the branch part 66 is, for example, 3 μm.

The ends of the respective branch parts 49 of the electrode units 60a and 60b are formed almost in parallel with or vertically to the gate bus line 12 and the drain bus line 14, and by this, the outer peripheries of the electrode units 60a and 60b are almost rectangular. The width of the outer periphery of the electrode unit 60a in the direction parallel to the gate bus line 12 is, for example, 78 μm, and the width in the direction parallel to the drain bus line 14 is, for example, 64 μm. The width of the outer periphery of the electrode unit 60*b* in the direction parallel to the gate bus line 12 is, for example, 78 μm, and the width in the direction parallel to the drain bus line 14 is, for example, 49 μm.

The adjacent electrode units 60*a* and 60*b* are electrically connected to each other by the connection electrode 64 formed to be connected to the stem parts 48 positioned at the centers of the sides of the rectangular electrode units 60*a* and 60*b* parallel to the gate bus line 12.

Besides, in the lower part of the pixel area in the drawing, a drain electrode 36 of a TFT 20 of a lower adjacent pixel area is formed to protrude. From the same reason as the case of the third embodiment, the shape of the electrode unit 60*b* (lowermost one in FIG. 46) corresponding to this area is formed into such a shape that a part of the rectangle is cut away in conformity with the shape of the drain electrode 36. Specifically, while the shape of the outer periphery of the other electrode unit 60*b* is a rectangle of 49 μm×78 μm, the shape of the outer periphery of the electrode unit 60 in this area is such a shape that a part of the rectangle is cut away so that it is spaced from the drain electrode 36 by 7 μm.

As stated above, the electrode unit 60*a* constituting the pixel electrode 16 may be formed on the storage capacitor electrode 19 formed in the vicinity of the center of the pixel area.

Although the shape of the electrode unit 60*a* formed on the storage capacitor electrode 19 is not limited to that shown in FIG. 46, it is preferable that the shape satisfies following conditions.

First, it is necessary that the electrode unit 60*a* includes the solid part to cover all the area on the storage capacitor electrode 19.

Besides, in the area where the storage capacitor electrode 19 is formed, the same conductive layer as the gate bus line 12 and the drain bus line 14 is formed in a laminate state through an insulating film. Thus, light can hardly pass through the area where the storage capacitor electrode 19 is formed. Accordingly, it is necessary that the electrode unit 60*a* includes a solid part also in an area other than the area on the storage capacitor electrode 19.

Eighth Embodiment

A liquid crystal display device according to an eighth embodiment of the invention and a method of manufacturing the same will be described with reference to FIGS. 47 to 55C. Incidentally, structural elements similar to those of the liquid crystal display device according to the fifth embodiment are denoted by the same reference numerals and their description will be omitted or simplified.

Figure 47:
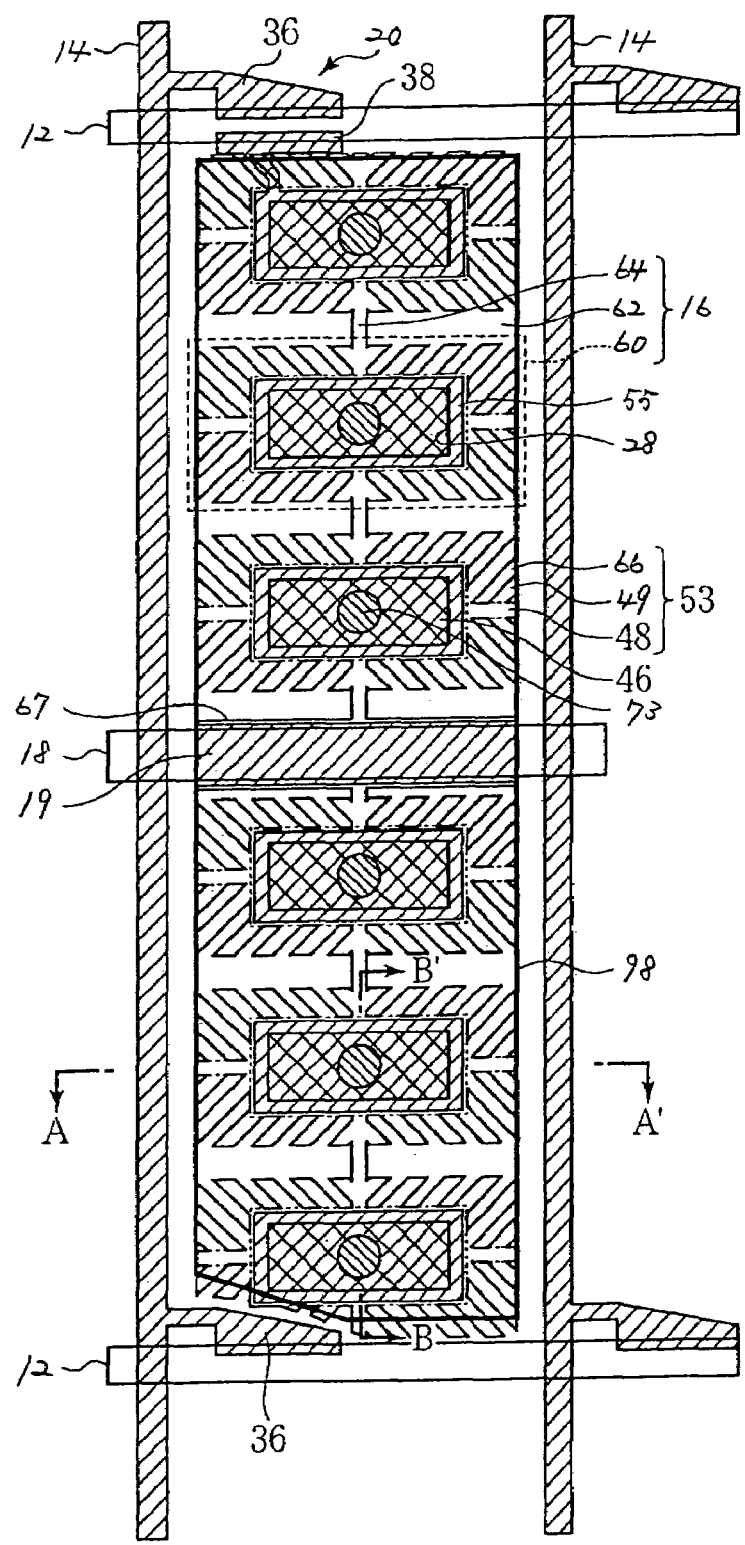
FIG. 47 is a plan view showing a structure of one pixel of a liquid crystal display device according to an eighth embodiment of the invention.
Figure 48A:
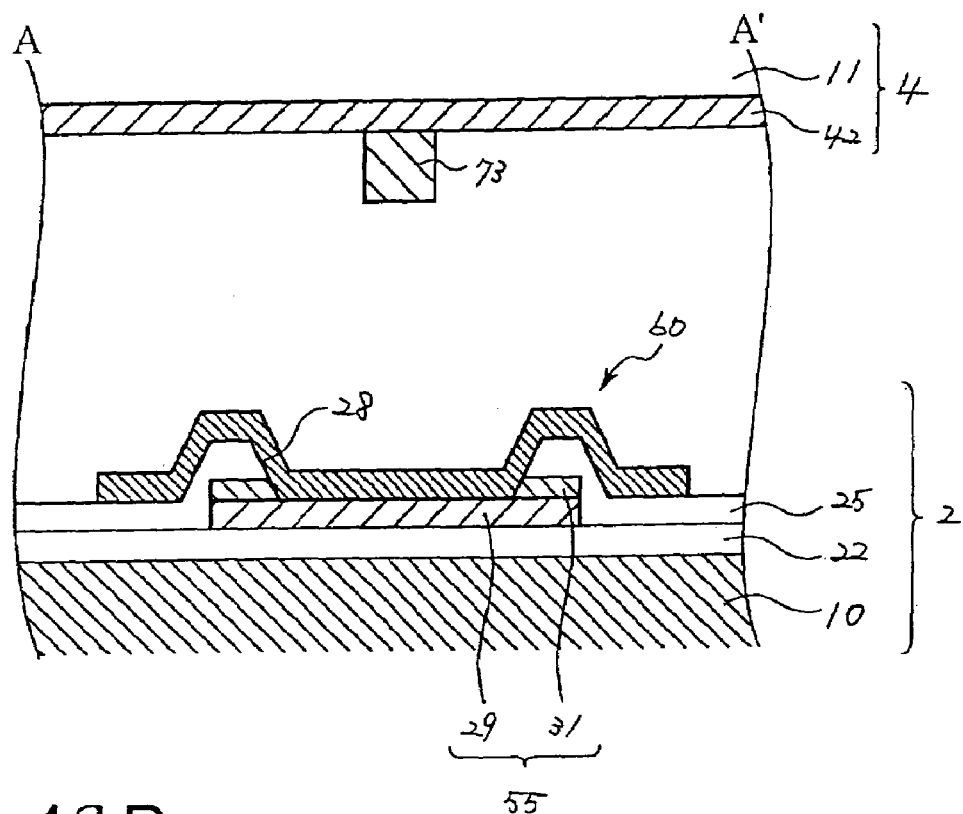
FIGS. 48A and 48B are sectional views showing a structure of the liquid crystal display device according to the eighth embodiment of the invention.
Figure 48B:
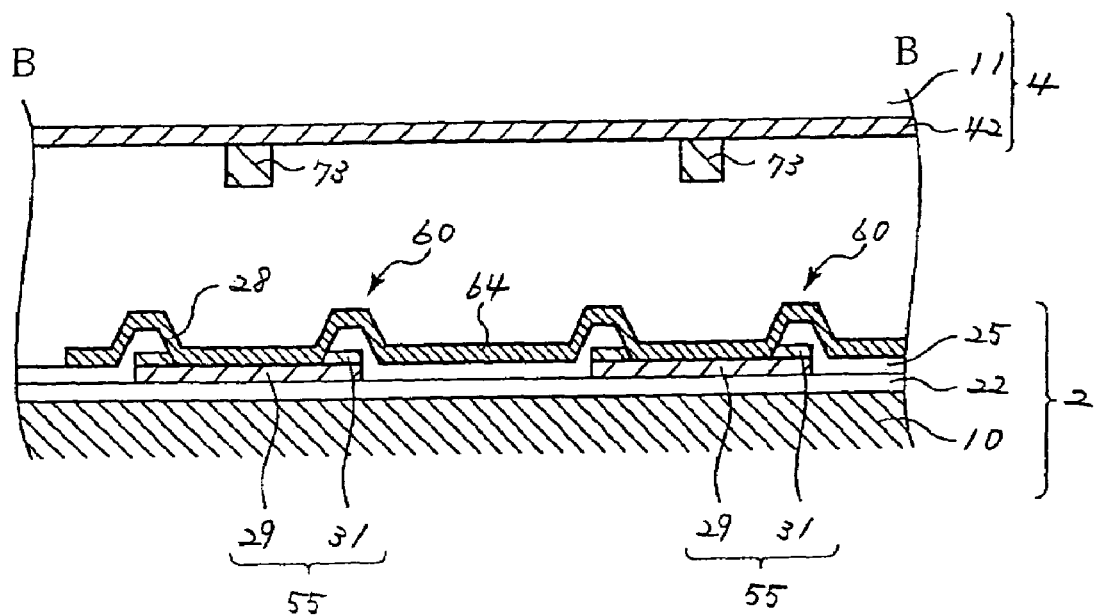
Figure 49:
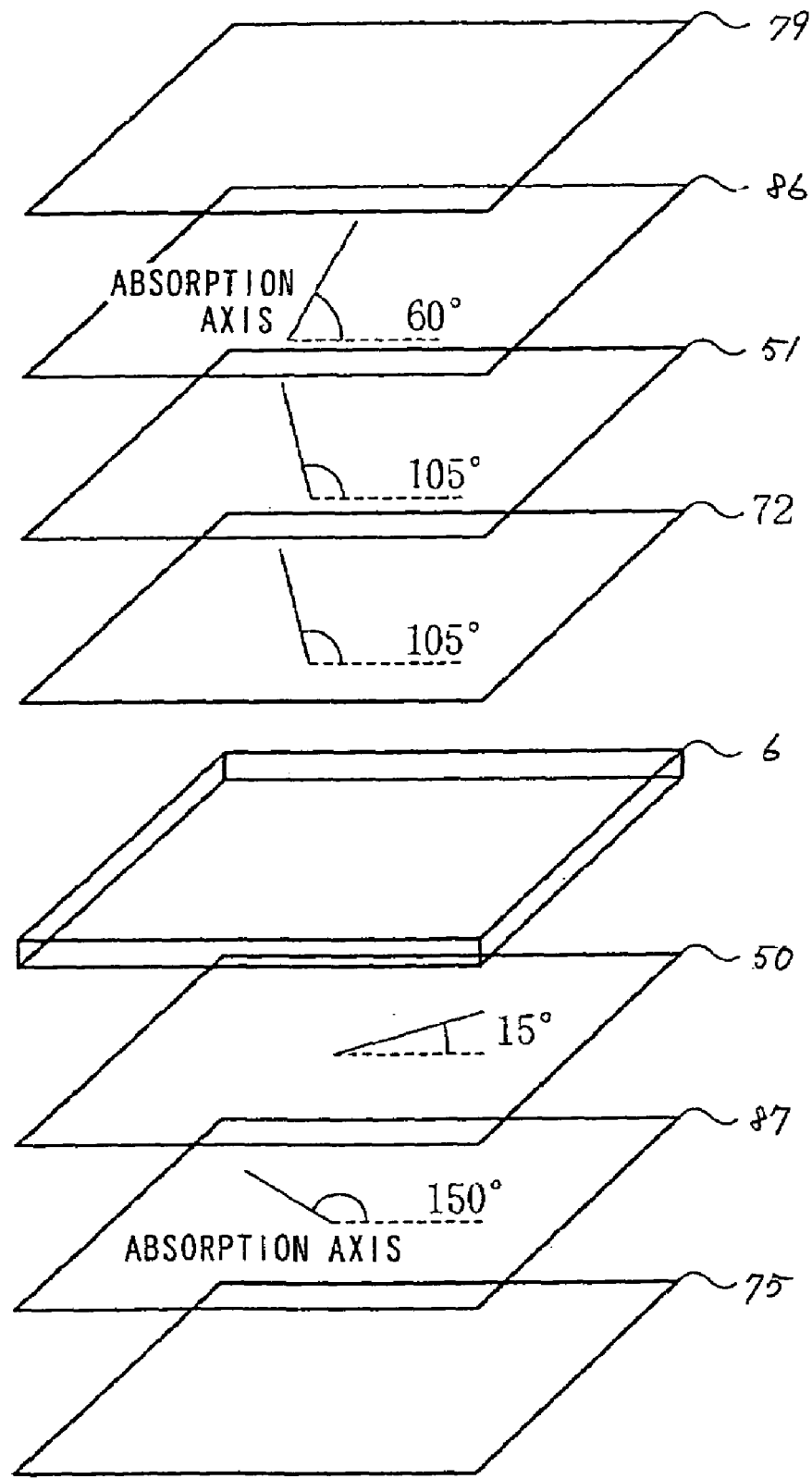
FIG. 49 is a view showing an arrangement of a polarizing plate and the like of the liquid crystal display device according to the eighth embodiment of the invention.
Figure 50:
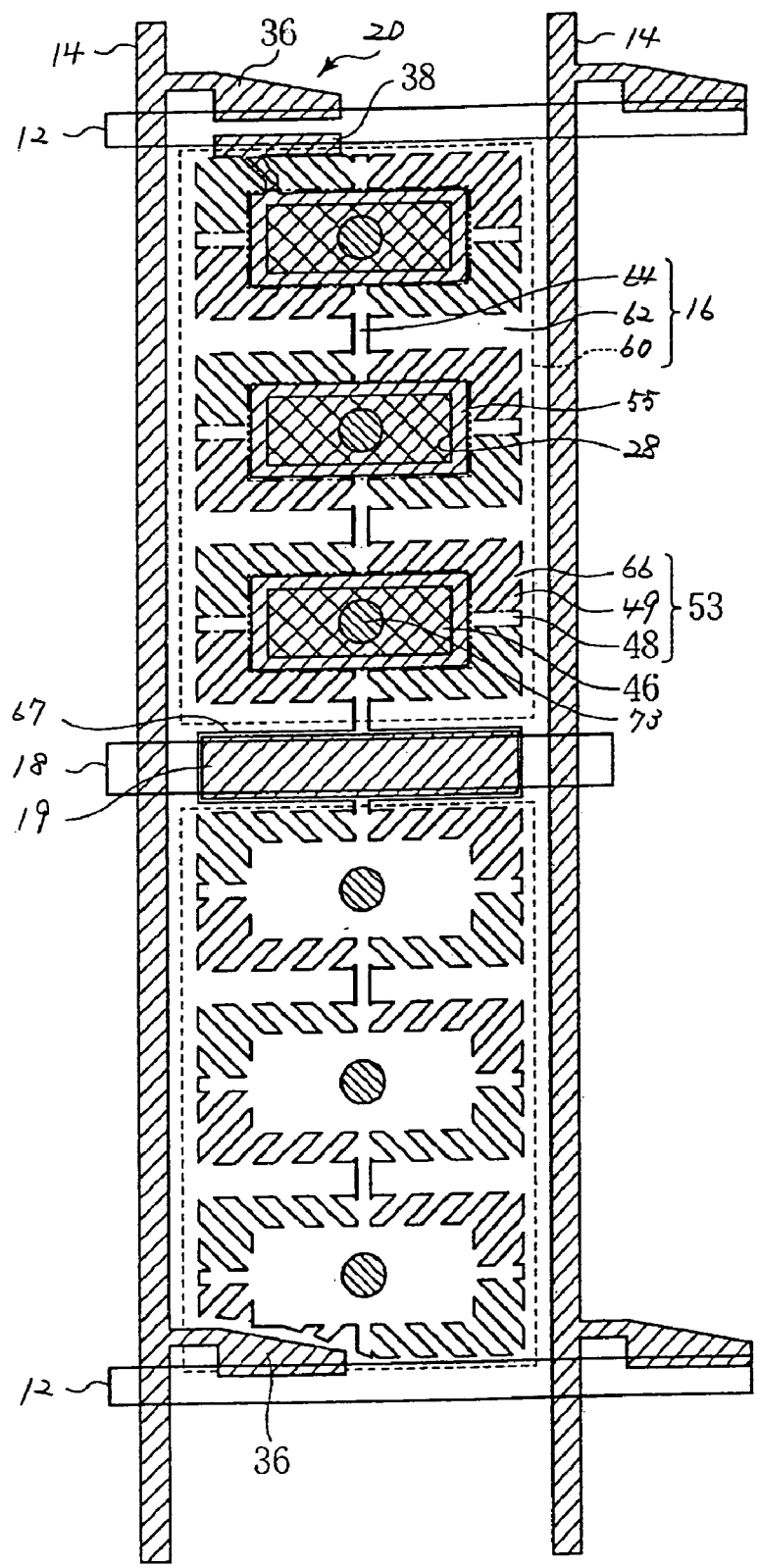
FIG. 50 is a plan view showing a structure of one pixel in a case where the number of reflecting electrode layers is changed in the liquid crystal display device according to the eighth embodiment of the invention.
Figure 51:
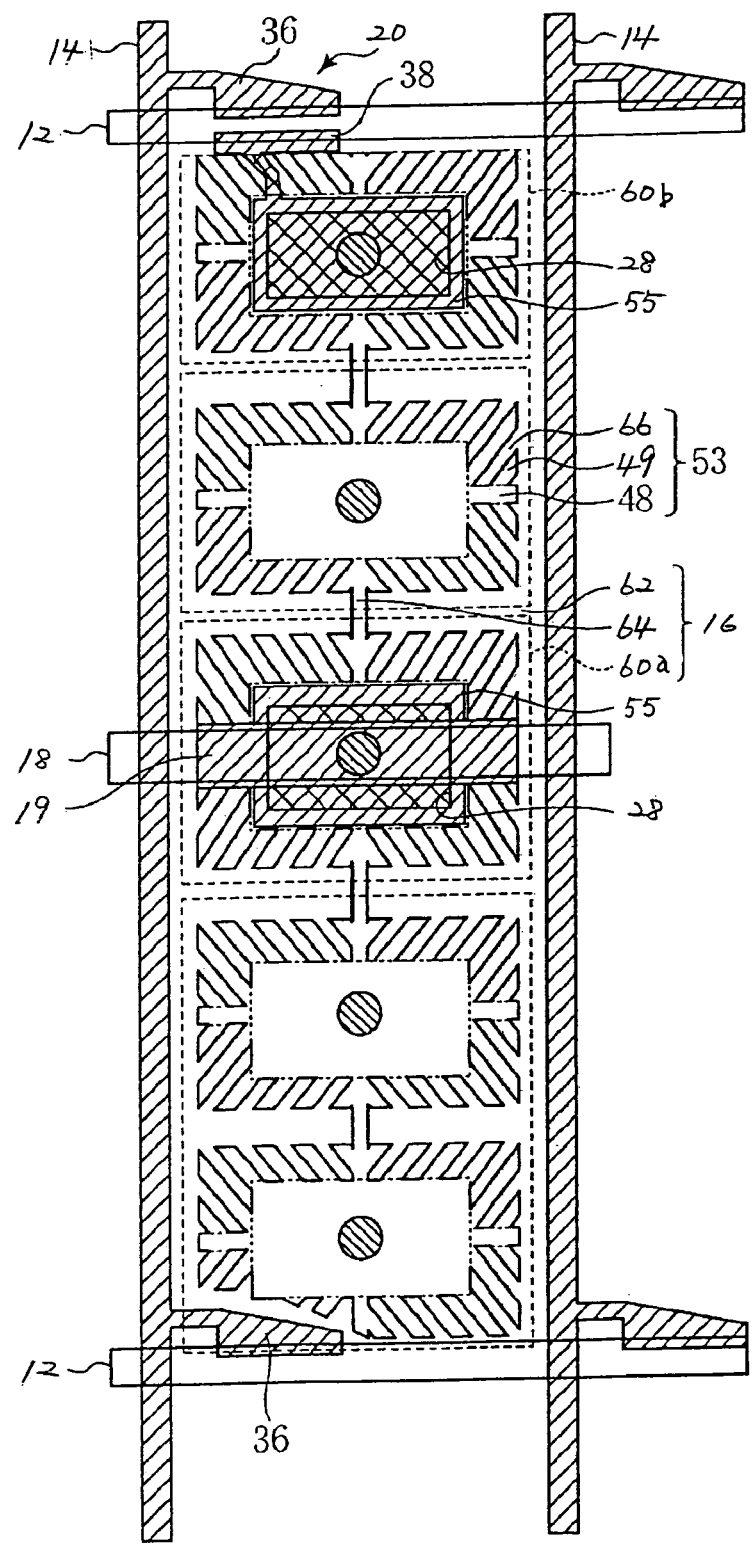
FIG. 51 is a plan view showing a structure of one pixel in a case where a reflecting electrode is formed in an area where a storage capacitor electrode is formed in the liquid crystal display device according to the eighth embodiment of the invention.
Figure 52A:
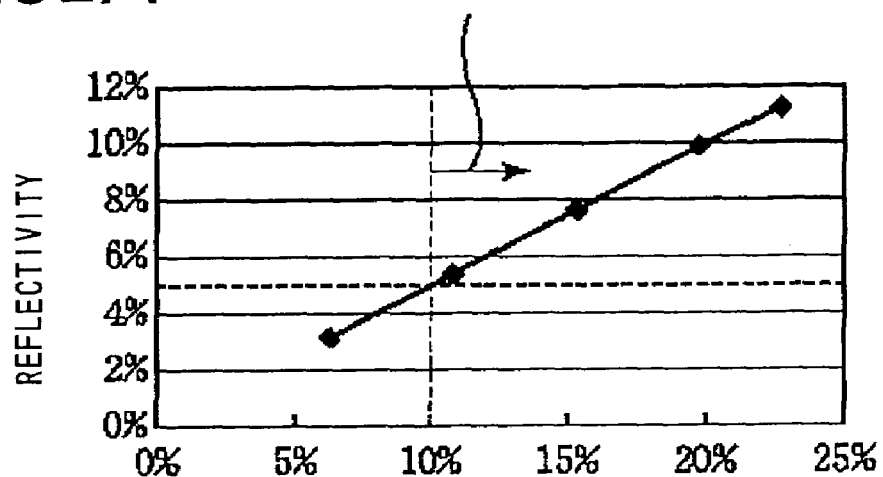
FIGS. 52A and 52B are graphs showing a relation between the areal ratio of a reflection area and the reflectivity in the liquid crystal display device according to the eighth embodiment of the invention, and a relation between the areal ratio of the reflection area and the transmissivity.
Figure 52B:
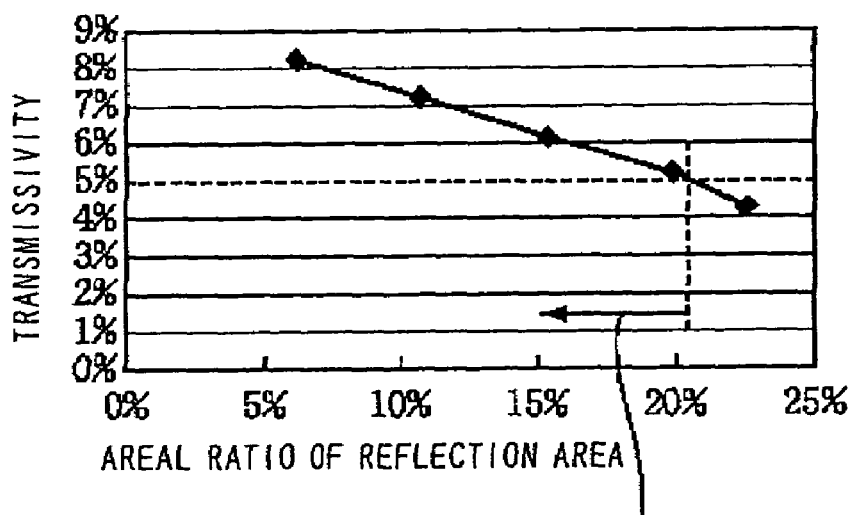
Figure 53A:
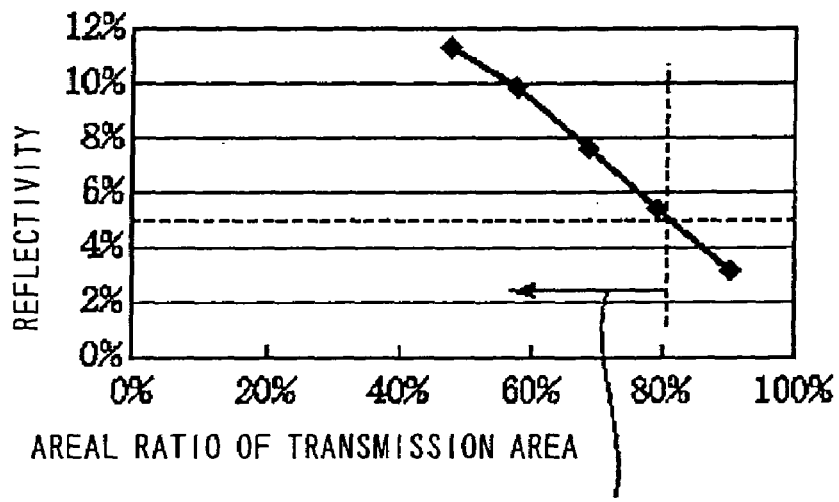
FIGS. 53A and 53B are graphs showing a relation between the areal ratio of a transmission area and the reflectivity in the liquid crystal display device according to the eighth embodiment of the invention, and a relation between the areal ratio of the transmission area and the transmissivity.
Figure 53B:
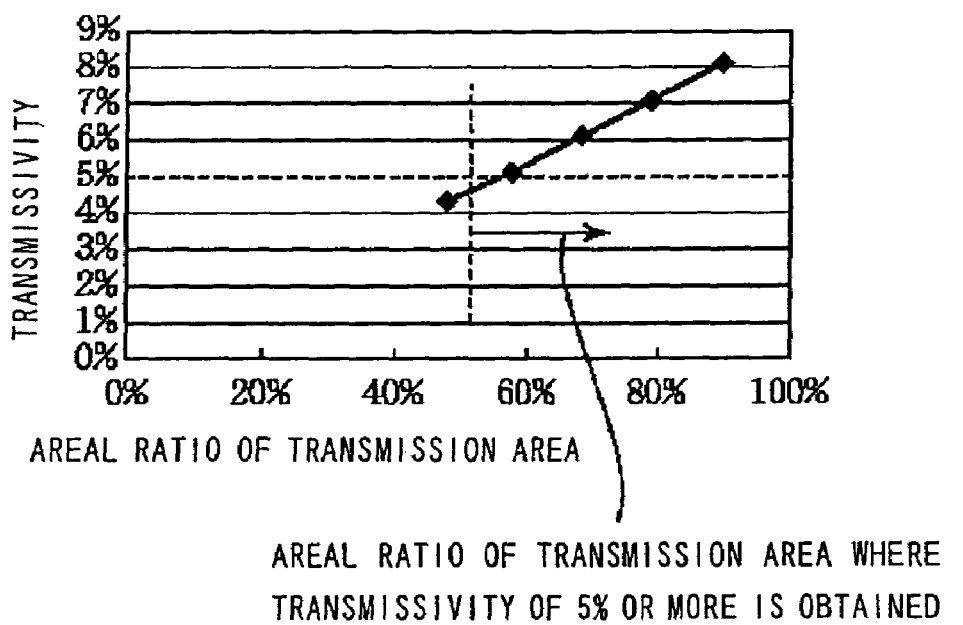

First, the liquid crystal display device according to this embodiment will be described with reference to FIGS. 47 to 53B. FIG. 47 is a plan view showing a structure of one pixel of the liquid crystal display device according to this embodiment, FIG. 48A is a sectional view taken along line A-A' of FIG. 47, FIG. 48B is a sectional view taken along line B-B', FIG. 49 is a view-showing an arrangement of a polarizing plate and the like of the liquid crystal display device according to this embodiment, FIG. 50 is a plan view showing a structure of one pixel in a case where the number of reflecting electrode layers is changed in the liquid crystal display device according to this embodiment, FIG. 51 is a plan view showing a structure of one pixel in a case where a reflecting electrode is formed in an area where a storage capacitor electrode is formed in the liquid crystal display device according to this embodiment, FIGS. 52A and 52B are graphs showing a relation between the opening rate of BM and the reflectivity in the liquid crystal display device according to this embodiment and a relation between the opening rate of BM and the transmissivity, and FIGS. 53A and 53B are graphs showing a relation between the areal ratio of a reflection area and the reflectivity in the liquid crystal display device according to this embodiment and a relation between the areal ratio of the reflection area and the transmissivity.

The liquid crystal display device according to this embodiment is the liquid crystal display device having functions of both the transmission type and the reflection type in which a reflecting electrode is further provided at the TFT substrate 2 side in the liquid crystal display device according to the fifth embodiment.

As shown in FIG. 47, a pixel electrode 16 similar to the liquid crystal display device according to the fifth embodiment is formed in a pixel area surrounded by a gate bus line 12 and a drain bus line 14.

A TFT 20 is formed in the vicinity of an intersection position between the gate bus line 12 and the drain bus line 14 similarly to the liquid crystal display device of the fifth embodiment. Here, a drain electrode 36 and a source electrode 38 are made of a conductive film, for example, a lamination film of an aluminum film and a titanium film, and these are formed of the same conductive film. An area just under a channel protective film of the gate bus line 12 functions as a gate electrode of the TFT 20.

Further, a reflecting electrode 55 having almost the same shape as a solid part 46 is formed under an electrode unit 60 to overlap with the solid part 46 through an insulating film. The width of the reflecting film 55 in the direction parallel to the gate bus line 12 is, for example, 60 μm. The width in the direction parallel to the drain bus line 14 is, for example, 25 μm. Incidentally, the reflecting electrode 55 has only to have the shape almost equal to or smaller than the solid part 46 of the electrode unit 60 formed thereon.

The electrode unit 60 and the reflecting electrode 55 are electrically connected to each other through a contact hole 28. The contact hole 28 is formed in a rectangular area of 15 μm×50 μm spaced inward from the outer periphery of the reflecting electrode 55 by, for example, 5 μm.

The reflecting electrode 55 is formed of, for example, the same conductive film as the source electrode 38. Then, the reflecting electrode 55 (upper one in FIG. 47) in the vicinity of the TFT 20 is formed integrally with the source electrode 38. By this, the pixel electrode 16 is electrically connected to the source electrode 38.

FIGS. 48A and 48B show the sectional structure of the area where the electrode unit 60 and the reflecting electrode 55 are formed. As shown in the drawings, the reflecting electrode 55 made of a lamination film of, for example, an aluminum film 29 and a titanium film 31 is formed on an insulating film 22 formed on a glass substrate 10 on which the gate bus line 12 and the like are formed. An insulating film 25 is formed on the insulating film 22 and the reflecting electrode 55. The contact hole 28 reaching the aluminum film 29 is formed in the insulating film 25 and the titanium film 31. The electrode unit 60 is formed on the insulating film 25 in which the contact hole 28 is formed. The electrode unit 60 is formed so that the positions of the reflecting electrode 55 thereunder and the solid part 46 are aligned, and the center portion of the solid part 46 is electrically connected to the aluminum film 29 of the reflecting electrode 55 through the contact hole 28. The electrode units 60 formed on the reflecting electrodes 55 in this way are electrically connected to each other by the connection electrode 64 as shown in FIGS. 47 and 48B.

FIG. 49 shows the arrangement of the polarizing plate and the like of the liquid crystal display device according to this embodiment. As shown in the drawing, in the liquid crystal display device according to this embodiment, in addition to the arrangement of the polarizing plate of the liquid crystal display device according to the third embodiment shown in FIG. 35, an optical path control film 79 as an optical scattering layer is disposed on a polarizing plate 86 at the observation side. The optical path control film 79 is the film for scattering light in a specified direction.

In this way, the liquid crystal display device according to this embodiment is constructed.

Next, the operation of the liquid crystal display device according to this embodiment will be described.

In the state where a voltage is not applied between the pixel electrode 16 and the opposite electrode 42, liquid crystal molecules are aligned almost vertically to the substrate surface.

First, in the case where outside light is incident on the pixel area in the state where a voltage is not applied between the pixel electrode 16 and the opposite electrode 42, the light is reflected by the reflecting electrode 55 formed in the reflection area. With respect to the reflected light, since the liquid crystal molecules are vertically aligned, its polarization state is not changed, and the light is absorbed by the polarizing plate 86 at the observer side. In this way, a black display is realized.

Next, in the case where a backlight is turned on in the state where a voltage is not applied between the pixel electrode 16 and the opposite electrode 42, light from the backlight unit having been transmitted through the polarizing plate 87 formed on the back surface of the liquid crystal panel is transmitted through a transparent area where the reflecting electrode 55 is not formed. Here, with respect to the light from the backlight unit, since the liquid crystal molecules are vertically aligned, its polarization state is not changed, and the light is absorbed by the polarizing plate 86 at the observer side. In this way, a black display is realized.

On the other hand, when a voltage is applied between the pixel electrode 16 and the opposite electrode 42, the liquid crystal molecules are obliquely aligned, cause birefringence as an optical effect, and change the polarization state of the light.

In the case where the outside light is incident on the pixel area in the state where the voltage is applied between the pixel electrode 16 and the opposite electrode 42, with respect to the light reflected by the reflecting electrode, since its polarization state is changed, the light is transmitted through the polarizing plate 86 at the observer side. In this way, a display from gray to white is realized.

Here, in the liquid crystal display device according to this embodiment, the film for scattering the light incident at a predetermined angle is used for the optical path control film 79 as the optical scattering layer. By this optical path control film 79, for example, incident light from the sun is scattered similarly to the liquid crystal display device disclosed in non-patent document 1, and the light reflected by the reflecting electrode 55 and reaching the observer can be used for the display. By this, even in the case of the light source such as the sun, the surface reflection is avoided, and the reflected light from the reflecting electrode 55 can be observed as the display.

Besides, in the case where the backlight is turned on in the state where the voltage is applied between the pixel electrode 16 and the opposite electrode 42, also with respect to the incident light from the backlight unit, its polarization state is changed and the light is transmitted through the polarizing plate 86 at the observer side. In this way, a display of gray to white is realized.

Incidentally, in the case where the backlight is turned on in the transmission type, there is little influence on the display quality by the reflection of the outside light. This is because both the black display in the transmission type and the black display in the reflection type are realized at the time of voltage non-application, and at the time of the black display in the transmission type, there is no reflection from the outside light.

The liquid crystal display device according to this embodiment is characterized in that the reflecting electrode 55 is formed of the same conductive film as the source electrode 38 formed on the TFT substrate 2. By this, since the reflecting electrode 55 can also be simultaneously formed in the step of forming the source electrode 38, the liquid crystal display device having the functions of both the reflection type and the transmission type can be manufactured without increasing the number of steps of the manufacture process of the transmission type liquid crystal display device.

Incidentally, in the case shown in FIG. 47, although the reflecting electrode 55 is provided under all the electrode units 60 in one pixel, the reflecting electrode 55 may not be provided under all the electrode units 60. By changing the number of areas where the reflecting electrode 55 is provided and the areas, the reflectivity and transmissivity of the liquid crystal panel can be changed.

For example, as shown in FIG. 50, the reflecting electrode 55 is provided under the upper electrode unit 60 in the drawing with respect to the storage capacitor busline 18, and the reflecting electrode 55 may not be provided under the lower electrode unit 60 in the drawing. In this case, as compared with the case where the reflecting electrode 55 is provided under all the electrode units 60 of one pixel as shown in FIG. 47, since the number of the reflecting electrodes 55 is halved, the transmissivity of the liquid crystal panel is increased, and the reflectivity is decreased.

In order to effectively use an area in one pixel and to reduce the waste of a reflection area and a transmission area, for example, it is effective to form the reflecting electrode 55 under conditions as set forth below.

First, it is necessary to electrically connect the source electrode 38 and the pixel electrode 16 without fail. Then, the reflecting electrode 55 is formed under the electrode unit 60 directly electrically connected to the source electrode 38.

Besides, in the case where the storage capacitor electrode 19 is formed, the area where the storage capacitor electrode 19 is formed can not become the area through which light is transmitted. Thus, the reflecting electrode 55 is formed in the area where the storage capacitor electrode 19 is formed.

By forming the reflecting electrode 55 to satisfy such conditions, the area in one pixel can be effectively used.

FIG. 51 is a plan view showing the structure of one pixel in the case where the reflecting electrode 55 is formed in an area where the storage capacitor electrode 19 is formed. In this case, for example, the pixel electrode 16 is made the same as that of the liquid crystal display device according to the seventh embodiment in which the electrode unit 60*a* is formed on the storage capacitor electrode 19. The reflecting electrode 55 having almost the same shape as the solid part 46 is formed under this electrode unit 60*a* to overlap with the solid part 46 through the insulating film. The electrode unit 60a and the reflecting electrode 55 formed thereunder are electrically connected to each other through the contact hole 28.

Besides, under the electrode unit 60b in the vicinity of the upper TFT 20 in FIG. 51, the reflecting electrode 55 having almost the same shape as the solid part 46 is formed to overlap with the solid part 46 through the insulating film. The reflecting electrode 55 formed under the electrode unit 60b in the vicinity of the TFT 20 is formed integrally with the source electrode 38. The electrode unit 60b in the vicinity of the TFT 20 and the reflecting electrode 55 formed thereunder are electrically connected to each other through the contact hole 28, and by this, the electrode unit 60b in the vicinity of the TFT 20 and the source electrode 38 are electrically connected to each other.

The reflecting electrode 55 is not formed under the electrode unit 60b between the electrode unit 60b electrically connected to the source electrode 38 through the contact hole 28 and the electrode unit 60a on the storage capacitor electrode 19. Besides, in the drawing, the reflecting electrode 55 is not formed under two electrode units 60a below the storage capacitor electrode bus line 18.

As described above, by changing the number of areas where the reflecting electrode 55 is formed and the areas, the reflectivity and transmissivity of the liquid crystal panel can be changed. That is, desired reflectivity and transmissivity can be set by suitably setting, in the pixel area, the areal ratio of the reflection area where the reflecting electrode 55 is formed in the pixel area and the areal ratio of the transmission area where the reflecting electrode 55 is not formed.

For example, in the area of the opening part 98 of the BM for shading the end part of the pixel area, the relations of the areal ratio of the reflection area with respect to the transmissivity and the reflectivity become as indicated by graphs shown in FIGS. 52A and 52B. FIG. 52A is the graph showing the relation of the areal ratio of the reflection area with respect to the reflectivity, and FIG. 52B is the graph showing the relation of the areal ratio of the reflection area with respect to the transmissivity.

From the graphs shown in FIGS. 52A and 52B, it is understood that for example, in order to obtain the reflectivity of 5% or more and the transmissivity of 5% or more, the areal ratio of the reflection area in the area of the opening part 98 of the BM for shading the end part of the pixel area has only to be set in a range of 10 to 25%.

Besides, the relations of the areal ratio of the transmission area in the area of the opening part 98 of the BM for shading the end part of the pixel area with respect to the reflectivity and the transmissivity become as indicated by graphs shown in FIGS. 53A and 53B. FIG. 53A is the graph showing the relation of the areal ratio of the transmission area with respect to the reflectivity, and FIG. 53B is the graph showing the relation of the areal ratio of the transmission area with respect to the transmissivity.

From the graphs shown in FIGS. 53A and 53B, it is understood that for example, in order to obtain the reflectivity of 5% or more and the transmissivity of 5% or more, the areal ratio of the transmission area in the area of the opening part 98 of the BM for shading the end of the pixel area has only to be set in a range of 50 to 90%.

Next, a method of manufacturing the liquid crystal display device according to this embodiment will be described with reference to FIGS. 54A to 55C. FIGS. 54A to 55C are process sectional views showing the method of manufacturing the liquid crystal display device according to this embodiment, and correspond to the section in the direction along the drain bus line 14 of FIG. 47. Incidentally, in the following, a description will be given to the method up to the formation of the pixel electrode 16 on the glass substrate 10 of the TFT substrate 2.

First, similarly to the case of the third embodiment, a gate bus line 12 and a storage capacitor bus line 18 are formed on the glass substrate 10.

Figure 54A:
FIGS. 54A to 54D are process sectional views (No. 1) showing a method of manufacturing the liquid crystal display device according to the eighth embodiment of the invention.

Next, an aluminum film 29 is formed by, for example, a sputter method through a not-shown insulating film on the glass substrate 10 on which the gate bus line 12 and the like are formed (see FIG. 54A).

Figure 54B:
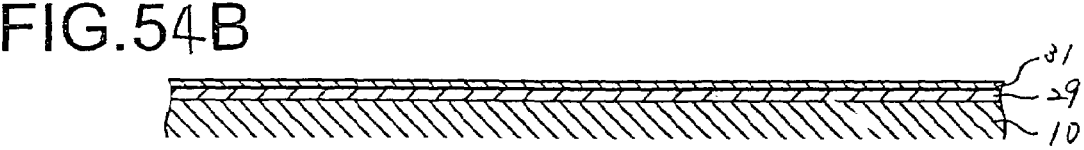

Next, a titanium film 31 is formed on the aluminum film 29 by, for example, the sputtering method (see FIG. 54B).

Figure 54C:
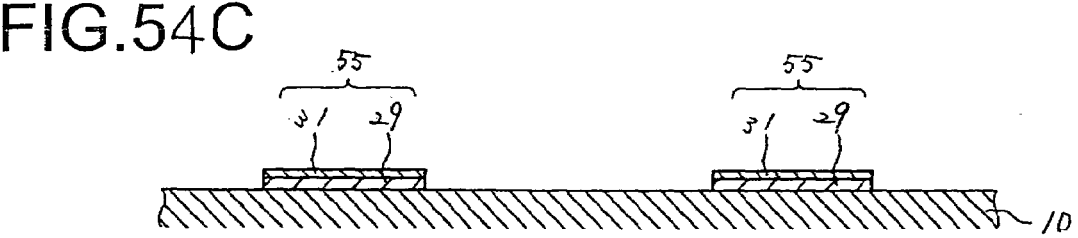

Next, the titanium film 31 and the aluminum film 29 are patterned, so that a reflecting electrode 55 is formed (see FIG. 54C). At this time, a drain bus line 14, a drain electrode 36, a source electrode 38 and a storage capacitor electrode 19 are formed at the same time. In this way, the reflecting electrode 55 is formed of the same conductive film as the drain bus line 14, the drain electrode 36, the source electrode 38 and the storage capacitor electrode 19.

Figure 54D:
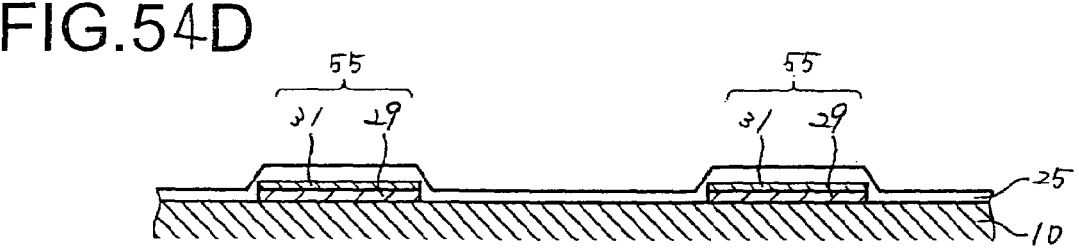

Next, an insulating film 25 made of a silicon oxide film is formed on the whole surface by, for example, a CVD method (see FIG. 54D).

Figure 55A:
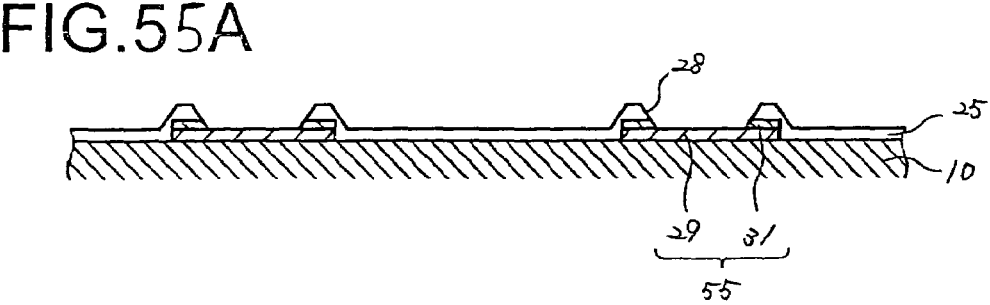
FIGS. 55A to 55C are process sectional views (No. 2) showing the method of manufacturing the liquid crystal display device according to the eighth embodiment of the invention.

Next, the insulating film 25 and the titanium film 31 are selectively etched, so that a contact hole 28 reaching the aluminum film 29 of the reflecting electrode 55 is formed (see FIG. 55A).

Figure 55B:
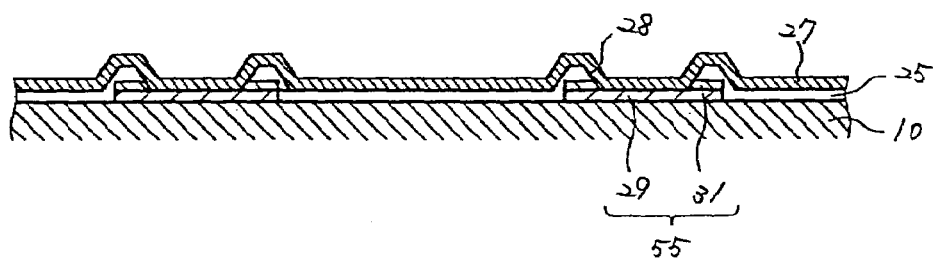

Next, a transparent conductive film 27 made of ITO is formed on the whole surface by, for example, the sputtering method (see FIG. 55B).

Figure 55C:
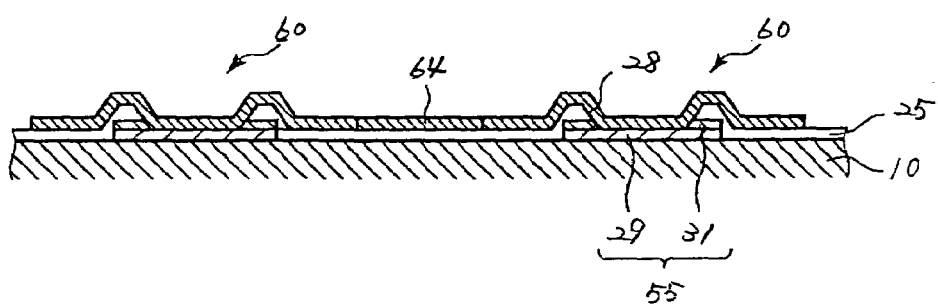

Next, the transparent conductive film 27 is patterned, so that an electrode unit 60, a connection electrode 64 and a contact area 67 are formed (see FIG. 55C). In this way, the pixel electrode 16 is formed on the glass substrate 10 of the TFT substrate 2.

Then, although not shown, a process similar to a manufacture process of a normal liquid crystal display device is performed subsequently to this, so that the liquid crystal display device according to this embodiment can be completed.

As stated above, according to this embodiment, since the reflecting electrode 55 can be formed at the same time in the process of forming the source electrode 38 and the like, the liquid crystal display device having the functions of both the reflection type and the transmission type can be manufactured without increasing the number of steps of the manufacture process of the transmission type liquid crystal display device.

Ninth Embodiment

Figure 56:
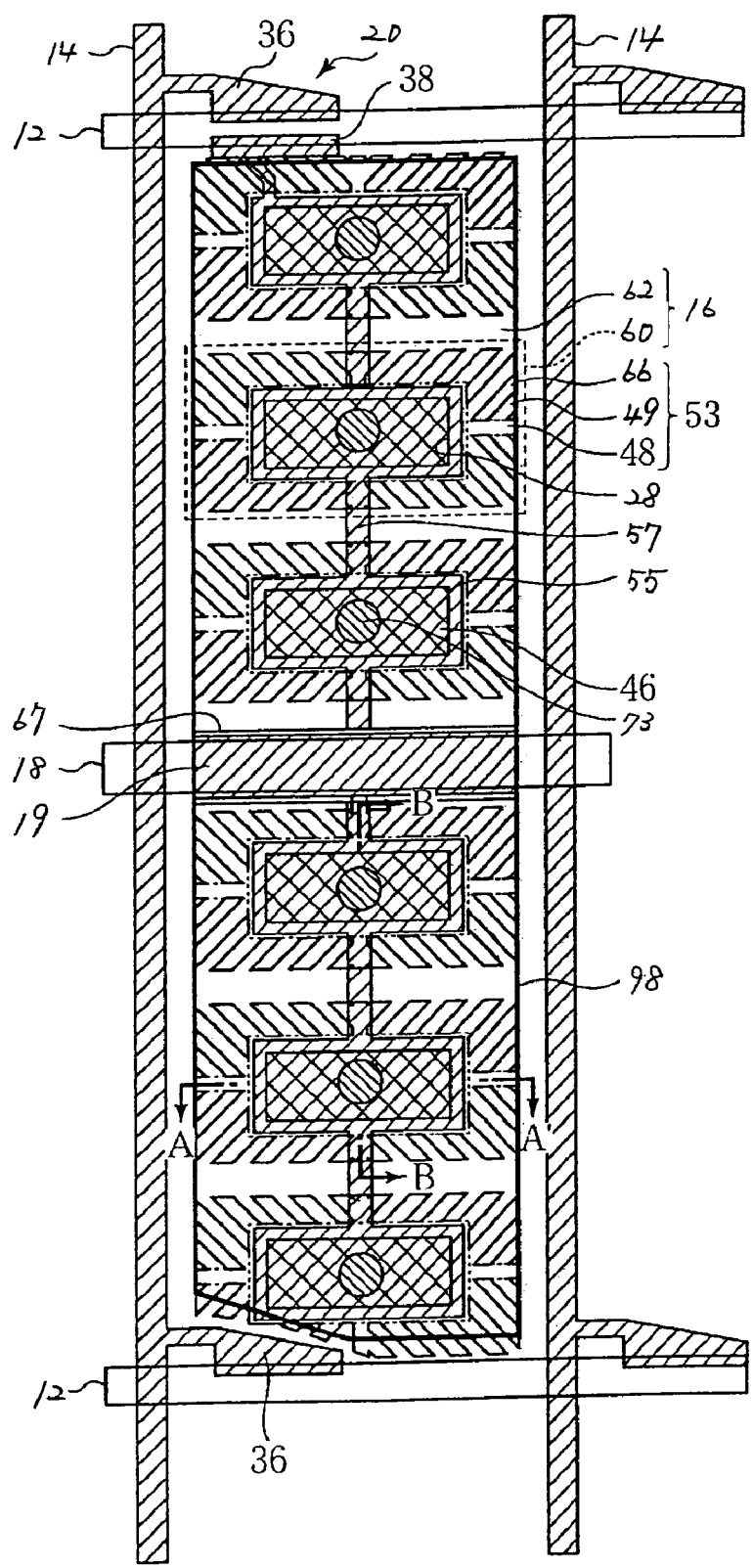
FIG. 56 is a plan view showing a structure of one pixel of a liquid crystal display device according to a ninth embodiment of the invention.
Figure 57A:
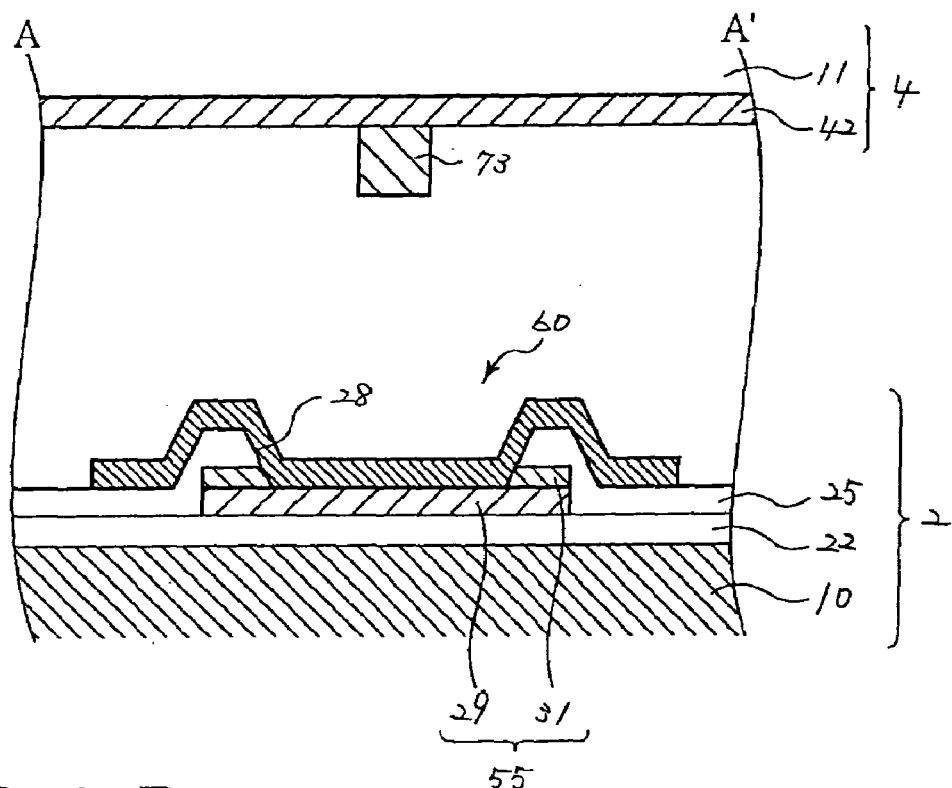
FIGS. 57A and 57B are plan views showing a structure of the liquid crystal display device according to the ninth embodiment of the invention.
Figure 57B:
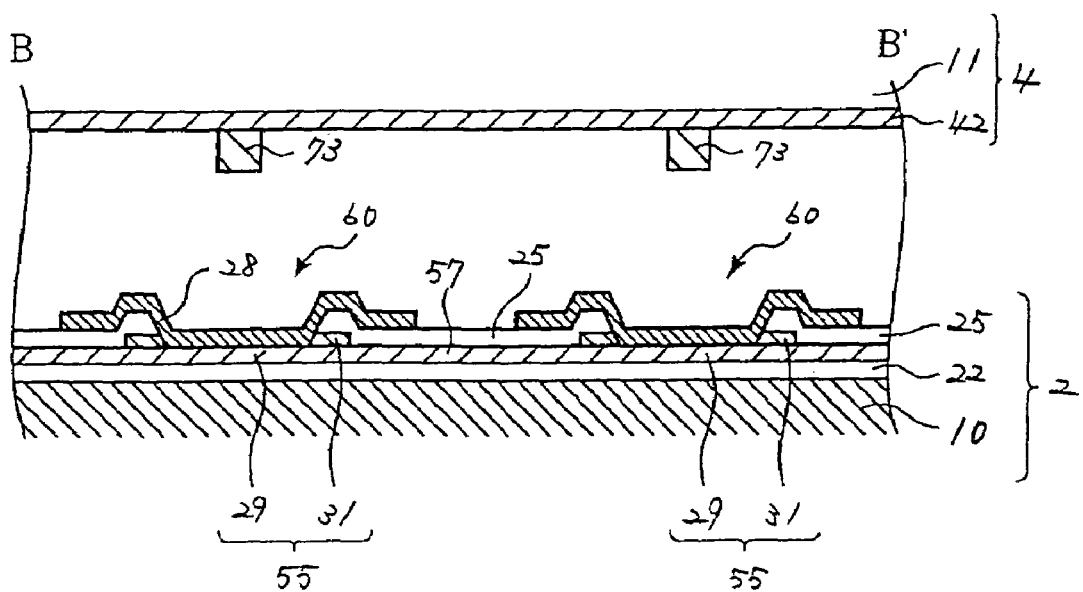

A liquid crystal display device according to a ninth embodiment of the invention will be described with reference to FIGS. 56 to 57B. FIG. 56 is a plan view showing a structure of one pixel of the liquid crystal display device according to this embodiment, FIG. 57A is a sectional view taken along line A-A' of FIG. 56, and FIG. 57B is a sectional view taken along line B-B'. Incidentally, structural elements similar to those of the liquid crystal display device according to the eighth embodiment are denoted by the same reference numerals, and their description will be omitted or simplified.

In the liquid crystal display device according to the eighth embodiment, the electrode units 60 constituting the pixel electrode 16 are electrically connected to each other by the connection electrode 64 formed in the same layer as an electrode unit 60.

A main feature of the liquid crystal display device according to this embodiment is that a connection electrode 64 is not formed in the same layer as an electrode unit 60, and a connection electrode 57 is formed in the same layer as a reflecting electrode 55, and the reflecting electrodes 55 are electrically connected to each other. By this, the electrode units 60 electrically connected to the reflecting electrodes 55 through contact holes 28 are electrically connected to each other.

That is, as shown in FIG. 56, although the electrode unit 60 similar to that of the liquid crystal display device according to the eighth embodiment shown in FIG. 47 is formed in the pixel area, the connection electrode 64 for electrically connecting these is not formed.

On the other hand, as shown in FIGS. 57A and 57B, the reflecting electrode 55 made of a lamination film of an aluminum film 29 and a titanium film 31 is formed through an insulating film 25 under the electrode unit 60. The insulating film is made of, for example, acryl resin, and its thickness is 2 μm. The electrode unit 60 is electrically connected to the aluminum film 29 of the reflecting electrode 55 through the contact hole 28.

Further, as shown in FIG. 57B, the reflecting electrodes 55 are electrically connected to each other by the connection electrode 57 made of the same layer as the aluminum film 29 of the reflecting electrode 55. The insulating film 25 is formed on the connection electrode 57. In this way, the reflecting electrodes 55 are electrically connected to each other through the connection electrode 57, so that the electrode units 60 electrically connected to the reflecting electrodes 55 through the contact holes 28 are electrically connected to each other.

In the liquid crystal display device according to this embodiment, the connection electrode 57 for electrically connecting the electrode units 60 to each other is covered with the insulating film 25 made of a thick resin or the like, and is not exposed at the liquid crystal side. Thus, the movement of a singular point due to the existence of the connection electrode 57 is suppressed. Accordingly, even if the protruding structure 73 is not provided at the CF substrate 4 side like the liquid crystal display device according to the eighth embodiment, it becomes possible to stabilize the occurrence of the singular point. By this, a process of forming the protruding structure 73 on the CF substrate 4 side can be omitted, and the liquid crystal display device can be manufactured using the simpler manufacture process and at low cost.

Tenth Embodiment

Figure 58:
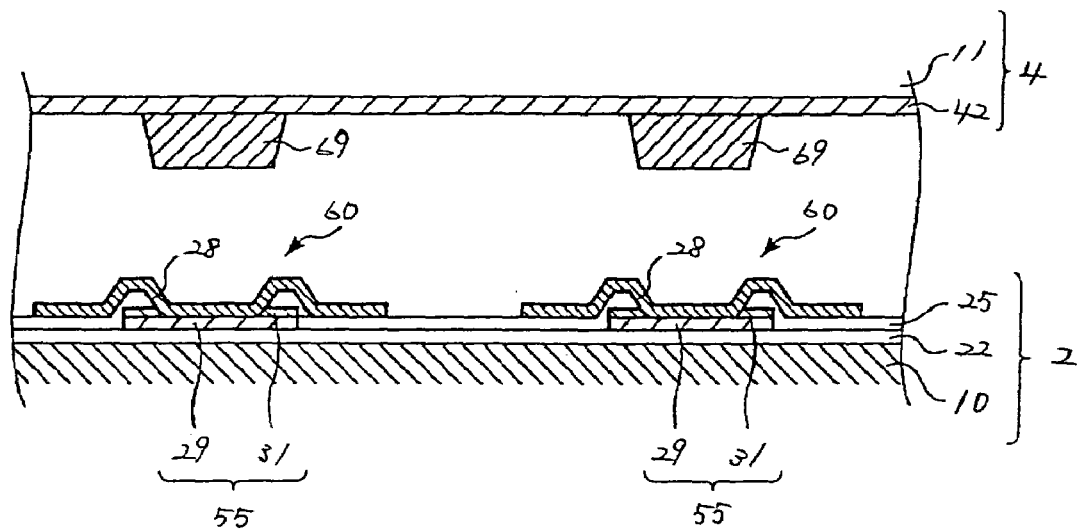
FIG. 58 is a sectional view taken in a direction along a gate bus line of a liquid crystal display device according to a tenth embodiment of the invention.

A liquid crystal display device according to a tenth embodiment of the invention will be described with reference to FIG. 58. FIG. 58 is a sectional view of the liquid crystal display device according to this embodiment taken in a direction along a gate bus line. Incidentally, structural elements similar to those of the liquid crystal display device according to the eighth embodiment are denoted by the same reference numerals and their description will be omitted or simplified.

The basic structure of the liquid crystal display device according to this embodiment is almost the same as the liquid crystal display device according to the eighth embodiment. A main feature of the liquid crystal display device according to this embodiment is that a bank-shaped structure having almost the same size as a reflecting electrode 55 is formed at a CF substrate 4 side and at almost the same position as the reflecting electrode 55 formed on a TFT substrate 2.

That is, as shown in FIG. 58, a bank-shaped structure 69 having almost the same size as the reflecting electrode 55 is formed on an opposite electrode 42 formed on a surface of the CF substrate 4 opposite to the TFT substrate 2 at almost the same position as the reflecting electrode 55. The width of the bank-shaped structure 69 in the direction parallel to the gate bus line 12 is, for example, 60 μm. Besides, the width in the direction parallel to the drain bus line 14 is, for example, 25 μm. The thickness of the bank-shaped structure 69 is almost half of a cell gap between the CF substrate 4 and the TFT substrate 2.

As stated above, in the liquid crystal display device according to this embodiment, the bank-shaped structure 69 having almost the same size as the reflecting electrode 55 is formed on the CF substrate 4 side at almost the same position as the reflecting electrode 55 formed on the TFT substrate 2. By this bank-shaped structure 69, similarly to the liquid crystal display device according to the eighth embodiment in which the protruding structure 73 is formed.

Further, in the liquid crystal display device according to this embodiment, by the bank-shaped structure 69, the thickness of the liquid crystal layer in the reflection area is almost half of that in the other area. Thus, when light incident on the reflection area where the reflecting electrode 55 is formed is incident from the observer side, is reflected by the reflecting electrode 55, and is emitted toward the observer side, the light is transmitted through the liquid crystal having almost the same thickness as the liquid crystal through which light from a backlight unit is transmitted in a transmission area where the reflecting electrode 55 is not formed. By this, coloring in the reflection area can be reduced.

MODIFIED EXAMPLE

Figure 59:
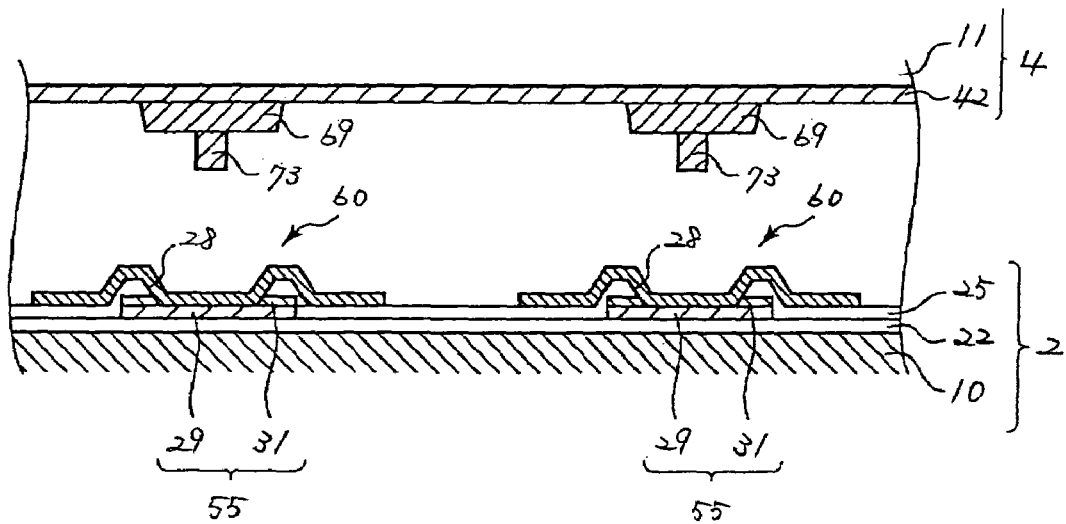
FIG. 59 is a sectional view taken in a direction along a gate bus line of a liquid crystal display device according to a modified example of the tenth embodiment of the invention.

A liquid crystal display device according to a modified example of the tenth embodiment of the invention will be described with reference to FIG. 59. FIG. 59 is a sectional view of the liquid crystal display device according to this modified example taken in a direction along a gate bus line.

In the liquid crystal display device according to this modified example, a protruding structure 73 is further provided on a bank-shaped structure 69. The protruding structure 73 in the liquid crystal display device according to this modified example is similar to the protruding structure 73 in the liquid crystal display device according to the fifth embodiment, and is formed on the bank-shaped structure 69 so that it is positioned almost at the center of the electrode unit 60.

As stated above, also by providing the bank-shaped structure 69 and the protruding structure 73 on the CF substrate 4 side, and coloring in the reflection area can be reduced.

Eleventh Embodiment

A liquid crystal display device according to an eleventh embodiment of the invention and a method of manufacturing the same will be described with reference to FIGS. 60 to 63C. Incidentally, structural elements similar to those of the liquid crystal display device according to the eighth embodiment are denoted by the same reference numerals and their description will be omitted or simplified.

Figure 60:
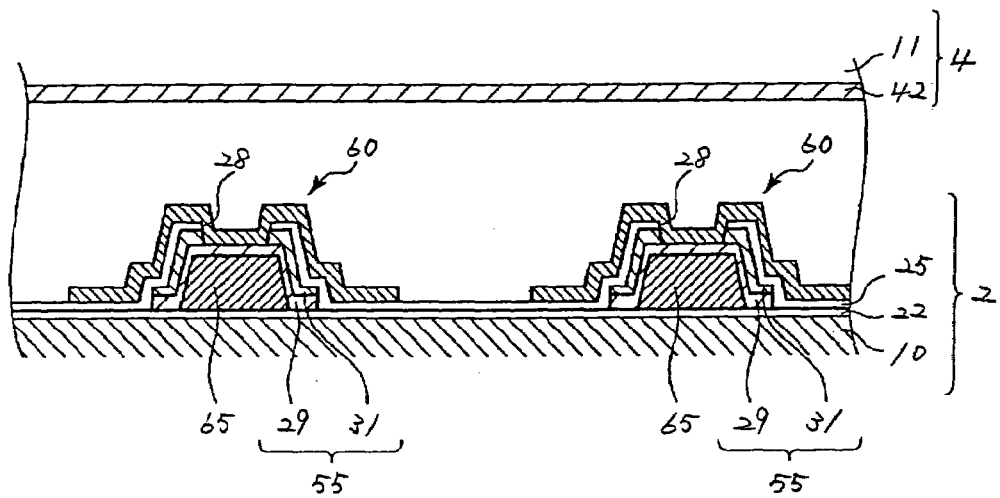
FIG. 60 is a sectional view taken in a direction along a gate bus line of a liquid crystal display device according to an eleventh embodiment of the invention.

First, the liquid crystal display device according to this embodiment will be described with reference to FIG. 60. FIG. 60 is a sectional view of the liquid crystal display device according to this embodiment taken in a direction along a gate bus line.

The basic structure of the liquid crystal display device according to this embodiment is almost the same as the liquid crystal display device according to the eighth embodiment. In the liquid crystal display device according to this embodiment, a bank-shaped structure 65 having almost the same size as a reflecting electrode 55 and having a plane shape is formed under the reflecting electrode 55. That is, a main feature is that the reflecting electrode 55 and an electrode unit 60 are formed on an upper surface and a side surface of the bank-shaped structure 65 formed at a TFT substrate 2 side.

As shown in FIG. 60, the bank-shaped structure 65 is formed on an insulating film 22 formed on a glass substrate 10 on which a gate bus line 12 and the like are formed. The reflecting electrode 55 made of a lamination film of an aluminum film 29 and a titanium film 31 is formed in an area including the upper surface and the side surface of the bank-shaped structure 65. The electrode unit 60 is formed on the reflecting electrode 55 through an insulating film 25. The electrode unit 60 is electrically connected to the aluminum film 29 of the reflecting electrode 55 through a contact hole 28 at the upper surface of the bank-shaped structure 65.

As stated above, in the liquid crystal display device according to this embodiment, the bank-shaped structure 65 having almost the same size as the reflecting electrode 55 is formed under the reflecting electrode 55. By this bank-shaped structure 65, similarly to the liquid crystal display device according to the tenth embodiment in which the bank-shaped structure 69 is formed at the CF substrate 4 side.

Further, in the liquid crystal display device according to this embodiment, similarly to the liquid crystal display device according to the tenth embodiment, since the thickness of the liquid crystal layer in the reflection area where the reflecting electrode 55 is formed, is almost half of that in the other area by the bank-shaped structure 65, coloring in the reflection area can be reduced.

Next, a method of manufacturing the liquid crystal display device according to this embodiment will be described with reference to FIGS. 61A to 63C. FIGS. 61A to 63C are process sectional views showing the method of manufacturing the liquid crystal display device according to this embodiment. Incidentally, in the following, a description will be given to the method up to the formation of the pixel electrode 16 on the glass substrate 10 of the TFT substrate 2.

First, similarly to the case of the third embodiment, a gate bus line 12 and a storage capacitor bus line 18 are formed on the glass substrate 10.

Figure 61A:
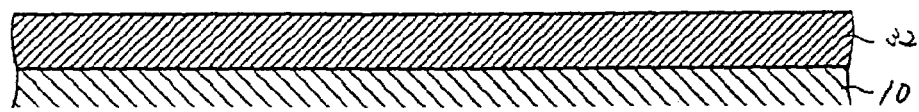
FIGS. 61A to 61C are process sectional views (No. 1) showing a method of manufacturing the liquid crystal display device according to the eleventh embodiment of the invention.

Next, a resin layer 32 made of acryl resin, novolac resin or the like is formed on the glass substrate 10 on which the gate bus line 12 and the like are formed through a not-shown insulating film (see FIG. 61A).

Figure 61B:
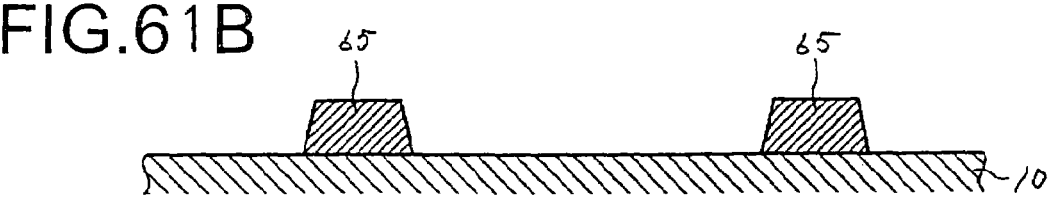

Next, the resin layer 32 is patterned, so that a bank-shaped structure 65 is formed (see FIG. 61B).

Figure 61C:
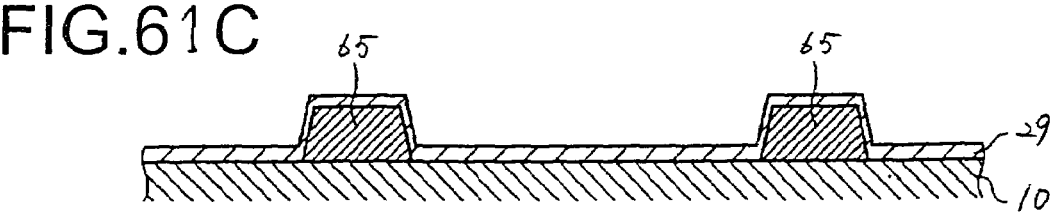

Next, an aluminum film 29 is formed on the whole surface by, for example, a sputtering method (see FIG. 61C).

Figure 62A:
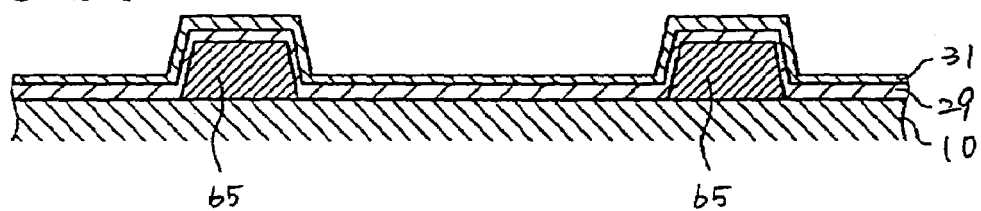
FIGS. 62A to 62C are process sectional views (No. 2) showing the method of manufacturing the liquid crystal display device according to the eleventh embodiment of the invention.

Next, a titanium film 31 is formed on the aluminum film 29 by, for example, the sputtering method (see FIG. 62A).

Figure 62B:
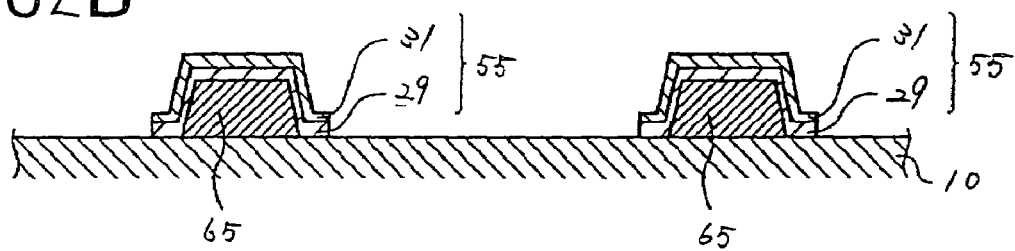

Next, the titanium film 31 and the aluminum film 29 are patterned, so that a reflecting electrode 55 is formed on an upper surface and a side surface of the bank-shaped structure 65 (see FIG. 62B). At this time, a drain bus line 14, a drain electrode 36, a source electrode 38 and a storage capacitor electrode 19 are formed at the same time. In this way, the reflecting electrode 55 is formed of the same conductive film as the drain bus line 14, the drain electrode 36, the source electrode 38 and the storage capacitor electrode 19.

Figure 62C:
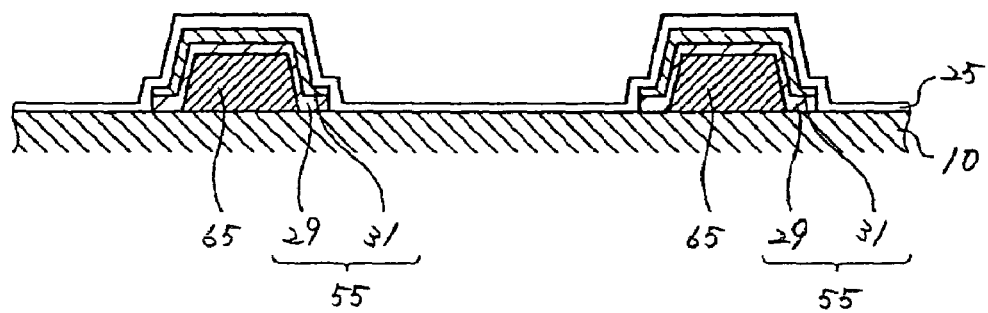

Next, an insulating film 25 made of a silicon oxide film is formed on the whole surface by, for example, a CVD method (see FIG. 62C).

Figure 63A:
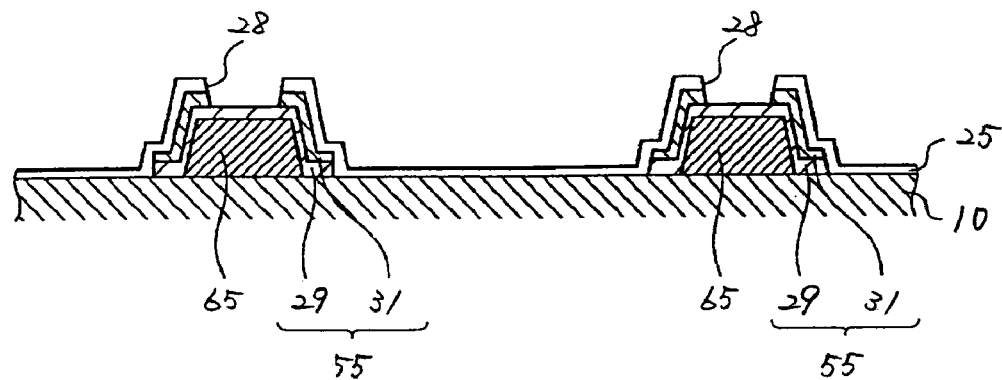
FIGS. 63A to 63C are process sectional views (No. 3) showing the method of manufacturing the liquid crystal display device according to the eleventh embodiment of the invention.

Next, the insulating film 25 and the titanium film 31 are selectively etched, so that a contact hole 28 reaching the aluminum film 29 of the reflecting electrode 55 is formed (see FIG. 63A).

Figure 63B:
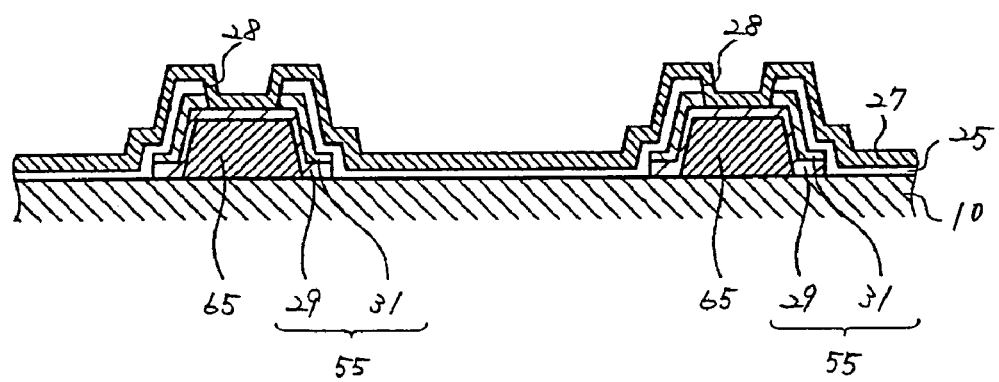

Next, a transparent conductive film 27 made of ITO is formed on the whole surface by, for example, the sputtering method (see FIG. 63B).

Figure 63C:
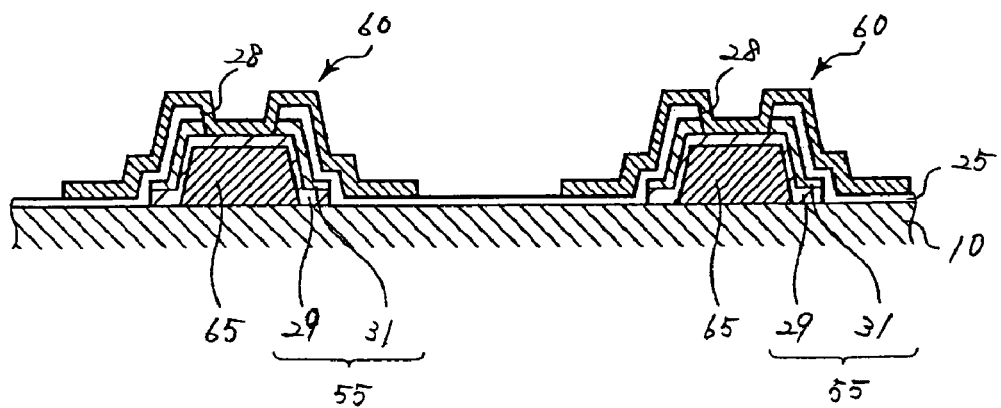

Next, the transparent conductive film 27 is patterned, so that an electrode unit 60, a connection electrode 64 and a contact area 67 are formed (see FIG. 63C). In this way, the pixel electrode 16 is formed on the glass substrate 10 of the TFT substrate 2.

Then, although not shown, subsequently to this, a similar process to a manufacture process of a normal liquid crystal display device is performed, so that the liquid crystal display device according to this embodiment can be completed.

MODIFIED EXAMPLE

Figure 64:
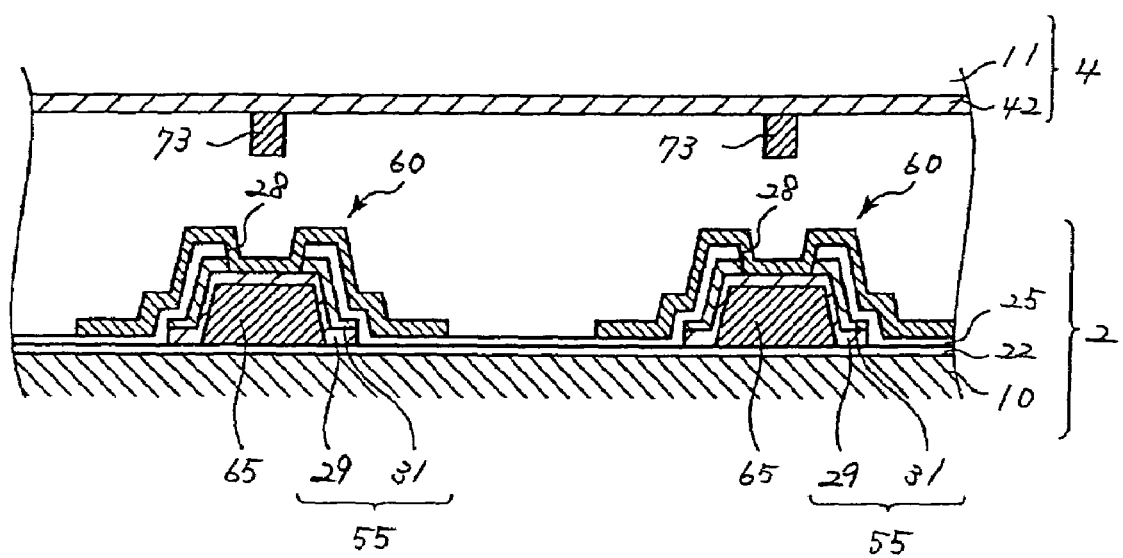
FIG. 64 is a sectional view taken in a direction along a gate bus line of a liquid crystal display device according to a modified example of the eleventh embodiment of the invention.

A liquid crystal display device according to a modified example of the eleventh embodiment of the invention will be described with reference to FIG. 64. FIG. 64 is a sectional view of the liquid crystal display device according to this modified example taken in a direction along a gate bus line.

In the liquid crystal display device according to this modified example, as shown in FIG. 64, similarly to the liquid crystal display device according to the fifth embodiment, a protruding structure 73 is provided on an opposite electrode 42 formed on a surface of a CF substrate 4 opposite to a TFT substrate 2.

Twelfth Embodiment

A liquid crystal display device according to a twelfth embodiment of the invention and a method of manufacturing the same will be described with reference to FIGS. 65 to 68C. Incidentally, structural elements similar to those of the liquid crystal display device according to the eighth embodiment are denoted by the same reference numerals and their description will be omitted or simplified.

Figure 65:
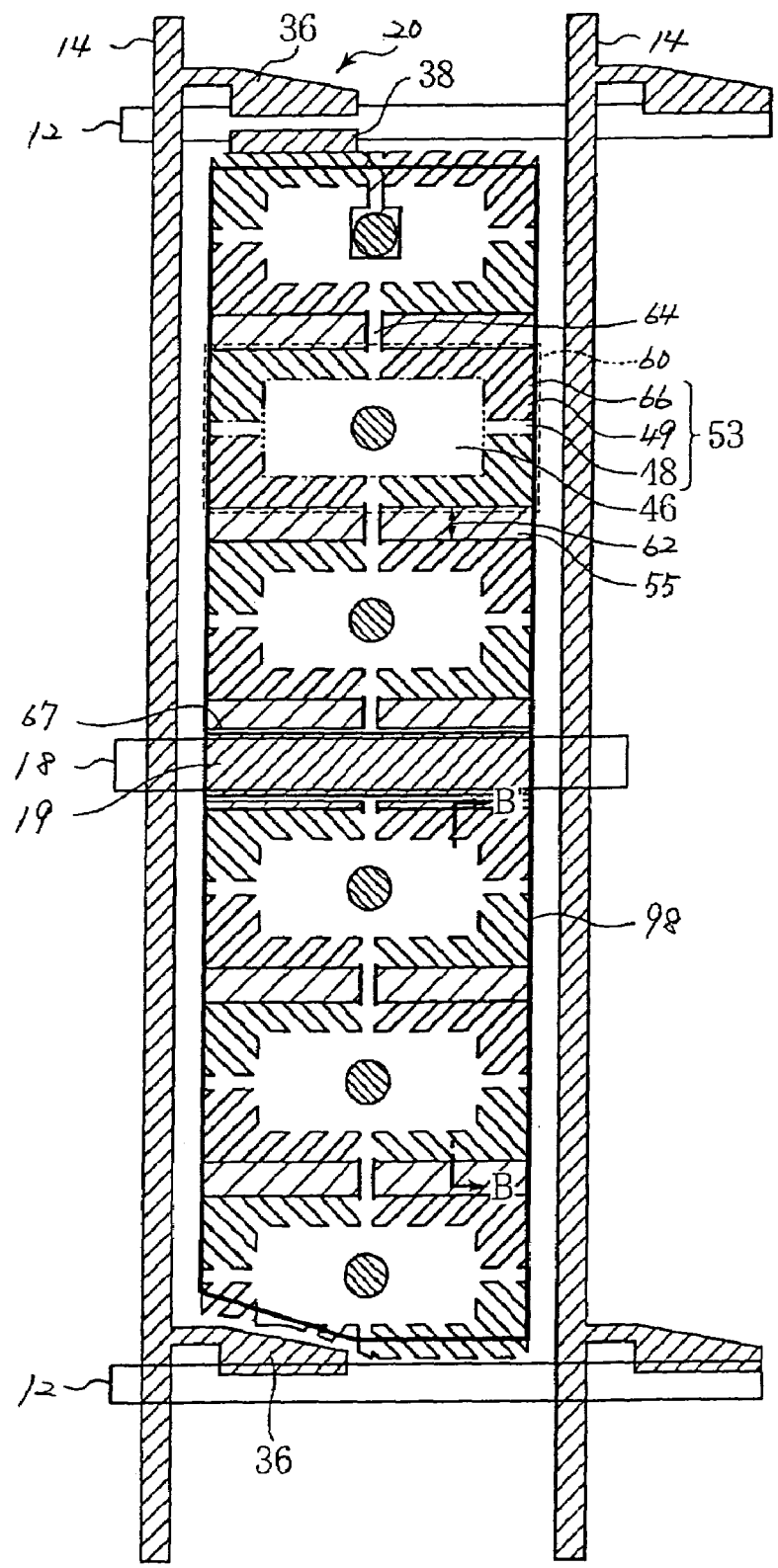
FIG. 65 is a plan view showing a structure of one pixel of a liquid crystal display device according to a twelfth embodiment of the invention.
Figure 66:
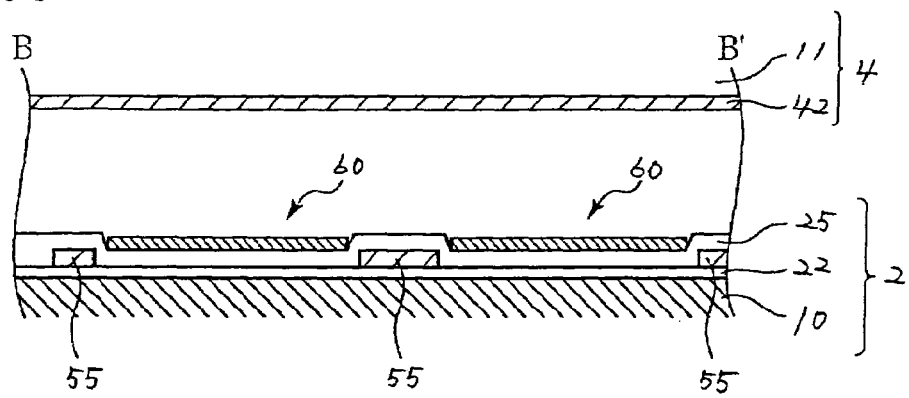
FIG. 66 is a sectional view showing a structure of the liquid crystal display device according to the twelfth embodiment of the invention.

First, the liquid crystal display device according to this embodiment will be described with reference to FIGS. 65 and 66. FIG. 65 is a plan view showing a structure of one pixel of the liquid crystal display device according to this embodiment, and FIG. 66 is a sectional view taken along line B-B' of FIG. 65.

The basic structure of the liquid crystal display device according to this embodiment is almost the same as the liquid crystal display device according to the eighth embodiment except for an area where reflecting electrodes 55 are formed.

In the liquid crystal display device according to this embodiment, as shown in FIG. 65, the reflecting electrodes 55 are formed in an area where a slit 62 between electrode units 60 is formed. Similarly to the liquid crystal display device according to the eighth embodiment, the reflecting electrodes 55 are made of the same conductive film as a source electrode 38.

The width of the reflecting electrode 55 is slightly smaller than the width of the slit 62 so that the electrode unit 60 does not overlap with the reflecting electrode 55 preferably. For example, the width of the slit 62 is 8 μm, and the width of the reflecting electrode 55 is 6 μm.

On the other hand, the reflecting electrode 55 is not formed under a connection electrode 64 formed in the same layer as the electrode unit 60 and for electrically connecting the electrode units 60.

As shown in FIG. 66, the reflecting electrodes 55 are formed on an insulating film 22 formed on a glass substrate 10 on which a gate bus line 12 and the like are formed. An insulating film 25 is formed on the reflecting electrodes 55 and the insulating film 22, and the electrode unit 60 is formed on the insulating film 25.

The reflecting electrodes 55 in the area where the slit 62 is formed are electrically separated from each other, and are in an electrically floating state.

A main feature of the liquid crystal display device according to this embodiment is that the reflecting electrodes 55 are formed in the area where the slit 62 between the electrode units 60 is formed, and the reflecting electrodes 55 are not electrically connected to each other, but are in the floating state where they are electrically separated.

By forming the reflecting electrodes 55 as stated above, differently from an applied voltage in a transmission area where the electrode unit 60 is formed, an effective voltage applied to liquid crystal molecules on the reflecting electrodes 55 is caused from only electric field around the electrode unit 60. Thus, the voltage applied to the liquid crystal molecules on the reflecting electrodes 55 becomes low. Accordingly, the optical effect due to the liquid crystal is suppressed in the reflection area, and even in the case where the thickness of the liquid crystal layer in the reflection area is made the same as the thickness in the transmission area, coloring in the reflection area can be reduced.

Next, a method of manufacturing the liquid crystal display device according to this embodiment will be described with reference to FIGS. 67A to 68C. FIGS. 67A to 68C are process sectional views showing the method of manufacturing the liquid crystal display device according to this embodiment, and correspond to the section in the direction along the drain bus line 14 of FIG. 65. Incidentally, in the following, a description will be given to the method up to the formation of the pixel electrode 16 on the glass substrate 10 of the TFT substrate 2.

First, similarly to the case of the third embodiment, a gate bus line 12 and a storage capacitor bus line 18 are formed on the glass substrate 10.

Figure 67A:
FIGS. 67A to 67D are process sectional views (No. 1) showing a method of manufacturing the liquid crystal display device according to the twelfth embodiment of the invention.

Next, an aluminum film 29 is formed on the glass substrate 10 on which the gate bus line 12 and the like are formed though a not-shown insulating film by, for example, a sputtering method (see FIG. 67A).

Figure 67B:
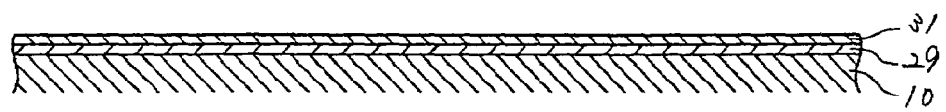

Next, a titanium film 31 is formed on the aluminum film 29 by, for example, the sputtering method (see FIG. 67B).

Figure 67C:
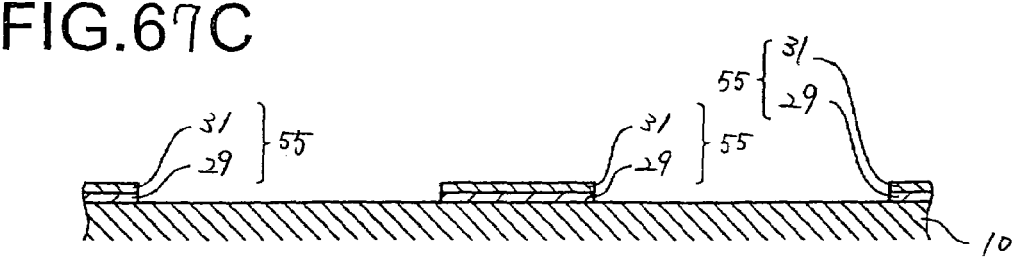

Next, the titanium film 31 and the aluminum film 29 are patterned, so that a reflecting electrode 55 is formed (see FIG. 67C). At this time, a drain bus line 14, a drain electrode 36, a source electrode 38 and a storage capacitor electrode 19 are formed at the same time. In this way, the reflecting electrode 55 is formed of the same conductive film as the drain bus line 14, the drain electrode 36, the source electrode 38 and the storage capacitor electrode 19.

Figure 67D:
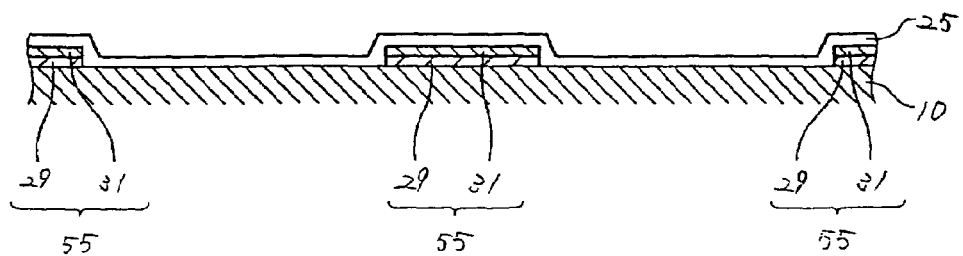

Next, an insulating film 25 made of a silicon oxide film is formed on the whole surface by, for example, a CVD method (see FIG. 67D).

Figure 68A:
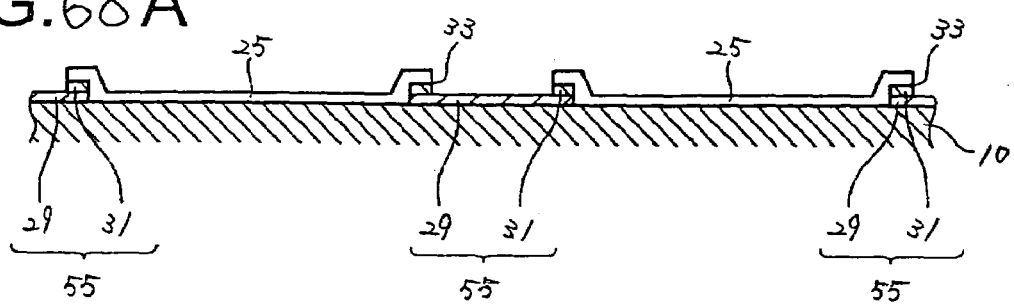
FIGS. 68A to 68C are process sectional views (No. 2) showing the method of manufacturing the liquid crystal display device according to the twelfth embodiment of the invention.

Next, the insulating film 25 and the titanium film 31 are patterned so that an opening part 33 reaching the aluminum film 29 of the reflecting electrode 55 is formed (see FIG. 68A).

Figure 68B:
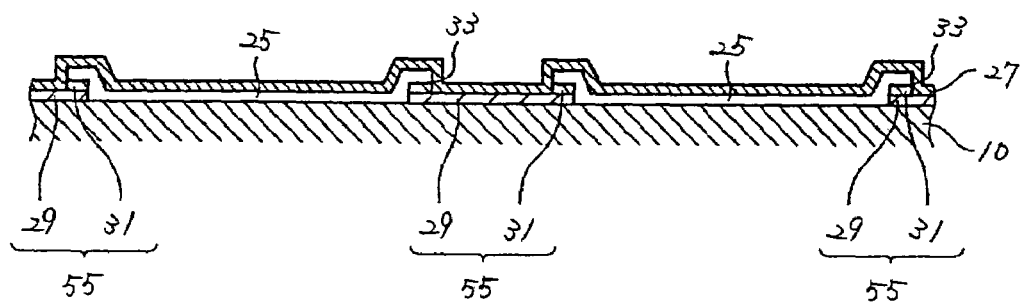

Next, a transparent conductive film 27 made of ITO is formed on the whole surface by, for example, the sputtering method (see FIG. 68B).

Figure 68C:
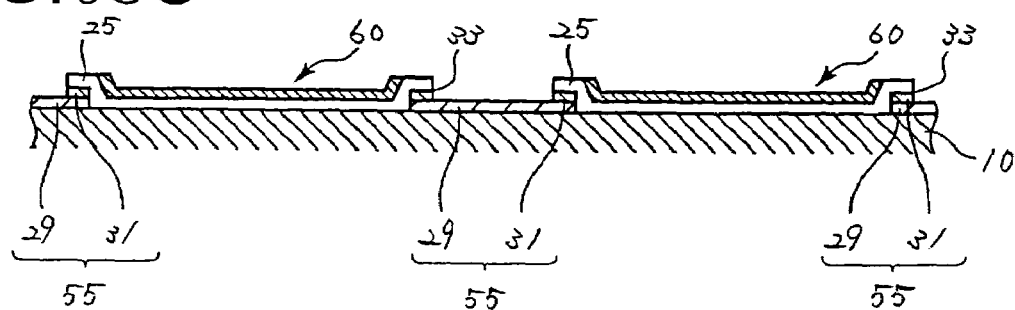

Next, the transparent conductive film 27 is patterned, so that an electrode unit 60, a connection electrode 64 and a contact area 67 are formed (see FIG. 68C). In this way, the pixel electrode 16 is formed on the glass substrate 10 of the TFT substrate 2.

Although not shown, subsequently to this, a process similar to a manufacture process of a normal liquid crystal display device is performed so that the liquid crystal display device according to this embodiment can be completed.

Thirteenth Embodiment

Figure 69:
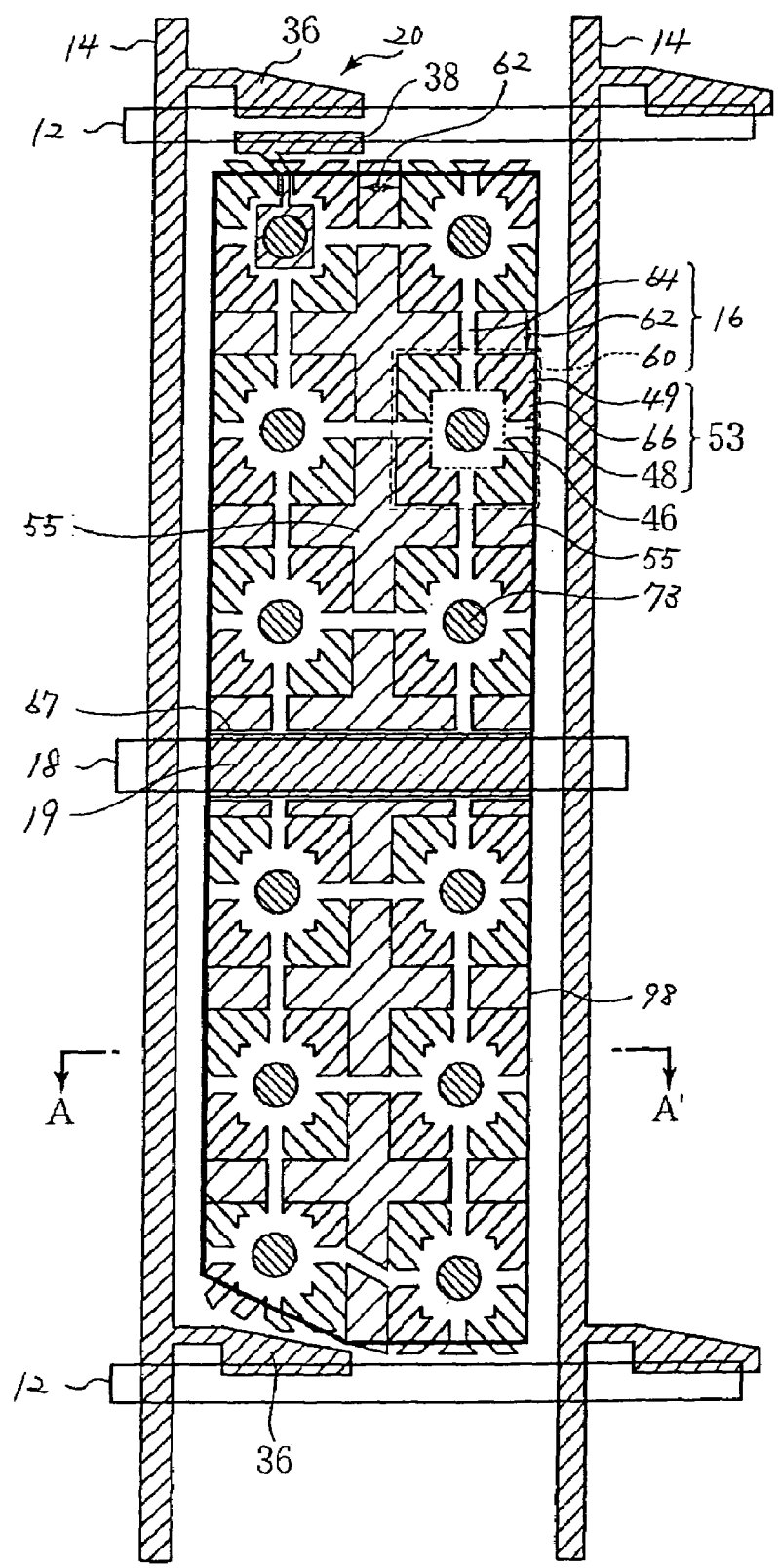
FIG. 69 is a plan view showing a structure of one pixel of a liquid crystal display device according to a thirteenth embodiment of the invention.
Figure 70:
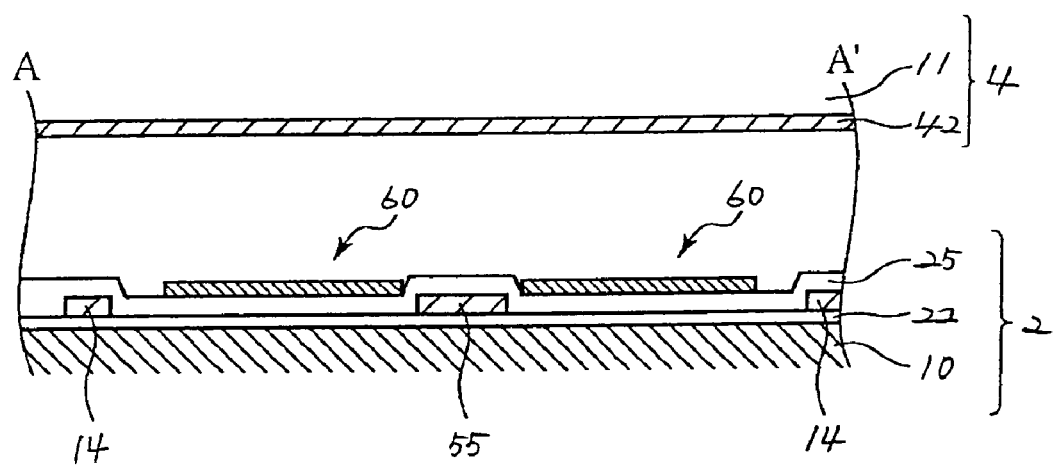
FIG. 70 is a sectional view showing a structure of the liquid crystal display device according to the thirteenth embodiment of the invention.

A liquid crystal display device according to a thirteenth embodiment of the invention will be described with reference to FIGS. 69 and 70. FIG. 69 is a plan view showing a structure of one pixel of the liquid crystal display device according to this embodiment, and FIG. 70 is a sectional view taken along line A-A' of FIG. 69. Incidentally, structural elements similar to those of the liquid crystal display device according to the third and the eighth embodiments are denoted by the same reference numerals, and their description will be omitted or simplified.

The liquid crystal display device according to this embodiment includes a pixel electrode 16 similar to the liquid crystal display device according to the third embodiment, and a reflecting electrode 55 is formed in an area where a slit 62 is formed between electrode units 60 constituting the pixel electrode 16 similarly to the liquid crystal display device according to the twelfth embodiment.

That is, as shown in FIGS. 69 and 70, the reflecting electrode 55 is formed in the area where the slit 62 between the plurality of electrode units 60 disposed in the direction parallel to a gate bus line 12 and the direction parallel to a drain bus line 14 is formed.

In the liquid crystal display device according to this embodiment, as compared with the liquid crystal display device according to the twelfth embodiment, since the area of the slit 62 formed between the electrode units 60 is large, the square measure of the reflecting electrode 55 is also large.

Fourteenth Embodiment

Figure 71:
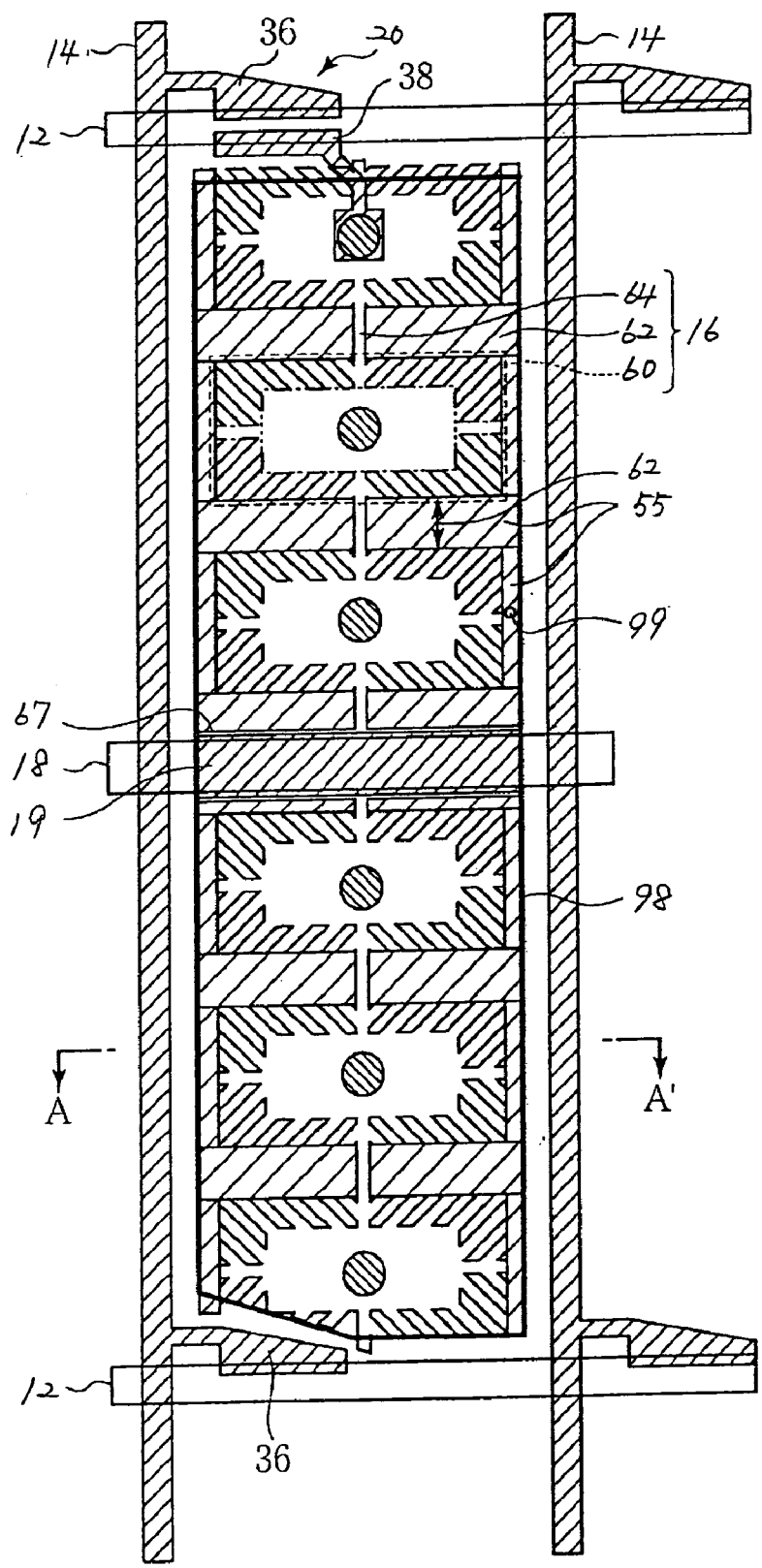
FIG. 71 is a plan view showing a structure of one pixel of a liquid crystal display device according to a fourteenth embodiment of the invention.
Figure 72:
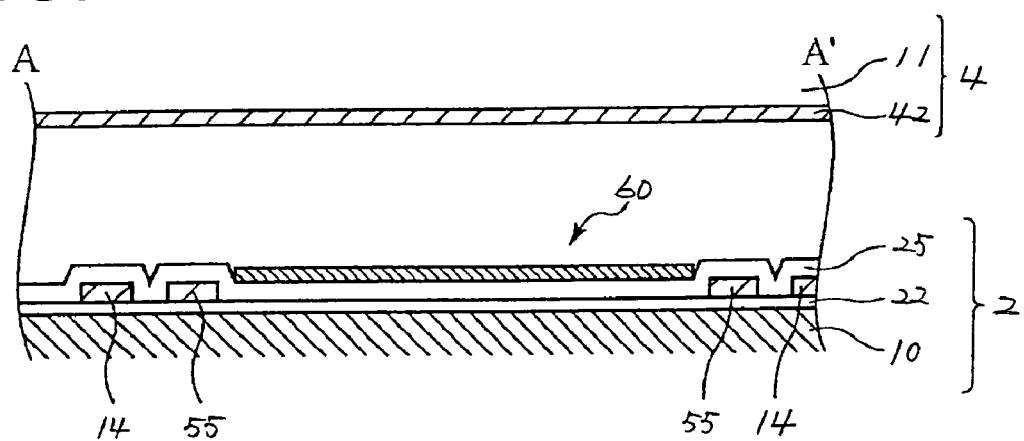
FIG. 72 is a plan view showing a structure of the liquid crystal display device according to the fourteenth embodiment of the invention.

A liquid crystal display device according to a fourteenth embodiment of the invention will be described with reference to FIGS. 71 and 72. FIG. 71 is a plan view showing a structure of one pixel of the liquid crystal display device according to this embodiment, and FIG. 72 is a sectional view taken along line A-A' of FIG. 71. Incidentally, structural elements similar to those of the liquid crystal display device according to the twelfth embodiment are denoted by the same reference numerals and their description will be omitted or simplified.

The basic structure of the liquid crystal display device according to this embodiment is almost the same as the liquid crystal display device according to the twelfth embodiment. In the liquid crystal display device according to this embodiment, as shown in FIG. 71, as compared with the liquid crystal display device according to the twelfth embodiment, an electrode unit 60 is formed to be small. For example, the width of the outer periphery of the electrode unit 60 in the direction parallel to the gate bus line 12 is, for example, 66 μm. Besides, the width in the direction parallel to the drain bus line 14 is, for example, 33 μm.

Since the electrode unit 60 is formed to be small as stated above, the electrode unit 60 is not formed in an area 99 having a predetermined width from a side, parallel to a drain bus line 14, of an opening part 98 of a BM for shading an end part of a pixel area. For example, the electrode unit 60 is not formed in the area 99 having a width of 6 μm from the side, parallel to the drain bus line 14, of the opening part 98 of the BM.

As shown in FIGS. 71 and 72, in the liquid crystal display device according to this embodiment, the reflecting electrode 55 is formed in not only the area where the slit 62 between the electrode units 60 is formed, but also the area 99 having the predetermined width from the side, parallel to the drain bus line 14, of the opening part 98 of the BM, where the electrode unit 60 is not formed.

As stated above, also by forming the reflecting electrode 55 in the area around the electrode unit 60, similarly to the liquid crystal display device according to the twelfth embodiment, the effective voltage applied to the liquid crystal molecules on the reflecting electrode 55 is caused by only the electric field around the electrode unit 60. Thus, the voltage applied to the liquid crystal molecules on the reflecting electrode 55 becomes small. By this, the optical effect due to the liquid crystal is suppressed in the reflection area, and coloring in the reflection area can be reduced.

As described above, according to the third to the fourteenth embodiments, the pixel electrode 16 includes the plurality of electrode units 60 disposed through the slit and electrically connected to each other, and each of the electrode units 60 includes the solid part 46 and the plurality of extension parts extending in the outer peripheral direction of the electrode unit 60 from the solid part 46, so that the occurrence of brightness difference due to the variation of width of the extension parts is suppressed, the uneven display can be reduced, and the excellent display quality can be obtained.

Besides, according to the eighth to the fourteenth embodiments, since the reflecting electrode 55 is formed by patterning the same conductive film as the bus lines 12, 14 and 18 formed on the substrate or the electrode of the TFT 20, the liquid crystal display device having the functions of both the reflection type and the transmission type can be manufactured at low cost without increasing the number of steps of the manufacture process of the transmission type liquid crystal display device.

Besides, according to the tenth and the eleventh embodiments, in the reflection area where the reflecting electrode 55 is formed, since the thickness of the liquid crystal layer is thinner than that in the other area, coloring in the reflection area can be reduced.

Modified Embodiment

The invention is not limited to the above embodiments, but can be variously modified.

Figure 73A:
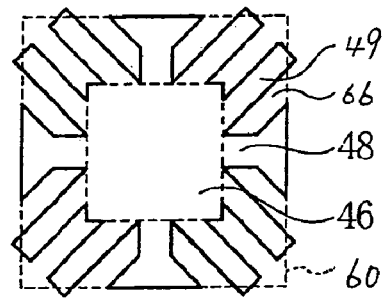
FIGS. 73A and 73B are plan views showing other shapes of a branch part of an electrode unit in the liquid crystal display device of the invention.
Figure 73B:
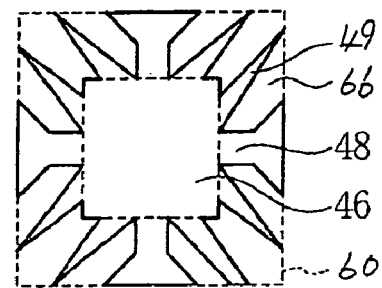
Figure 74:
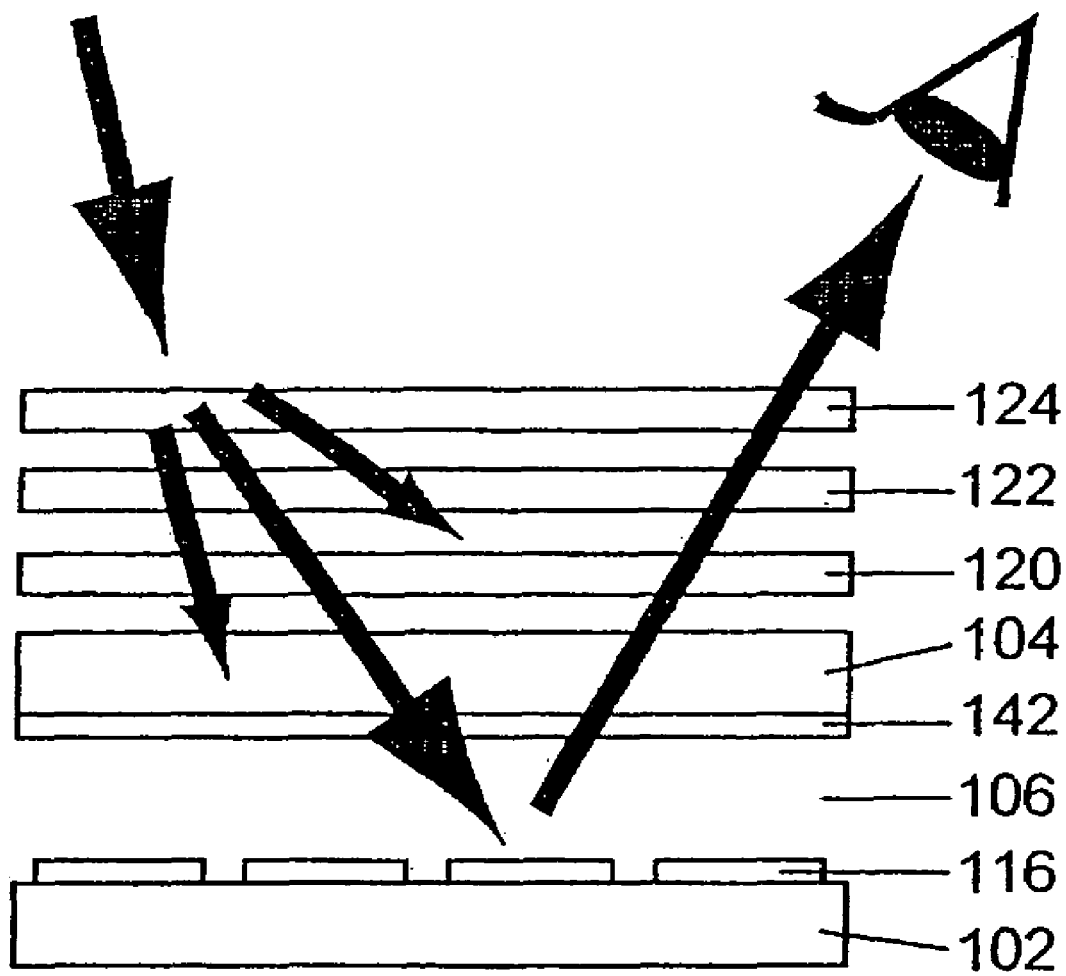
FIG. 74 is a sectional view showing a structure of a conventional liquid crystal display device.
Figure 75A:
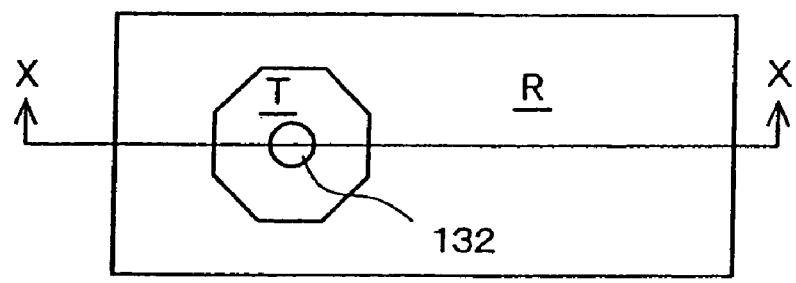
FIGS. 75A and 75B are views showing a structure of a conventional liquid crystal display device.
Figure 75B:
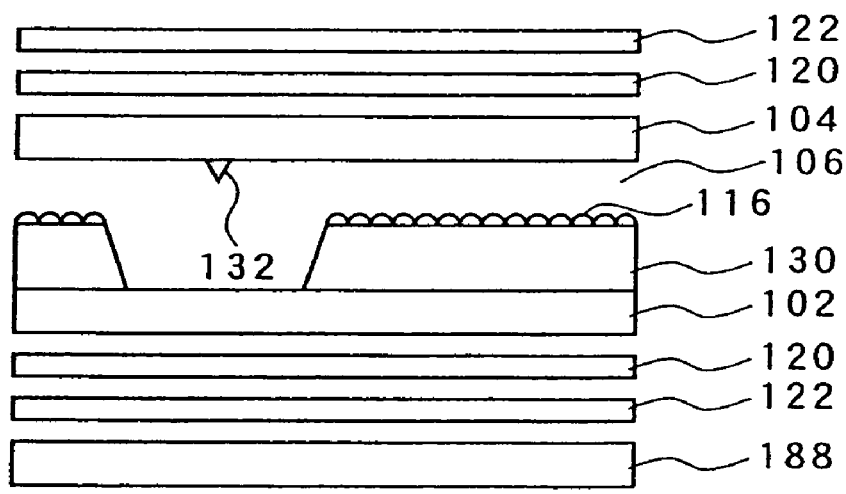
Figure 76A:
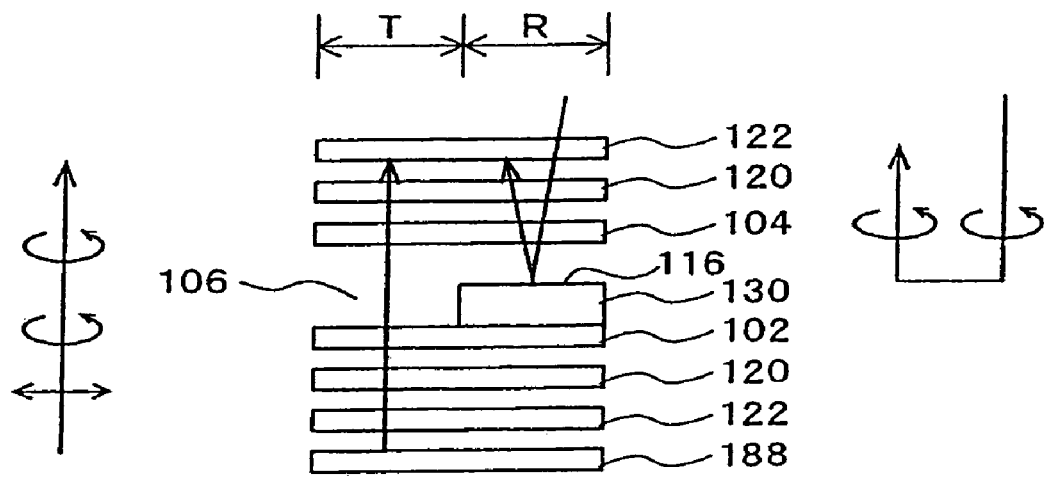
FIGS. 76A and 76B are sectional view showing a structure of the conventional liquid crystal display device.
Figure 76B:
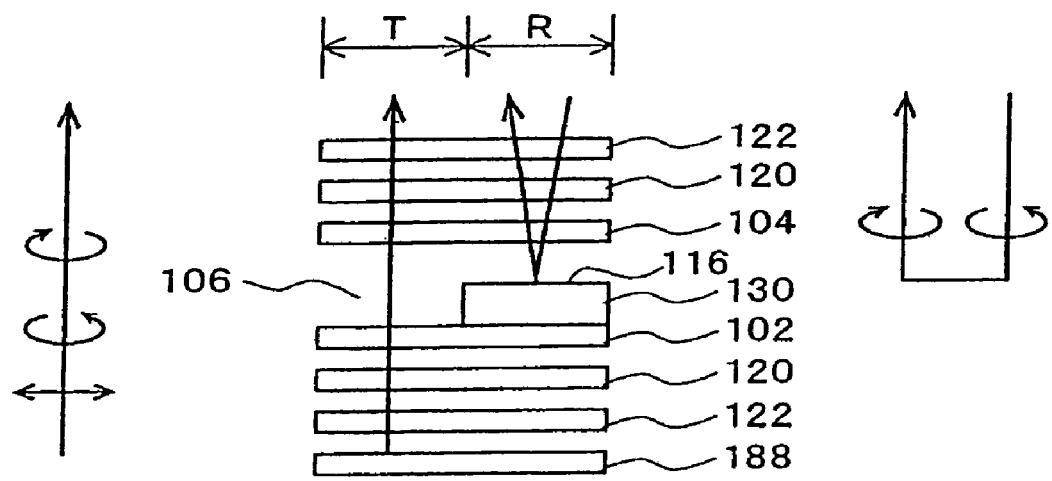

For example, in the above embodiments, although the description has been given to the case where the end parts of the respective branch parts 49 of the electrode unit 60 are formed almost in parallel with or vertically to the gate bus line 12 and the drain bus line 14, and the outer periphery of the electrode unit 60 is almost square or rectangular, the shape of the end parts of the respective branch parts 49 are not limited to these. For example, as shown in FIG. 73A, the end part of the branch part 49 may be formed to be vertical to the extension direction. Besides, as shown in FIG. 73B, the branch part 49 may be made to have such a shape that the width becomes gradually thin from the root part connected to the solid part 46 or the stem part 48 to the tip-part.

Besides, in the above embodiments, although the description has been given to the case where the branch part 49 extends obliquely so that the angle between the stem part 48 and the branch part 49, in other words, the angle between the side of the outer periphery of the electrode unit 60 and the branch part 49 becomes 45°, the extension direction of the branch part 49 is not limited to the case as stated above. The extension direction of the branch part 49 has only to have an angle of 0 to 90° with respect to one side of the outer periphery of the electrode unit 60. Similarly, although the description has been given to the case where the side of the outer periphery of the electrode unit 60 and the stem part 48 is 90°, the extension direction of the stem part 48 has only to have an angle of 0 to 90° with respect to one side of the outer periphery of the electrode unit 60. That is, the extension direction of the comb electrode 53 has only to have an angle of 0 to 90° with respect to one side of the outer periphery of the electrode unit 60.

Besides, in the above embodiments, although the description has been given to the case where the electrode units 60 having almost the same shape are disposed in the pixel area, a plurality of electrode units 60 different from each other in shape may be combined and disposed.

Besides, in the above embodiments, although the description has been given to the case of the electrode unit 60 having the square or rectangular outer periphery, the shape of the outer periphery of the electrode unit 60 is not limited to these. For example, the shape of the outer periphery of the electrode unit 60 may be a convex polygon, and at this time, the solid part 46 may have the side almost parallel to the side of the outer periphery of the electrode unit 60.

Besides, in the above embodiments, although the description has been given to the case where the number of the electrode units 60 in one pixel is 12, 6 or 5, the number of the electrode units 60 in one pixel is not limited to these. A predetermined number of electrode units 60 can be suitably formed in accordance with the size of the pixel area.

Besides, in the above embodiment, although the description has been given to the case where the pixel electrode 16 is made the transparent electrode made of ITO, the material of the pixel electrode 16 is not limited to ITO. Besides, in the third to the seventh embodiments, the pixel electrode 16 may be formed of a conductive film having optical reflectivity such as aluminum, and the reflection type liquid crystal display device may be constructed.

Besides, in the above embodiments, although the description has been given to the case where the TFT 20 is formed as an active element for driving the liquid crystal layer 6, the active element is not limited to the TFT 20. For example, an MIM (Metal Insulator Metal) transistor or the like may be used as the active element. Here, in the case where the reflecting electrode 55 is formed as in the case of the eighth to the fourteenth embodiments, the reflecting electrode 55 may be formed by the same conductive film as the electrode of the active element.

Besides, in the above embodiments, although the description has been given to the liquid crystal display device where the CF is formed on the CF substrate 4 disposed to be opposite to the TFT substrate 2, the invention is not limited to this, but can be applied to a so-called CF-on-TFT structure liquid crystal display device in which the CF is formed on the TFT substrate 2.

Besides, in the eighth to the fourteenth embodiments, although the description has been given to the case where the reflecting electrode 55 is formed of the same conductive film as the source electrode 38 or the like, the conductive film forming the reflecting electrode 55 is not limited to this. The reflecting electrode 55 may be formed of the same conductive film as any one of the gate bus line 12, the drain bus line 14, the drain electrode 36 of the TFT 20 and the source electrode 38 thereof. Besides, the reflecting electrode 55 may be formed of a conductive film different from these.

Besides, in the eighth to the fourteenth embodiments, although the description has been given to the case where the shape of the electrode unit 60 is similar to that of any one of the liquid crystal display devices according to the third to the seventh embodiments, the shape of the electrode unit 60 is not limited to these.

Besides, in the tenth and the eleventh embodiments, by providing the bank-shaped structures 69 and 65, in the reflection area where the reflecting electrode 55 is formed, the thickness of the liquid crystal layer is made thinner than that in the other area, however, the shape of the structure for thinning the liquid crystal layer is not limited to the bank shape.

As described above, according to the present invention, it is possible to realize the liquid crystal display device which can obtain excellent display characteristics without raising manufacture cost.

What is claimed is:

1. A liquid crystal display device comprising:
   a first substrate including a plurality of gate bus lines disposed almost in parallel with each other, a plurality of drain bus lines disposed almost in parallel with each other to intersect with the gate bus lines, a plurality of switching elements respectively provided at intersection parts of the gate bus lines and the drain bus lines, and a plurality of pixel electrodes respectively formed and connected to the plurality of switching elements, respectively;
   a second substrate provided to be opposite to the first substrate and having an opposite electrode opposite to the plurality of pixel electrodes; and
   a liquid crystal layer sealed between the first substrate and the second substrate and having a negative dielectric anisotropy,
   wherein each of the pixel electrodes includes a plurality of electrode units separated by at least one slit, each electrode unit including a solid part, a plurality of line portions extending from said solid part, and a plurality of space portions between said line portions, said electrode units being electrically connected to each other by connecting portions formed outside of areas where the electrode units are formed, and
   the first substrate further includes a reflecting layer formed under areas where the solid parts of all of or part of the plurality of electrode units are formed.

2. A liquid crystal display device according to claim 1, wherein each of the electrode units includes a plurality of extension parts extending from the solid part of the electrode unit toward an outer peripheral direction of the electrode unit.

3. A liquid crystal display device according to claim 1, wherein
   a ratio of a transmission area where the reflecting layer is not formed in the pixel area is in a range of 50 to 90% with respect to an opening part of a light shielding layer covering an end part of the pixel area, and
   a ratio of a reflection area where the reflecting electrode is formed in the pixel area is in a range of 10 to 25% with respect to the opening part of the light shielding layer.

4. A liquid crystal display device according to claim 1, wherein one electrode unit of the plurality of electrode units is electrically connected to a source electrode of the switching element through the reflecting layer formed under the solid part.

5. A liquid crystal display device according to claim 4, wherein the reflecting layer formed under the solid part of the one electrode unit and the source electrode of the thin film transistor are integrally formed.

6. A liquid crystal display device according to claim 1, further comprising a storage capacitor bus line disposed almost in parallel with the gate bus line and a storage capacitor electrode formed on the storage capacitor bus line through an insulating film,
   wherein the reflecting electrode is formed under the solid part of the electrode unit formed on the storage capacitor electrode.

7. The liquid crystal display of claim 1, wherein each connection portion extends from one of the line portions.

8. A liquid crystal display device comprising:
   a first substrate including a plurality of gate bus lines disposed almost in parallel with each other, a plurality of drain bus lines disposed almost in parallel with each other to intersect with the gate bus lines, a plurality of switching elements respectively provided at intersection parts of the gate bus lines and the drain bus lines, and a plurality of pixel electrodes respectively formed and connected to the plurality of switching elements, respectively;
   a second substrate provided to be opposite to the first substrate and having an opposite electrode opposite to the plurality of pixel electrodes; and
   a liquid crystal layer sealed between the first substrate and the second substrate and having a negative dielectric anisotropy,
   wherein each of the pixel electrodes includes a plurality of electrode units separated by at least one slit, including solid parts, and electrically connected to each other, and
   the first substrate further includes a reflecting layer formed under areas where the solid parts of all of or part of the plurality of electrode units are formed,
   wherein the reflecting layer has a shape almost equal to or smaller than the solid part of the electrode unit formed thereon.

* * * * *